United States Patent [19]

Iizuka et al.

[11] Patent Number: 5,974,015
[45] Date of Patent: *Oct. 26, 1999

[54] DIGITAL RECORDER

[75] Inventors: Nobuo Iizuka, Hamura; Hajime Manabe, Higashiyamato, both of Japan

[73] Assignee: Casio Computer Co., Ltd., Tokyo, Japan

[*] Notice: This patent is subject to a terminal disclaimer.

[21] Appl. No.: 08/437,178

[22] Filed: May 8, 1995

Related U.S. Application Data

[60] Division of application No. 07/871,241, Apr. 20, 1992, Pat. No. 5,519,684, which is a continuation-in-part of application No. 07/690,710, Apr. 24, 1991, abandoned.

[30] Foreign Application Priority Data

| May 14, 1990 | [JP] | Japan | 2-123788 |
| Sep. 6, 1990 | [JP] | Japan | 2-236719 |
| Apr. 26, 1991 | [JP] | Japan | 3-96754 |
| May 24, 1991 | [JP] | Japan | 3-119853 |

[51] Int. Cl.[6] .................. G11B 5/76; G11B 5/09
[52] U.S. Cl. .................. 369/60; 369/49
[58] Field of Search .................. 369/24, 30, 32, 369/47, 48, 49, 50, 53, 54, 60, 93, 83; 360/22, 24, 13; 84/612, 636

[56] References Cited

U.S. PATENT DOCUMENTS

| 4,069,511 | 1/1978 | Lelke . |
| 4,503,496 | 3/1985 | Holzner et al. . |
| 4,811,281 | 3/1989 | Okamoto et al. . |
| 4,831,523 | 5/1989 | Lewis et al. . |
| 4,901,234 | 2/1990 | Heath et al. . |
| 4,956,768 | 9/1990 | Sidi et al. . |
| 5,303,218 | 4/1994 | Miyake . |
| 5,519,684 | 5/1996 | Iizuka et al. .................. 369/93 |
| 5,530,898 | 6/1996 | Miyake .................. 369/24 |

FOREIGN PATENT DOCUMENTS

| 0122467 | 10/1984 | European Pat. Off. . |
| 0268270 | 5/1988 | European Pat. Off. . |
| 0366449 | 5/1990 | European Pat. Off. . |
| 0374921 | 6/1990 | European Pat. Off. . |
| 0390049 | 10/1990 | European Pat. Off. . |
| 0426162 | 5/1991 | European Pat. Off. . |
| 0459157 A2 | 12/1991 | European Pat. Off. . |
| 3621263 | 1/1988 | Germany . |
| 3-48798 | 10/1991 | Japan . |
| 3-48799 | 10/1991 | Japan . |
| 3-64955 | 10/1991 | Japan . |

OTHER PUBLICATIONS

JAS Journal, Apr., 1989, pp. 16–22, published in Japan.
"Computer Architecture and Parallel Processing" by K. Hwang et al, McGraw–Hill Book Company, 1984; pp. 128–133.

*Primary Examiner*—Paul W. Huber
*Attorney, Agent, or Firm*—Frishauf, Holtz, Goodman, Langer & Chick, P.C.

[57] ABSTRACT

A buffer serves as a sub-memory with respect to a hard disk and performs a data recording/reproducing operation. With this arrangement, even if the access rate of data in the hard disk is not so high, data transfer between the hard disk and an audio I/O, a MIDI I/O, and image I/O can be performed, and audio, MIDI, and video data can be simultaneously and selectively recorded/reproduced.

6 Claims, 40 Drawing Sheets

| TYPE | START | END | |
|---|---|---|---|
| D | 0 | 49899 | (DISK DW) |
| M | 30000 | 30199 | (MEMORY A+B) |
| D | 120100 | 139899 | (DISK D1) |
| M | 30200 | 30399 | (MEMORY C+D) |
| D | 50100 | 99999 | (DISK DX) |

FIG.16

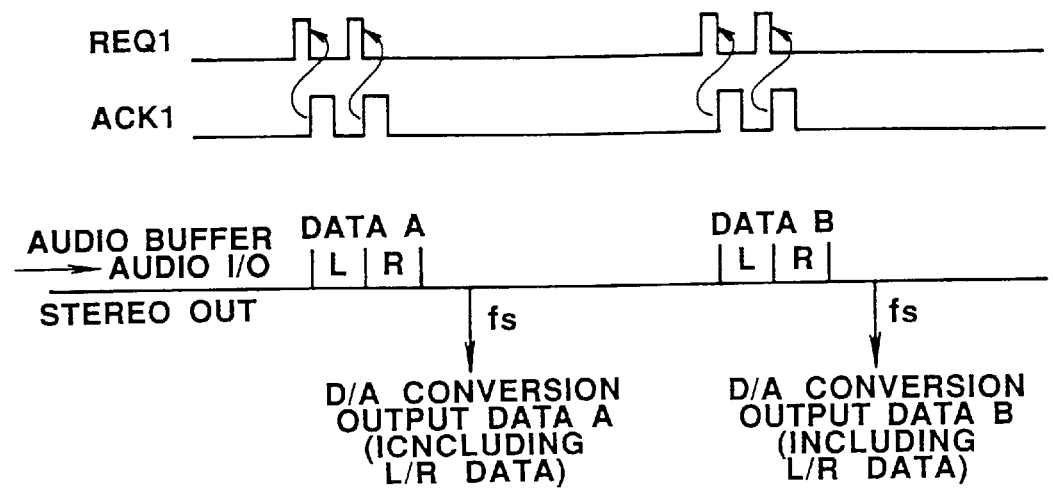
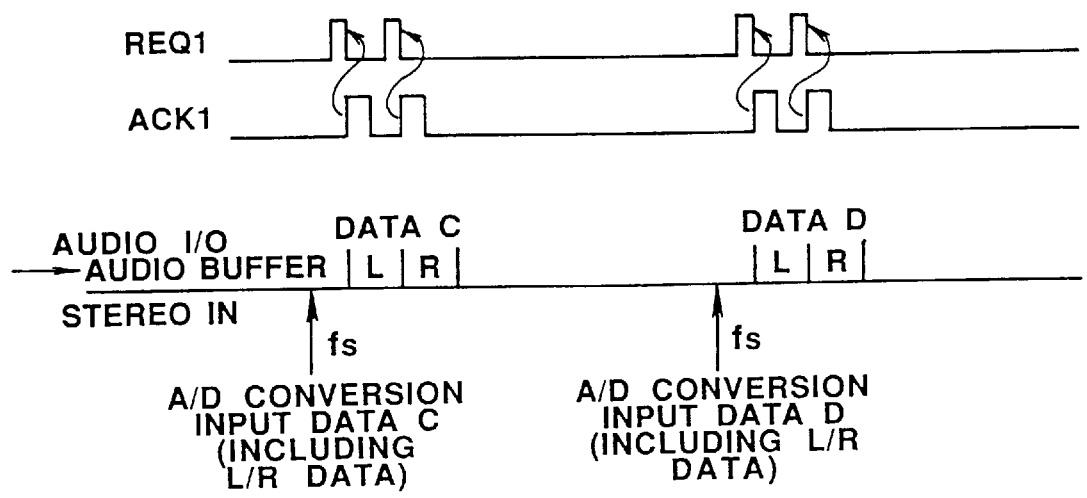
FIG. 21

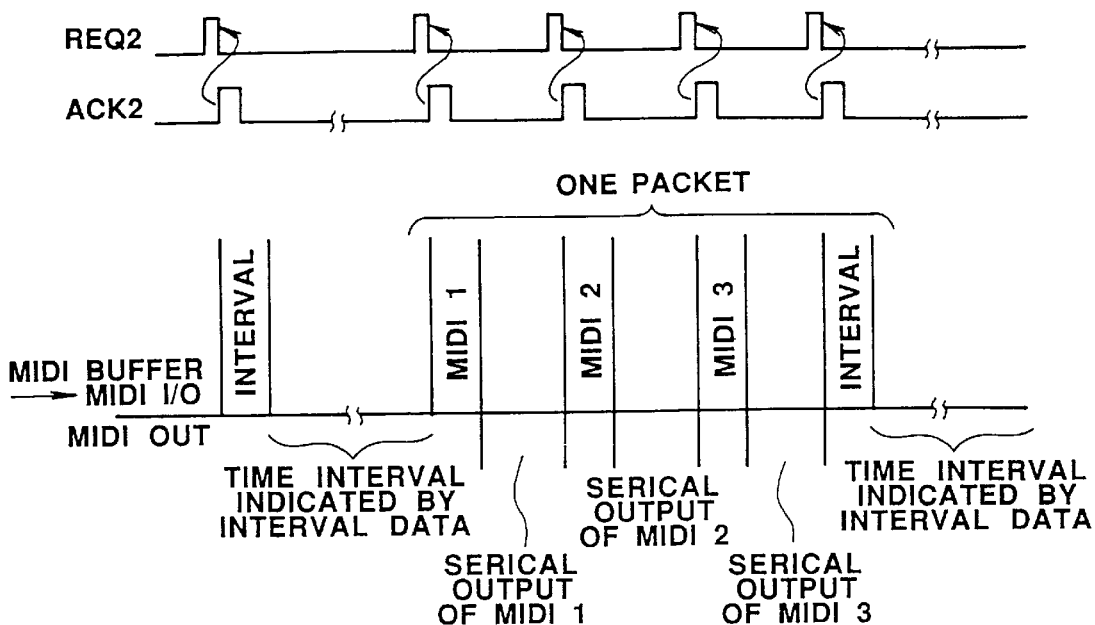
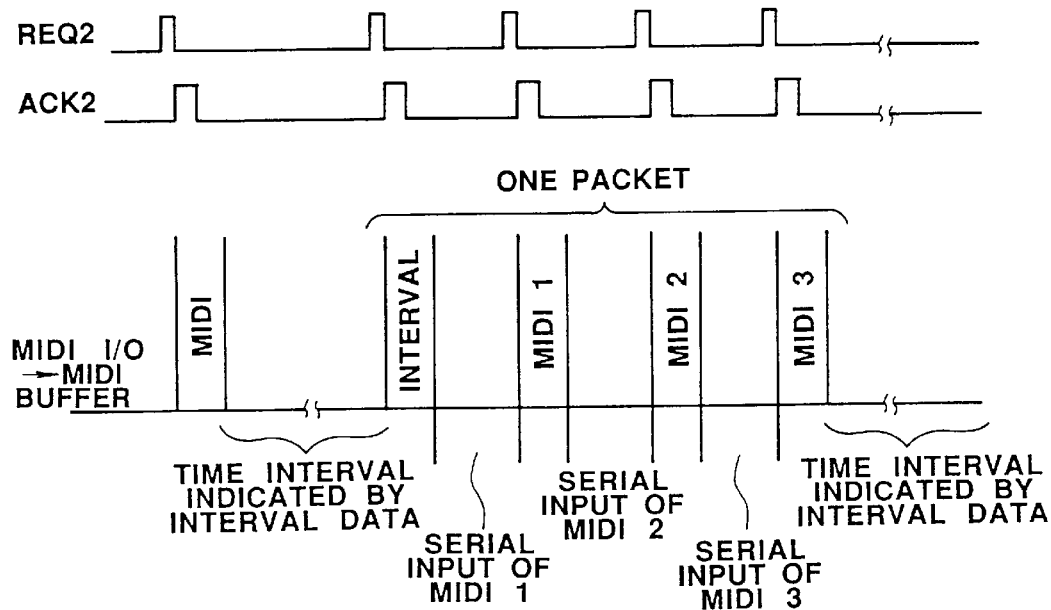
FIG.22

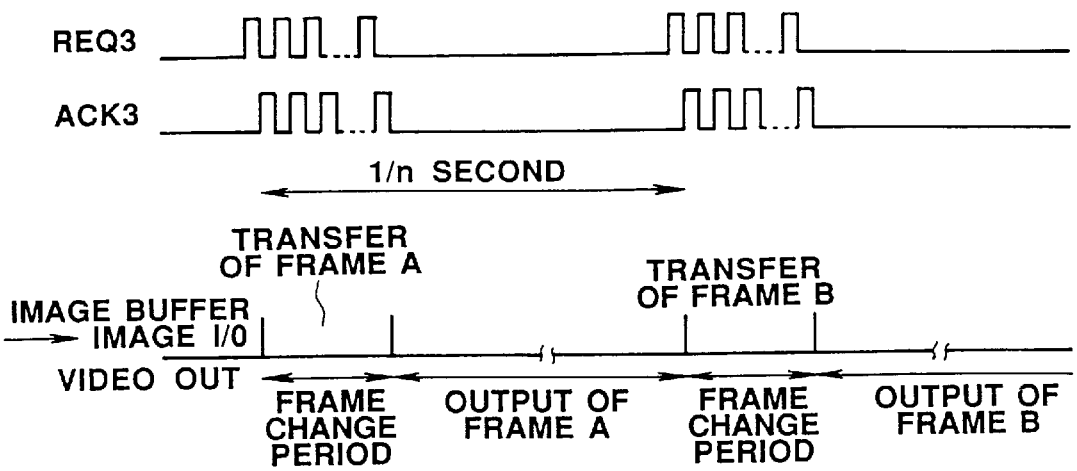
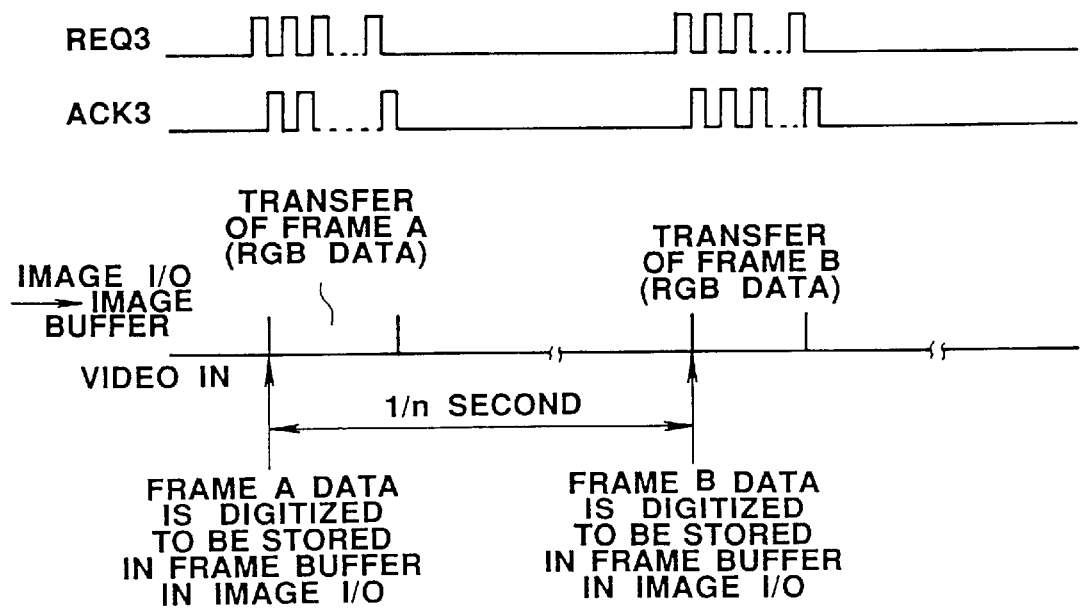
FIG.23

DATA TRANSFER BETWEEN
HARD DISK AND BUFFER
↔ THROUGH CH4
FIG.24
(a) IN RECORDING STATE
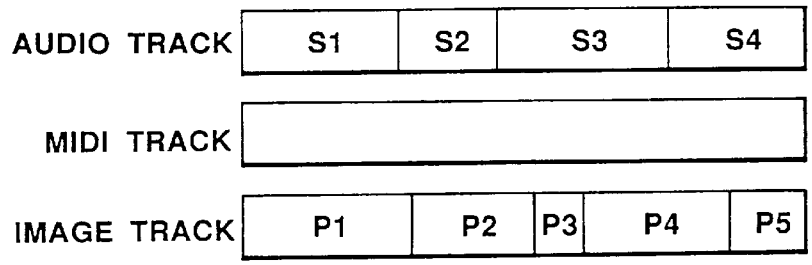
(b) AFTER EDITING
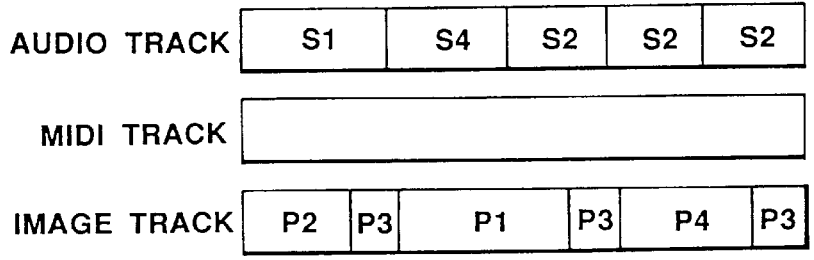
FIG.25

```
MUSICAL LIST

1 NAME OF MUSIC A    6 NAME OF MUSIC F
2 NAME OF MUSIC B    7 NAME OF MUSIC G
3 NAME OF MUSIC C    8 NAME OF MUSIC H
4 NAME OF MUSIC D    9 NAME OF MUSIC I
5 NAME OF MUSIC E   10 NAME OF MUSIC J
```

(a)
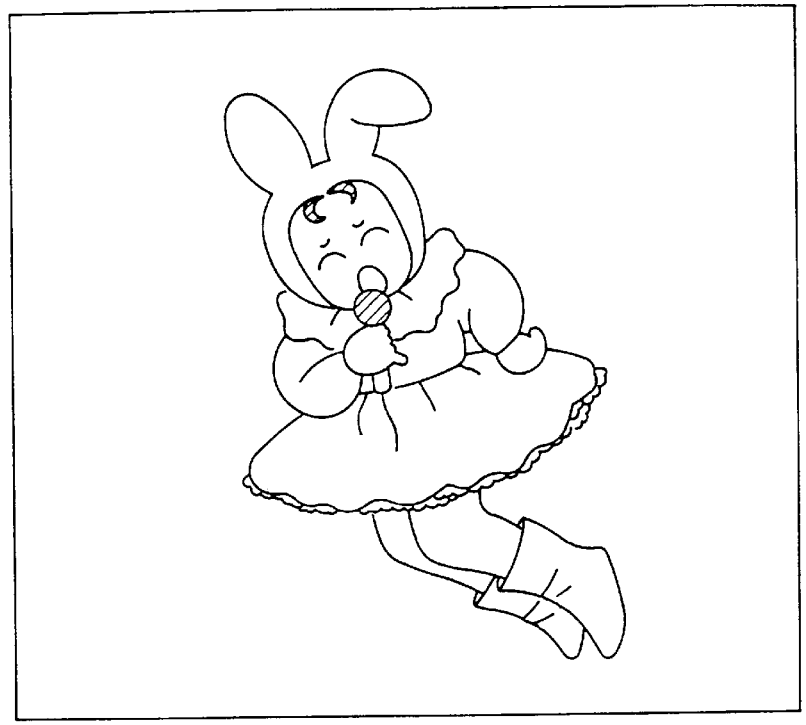
(b)
FIG. 33

| MEASURE NUMBER | AUDIO TRACK TR1 | | AUDIO TRACK Tr2 | | FRAME | |
|---|---|---|---|---|---|---|
| | START | END | START | END | START | END |
| 1 | Ad001 | Ad002-1 | Bd001 | Bd002-1 | Cd001 | Cd002-1 |
| 2 | Ad002 | Ad003-1 | Bd002 | Bd003-1 | | |
| 3 | Ad003 | Ad004-1 | Bd003 | Bd004-1 | Cd002 | Cd003-1 |
| 4 | Ad004 | Ad005-1 | Bd004 | Bd005-1 | | |
| 5 | Ad005 | Ad006-1 | Bd005 | Bd006-1 | | |
| 6 | Ad006 | Ad007-1 | Bd006 | Bd007-1 | | |
| 7 | Ad007 | Ad008-1 | Bd007 | Bd008-1 | | |
| 8 | | Ad009-1 | Bd008 | Bd009-1 | | |
| | | | Bd009 | Bd010-1 | | |

FIG. 42

DIGITAL RECORDER

CROSS-REFERENCE TO THE RELATED APPLICATION

This application is a divisional of U.S. patent application Ser. No. 871,241 filed on Apr. 20, 1992, now U.S. Pat. No. 5,519,684, which is a continuation-in-part of U.S. patent application Ser. No. 690,710 filed on Apr. 24, 1991, now abandoned.

BACKGROUND OF THE INVENTION

1. Field of the Invention

The present invention relates to a digital recorder capable of digitally recording, reproducing or editing, a digital signal such as an audio signal (voice signal) and a video signal.

2. Description of the Related Art

Conventionally, as a method of recording, reproducing and editing an audio signal, an analog audio signal is recorded on a magnetic tape, and the recorded signal is reproduced or edited. Since this prior art involves analog recording/reproduction, deterioration of the sound quality is inevitable. Particularly, the deterioration will be prominent when the once-recorded audio signal is dubbed.

Further, the use of the magnetic tape as a recording medium raises problems such that it takes time to reach the target editing point, and edition requires that the target recorded portion of the magnetic tape be physically cut and pasted or be copied to somewhere else before actually executing the edition.

The problem about the deterioration of the sound quality can be overcome by employing a method of digitally recording data on a magnetic tape. However, there still remains a shortcoming concerning the freedom of locating the starting point or edition due to the use of a sequential-access type recording medium.

There has been proposed a solution to the conventional problems which uses a Winchester type hard disk as a recording medium (refer to, for example, JAS Journal '89, April, pages 16 to 22, "Trend of Digital Audio Workstation (DAW)—January Session in AES Japan").

In general, an external memory device, such as a hard disk or an opto-electromagnetic disk, has a lower data transfer rate than RAM, requiring more accessing time. This is a bottleneck particularly in executing data recording/reproduction over multiple tracks in real time in a single external memory device.

In the case of reproducing audio data acquired by perform some edition, such as insertion or deletion of desired data, on the audio data recorded in such an external memory device, it is necessary to provide so-called cross fade of a signal with a length of 3 ms to 30 ms before and after an editing point in order to prevent an unnatural sound or data discontinuity. There are following two conventional methods to realize the cross fade:

(1) The first method is to rewrite audio data recorded on a hard disk itself. This method makes it difficult to correct the audio data, and does not make the best use of the random accessible feature of data that is recorded on the hard disk.

(2) The second method is real-time processing such that a central processing unit (CPU) stores information about the editing point of audio data recorded on a hard disk, without rewriting the data itself, controls access to the hard disk to read out two data blocks before and after the editing point, and prepares a single data block for the interval of the cross fade. This method would be the best choice in light of the freedom of edition. However, the method requires accessing to two tracks for handling the amount of data corresponding to a signal track. In performing the cross-fade process on the whole tracks at the same editing point, however, it is necessary to provide data transfer width (data transfer rate) twice the number of tracks. Further, real-time cross-fade processing needs high-speed signal processing. Therefore, a high-cost device is needed to realize the second method.

In the conventional apparatus, only audio data and sequencer data (MIDI data) are recorded/reproduced by special purpose recorders. Although attempts have been made to integrate these data and video data to record/reproduce them and to integrate and edit these data, only unsatisfactory results have been obtained so far.

SUMMARY OF THE INVENTION

It is therefore an object of the present invention to provide a digital recorder which is designed to suppress the large-scale hardware structure and reduces the load of a CPU.

It is another object of the present invention to provide a digital recorder with a simple structure which can freely edit recorded data without actually rewriting the data.

It is still another object to provide a multimedia recorder which can record/reproduce various data such as audio, video, and sequencer data as integral data by using an external memory device of a random access type, e.g., a hard disk or an optomagnetic disk, and can edit the data.

It is still another object of the present invention to provide an automatic performance apparatus which allows simple reproduction of audio and video data in accordance with a performance of a music.

It is still another object of the present invention to provide an automatic performance apparatus which can integrate and record/reproduce performance data, audio data, and video data.

According to one aspect of the present invention, there is provided a digital recorder comprising:

signal input/output means for executing a signal input/output operation in association with multiple tracks;

buffer means capable of exchanging digital data with the signal input/output means for each track and temporarily storing the digital data in association with the tracks;

external memory means of a random access type capable of exchanging the digital data with the buffer means and having a memory area for multiple tracks which is accessible for a read/write operation of the digital data; and data transfer means for executing transfer of digital data for each track between the signal input/output means and the buffer means and transfer of digital data for each track between the buffer means and the external memory means in a time-shared manner while scheduling in accordance with a predetermined priority order.

With the above structure, the data transfer means can execute transfer of digital data such as an audio data and video data, etc. for each track between the signal input/output means and the buffer means and transfer of digital data for each track between the buffer means and the external memory means in accordance with the optimal priority order, thus simplifying the required structure.

In other words, the data transfer means, which may be a DMA (Direct Memory Access) controller as one specific example, executes data transfer between individual constituting elements. In this case, the data transfer means transfers digital data for each track between the buffer means and audio signal input/output means by priority, and executes data transfer for individual tracks between the buffer means and the external memory means in order.

This is because the signal input/output means should perform an input/output of a signal every time and thus requires high-speed processing, while the data transfer between the buffer and the external memory means, such as a hard disk or an optomagnetic disk, does not require very fast processing since the buffer can temporarily store digital data of multiple (or many) times. The aforementioned processing by priority is done to cope with the low-speed response of the external memory means.

To cope with a multi-track operation, the audio signal input/output means may be designed to execute time-shared processing for individual tracks or may be realized by a plurality of hardware. The signal input/output means should have an A/D converting function if an analog signal is given from the outside, while it should have a D/A converting function if an analog signal is to be sent outside. In this case a pair of an A/D converter and a D/A converter may perform the necessary conversions for multi-tracks in a time-shared manner. If only a digital signal is to be exchanged with an external unit, simple data exchange is sufficient or the sampling rate has only to be properly matched for each track, thus eliminating the need for A/D conversion or D/A conversion.

As the buffer means, various types of memories may be used such as a shift register, a random access memory (RAM), and an FIFO memory. As an example, a RAM is divided into separate areas for multi-tracks, which are each used as a ring buffer (having a ring-shaped memory configuration with the last address linked to the first address). In this case, the data transfer unit (DMA controller) executes address control as needed to read or write data in order. This design can realize an FIFO is buffer.

According to another aspect of the present invention, there is provided a digital recorder comprising:

multiple signal input/output means for selectively executing A/D conversion and D/A conversion associated with multiple tracks;

multiple buffer means capable of exchanging digital data respectively with the signal input/output means and temporarily storing the digital data for each track;

external memory means of a random access type capable of exchanging the multiple digital data with the multiple buffer means and having a memory area for multiple tracks which is accessible for a read/write operation of the digital data; and data transfer means for executing transfer of digital data between the multiple signal input/output means and the respective multiple buffer means and transfer of digital data between the multiple buffer means and the external memory means in a time-shared manner while scheduling in accordance with a predetermined priority order.

More specifically, the data transfer means executes a single transfer of digital data associated with a single sampling when the request means in multiple signal input/output means make requests for data transfer between the signal input/output means and the associated buffer means for each sampling period, and the data transfer means executes a block transfer of digital data associated with multiple samplings with a designated one of the buffer means when the request means in the external memory means makes a request for data transfer between the external memory means and the multiple buffer means for an enabled track in order. When requested from the multiple signal input/output means and the external memory means to effect transfer of digital data, data transfer is scheduled in such a way that the data transfer means executes, by the highest priority, the request of each signal input/output means for which the input/output of a waveform signal should be performed for each sampling period, and executes data transfer with respect to the external memory means after the data transfer requested by one or more of the multiple signal input/output means has been completed.

According to a further aspect of the present invention, a central processing unit (CPU) controls an audio recording/reproducing device which comprises audio signal input/output means, buffer means, external lo memory means and data transfer means. In this case, data transfer for each track between the audio signal input/output means and buffer means is conducted generally in accordance with a transfer request made to the data transfer means, to that data transfer between the buffer means and external memory means can be managed by the central processing unit. In other words, the CPU permits the data transfer means to manage the timing relationship between the input/output of audio data for each sampling time and the data transfer with respect to the external memory means, and the CPU has only to perform address control of the external memory means (setup to the data transfer means) for each enabled track, or the like. The above structure therefore can allow for the use of a CPU which operates at a relatively low speed.

According to one specific arrangement of the present invention, in a digital multi-track recorder having a central processing unit and an audio signal recording/reproducing device, the audio signal recording/reproducing device comprises:

audio signal input/output means for executing an audio signal input/output operation in association with multiple tracks;

buffer means capable of exchanging digital audio data with the audio signal input/output means for each track and temporarily storing the digital audio data in association with the tracks;

external memory means of a random access type capable of exchanging the digital audio data with the buffer means and having a memory area for multiple tracks which is accessible for a read/write operation of the digital audio data;

control means for executing read/write control with respect to the external memory means; and data transfer means for executing transfer control in a time-shared manner while scheduling in accordance with a predetermined priority order, in response to a request from the audio signal input/output means for transfer of the digital audio data between the buffer means and the audio signal input/output means for each track at a rate corresponding to a sampling frequency and a request from the control means for transfer of the digital audio data between the buffer means and the external memory means in order for enabled tracks; and the central processing unit permits the data transfer means to manage transfer of digital audio data corresponding to each track between the audio signal input/output means and the buffer means at a rate corresponding to a sampling frequency, acquires from the data transfer means a condition for transfer of the digital audio data between the buffer means and the external memory means for a next track to be enabled and performs predetermined setting to the data transfer means, and causes the control means to send a transfer request to the data transfer means after performing predetermined programming on the control means to thereby execute data transfer between the buffer means and the external memory means.

According to another example of the arrangement of the present invention, there is provided a digital recorder comprising:

audio signal input/output means for executing an input/output operation of audio data;

audio data memory means for storing digital audio data supplied from the audio signal input/output means;

cross-fade data memory means for storing cross fade data acquired by subjecting the audio data stored in the audio data memory means to cross-fade processing;

table storing means for storing a reproduction schedule table indicating an order for reproducing the audio data and the cross fade data; and control means for supplying the audio data and the cross fade data to the audio signal input/output means from the audio data memory means and the cross-fade data memory means in accordance with the order indicated by the reproduction schedule table.

The table storing means is provided in a RAM controlled by a CPU.

With the above structure, audio data stored in the audio data memory means is not rewritten and remains held intact, assuring the freedom of edition. Since data acquired by subjecting audio data to cross-fade processing is stored in the cross-fade data memory means, the data should not be processed in real time. requiring no high-speed signal processing.

If the audio data memory means is realized by a disk drive for a magnetic hard disk, an opto-electromagnetic disk or the like, and the cross-fade data memory means is realized by a static RAM such as a semiconductor memory, the cross-fade data memory can be constituted using part of the buffer provided between the audio signal input/output means and the audio data memory means, preventing the memory area for the audio data on the disk from being limited by the storage of the cross fade data. Further, the transfer rate of the cross fade data will not be reduced by a wait for disk access.

If the audio data memory means and the cross-fade data memory means are provided at separate areas in the same disk drive, the number of accesses to the disk increases, slightly lowering the data transfer rate, but the information in the reproduction schedule table to identify the memory means becomes unnecessary, thus making it possible to simplify the structure.

In addition, if cross-fade processing means is provided to read desired audio data from the audio data memory means and perform desired cross-fade processing on the desired audio data in accordance with the type of edition, such as insertion or deletion of audio data, the editing point, and the content of the desired edition, such as the cross fade time and volume curve, it is possible to perform cross-fade processing matched better with the content of the intended edition. The cross-fade processing means may be realized by a CPU and its program.

Furthermore, if means for updating the reproduction schedule table every time edition is made, the editing work can be facilitated. This updating means may be realized by a CPU and its program.

According to an arrangement of the present invention, there is provided a multimedia recorder comprising first input/output means for performing an input/output operation for a first type of data, second input/output means for performing an input/output operation for data having a type different from the first type, buffer means capable of performing data transfer to the first and second input/output means and storing data in units of types, random access type external memory means capable of transferring the first and second types of data to the buffer means and having storage areas from/in which the first and second types of data can be read/written, and data transfer means for time-divisionally executing data transfer between the first and second input/output means and the buffer means and data transfer between the buffer means and the external memory means in a predetermined priority order.

That is, the buffer means is arranged between the external memory means and the input/output means, and data transfer between the buffer means and the input/output means and data transfer between the buffer means and the external memory means are sequentially and time-divisionally performed by the data transfer means in a predetermined priority order.

For example, the first input/output means is in charge of input/output control of audio data, whereas the second input/output means is in charge of input/output control of video data and sequencer data.

Audio data or video data is recorded or reproduced in or from the buffer means at a sampling timing. Sequencer data is recorded or reproduced in or from the buffer means in synchronism with the change timing of the sequencer data.

In practice, the data transfer means can be realized by a DMA (Direct Memory Access) controller. For example, in practice, the data transfer means executes data transfer in response to a data transfer request signal from each input/output means or the external memory means.

As the external memory means, various types of storage media can be used. However, a random access type storage medium such as a hard disk or an optomagnetic disk is preferably used.

According to the above-described arrangement, various types of data can be recorded/reproduced as integral data, and editing can be efficiently executed.

According to another arrangement of the present invention, there is provided an automatic performance apparatus comprising memory means for storing performance data of a music together with audio and video data to be reproduced in accordance with a performance based on the performance data of the music, performance means for giving a performance by generating musical tones in accordance with the performance data, audio reproducing means for reproducing the audio data in accordance with the performance given by the performance means, and video reproducing means for reproducing the video data in accordance with the performance given by the performance means.

As the memory means, various types of storage media can be used. However, a random access type storage medium such as a hard disk or an optomagnetic disk is preferably used.

The audio reproducing means reproduces the audio data in synchronism with a sampling timing. The video reproducing means reproduces the video data in synchronism with a video change timing of the video data (in practice, e.g., every predetermined number of measures).

In reproduction of video data, motion pictures can be reproduced by continuous reproduction of a plurality of frames (about 10 frames per second). In this case, if the video data is compressed to be recorded and expanded (restored) to be reproduced, the capacity of the data memory device can be reduced.

According to still another arrangement of the present invention, there is provided an automatic performance apparatus comprising random access type external memory means for storing performance data of a music together with audio and video data to be reproduced in accordance with a performance based on the performance data of the music, performance means for giving a performance by generating musical tones in accordance with the performance data of the music, buffer means for receiving the audio data and the video data from the external memory means, audio reproducing means, connected to the buffer means, for receiving and reproducing the audio data, video reproducing means, connected to the buffer means, for receiving and reproducing the video data, and data transfer means for scheduling and time-divisionally executing data transfer between the audio reproducing means and the buffer means, data transfer between the video reproducing means and the buffer means, and data transfer between the external memory means and the buffer means in a predetermined priority order.

In practice, for example, a DMA (Direct Memory Access) controller may be employed as this data transfer means. This means executes data transfer between the respective components. The data transfer means executes data transfer between the buffer means and the external memory means and the data transfer between the buffer means and each reproducing means according to the optimal schedule.

According to still another arrangement of the present invention, there is provided an automatic performance apparatus comprising memory means capable of read/write operations and adapted to store performance data of a music together with audio and video data to be reproduced in accordance with a performance based on the performance data of the music, performance inputting/ reproducing means for causing the memory means to store the performance data of the music and giving a performance by generating musical tones in accordance with the performance data of the music, audio storing/ reproducing means for causing the memory means to store the audio data and reproducing the audio data in accordance with the performance given by the performance inputting/reproducing means, and video storing/ reproducing means for causing the memory means to store the video data and reproducing the video data in accordance with the performance given by the performance inputting/reproducing means.

According to still another arrangement of the present invention, there is provided an automatic performance apparatus comprising random access type external memory means capable of read/write operations and adapted to store performance data of a music together with audio and video data to be reproduced in accordance with a performance based on the performance data of the music, performance input/output means for causing the external memory means to store the performance data of the music and giving a performance by generating musical tones in accordance with the performance data of the music read out from the external memory means, buffer means for receiving the audio and video data from the external memory means and supplying the audio and video data to the external memory means, audio input/output means, connected to the buffer means, for outputting the audio data to the buffer means and receiving/ reproducing the audio data from the buffer means, video input/output means, connected to the buffer means, for outputting the video data to the buffer means and receiving/ reproducing the video data from the buffer means, and data transfer means for scheduling and time-divisionally executing data transfer between the audio input/output means and the buffer means, data transfer between the video input/ output means and the buffer means, and data transfer between the external memory means and the buffer means in a predetermined priority order.

According to the automatic performance apparatus having the above-described arrangement, in addition to a synchronous performance based on the performance data of a music and audio data, video data such as various types of character image, drawing, picture, and musical piece data can be displayed as still pictures or motion pictures.

In addition, performance data obtained by a performance given by a user is stored together with audio data (e.g., CD-reproduced sound data or vocal data of the user) or Image data (character image data generated by the user, musical piece data, scenery data obtained by a video camera). These data can be extracted upon designating a music, and can be simply reproduced In synchronism with a performance of the music.

It would be apparent for those skilled in the art from the following description of preferred embodiments that the present invention may be modified in various other manners as well as applied to different cases.

BRIEF DESCRIPTION OF THE DRAWINGS

FIG. 16 is a diagram exemplifying a play schedule table;

FIG. 21 shows timing charts showing an input/output operation for audio data;

FIG. 22 shows timing charts showing an input/output operation for the MIDI data;

FIG. 23 shows timing charts showing an input/output operation for video data;

FIG. 24 is a timing chart showing a data transfer state between a hard disk and buffers;

FIG. 25 shows views showing an operation state in which editing processing of each track is performed by the embodiment;

FIG. 31 is a view showing a screen to be displayed on a display device to allow selection of a music;

FIG. 32 shows musical scores to be displayed on the display device in accordance with a performance of a music;

FIG. 33 shows, in (a) and (b), video (character) images to be displayed in accordance with a performance of a music;

FIG. 42 is a view showing a schedule table for a track reproducing operation of the storing/reproducing section 2002 in FIG. 26.

DETAILED DESCRIPTION OF THE PREFERRED EMBODIMENTS

Preferred embodiments of the present invention will now be described referring to the accompanying drawings.

First Embodiment

General Structure

Figure 1:
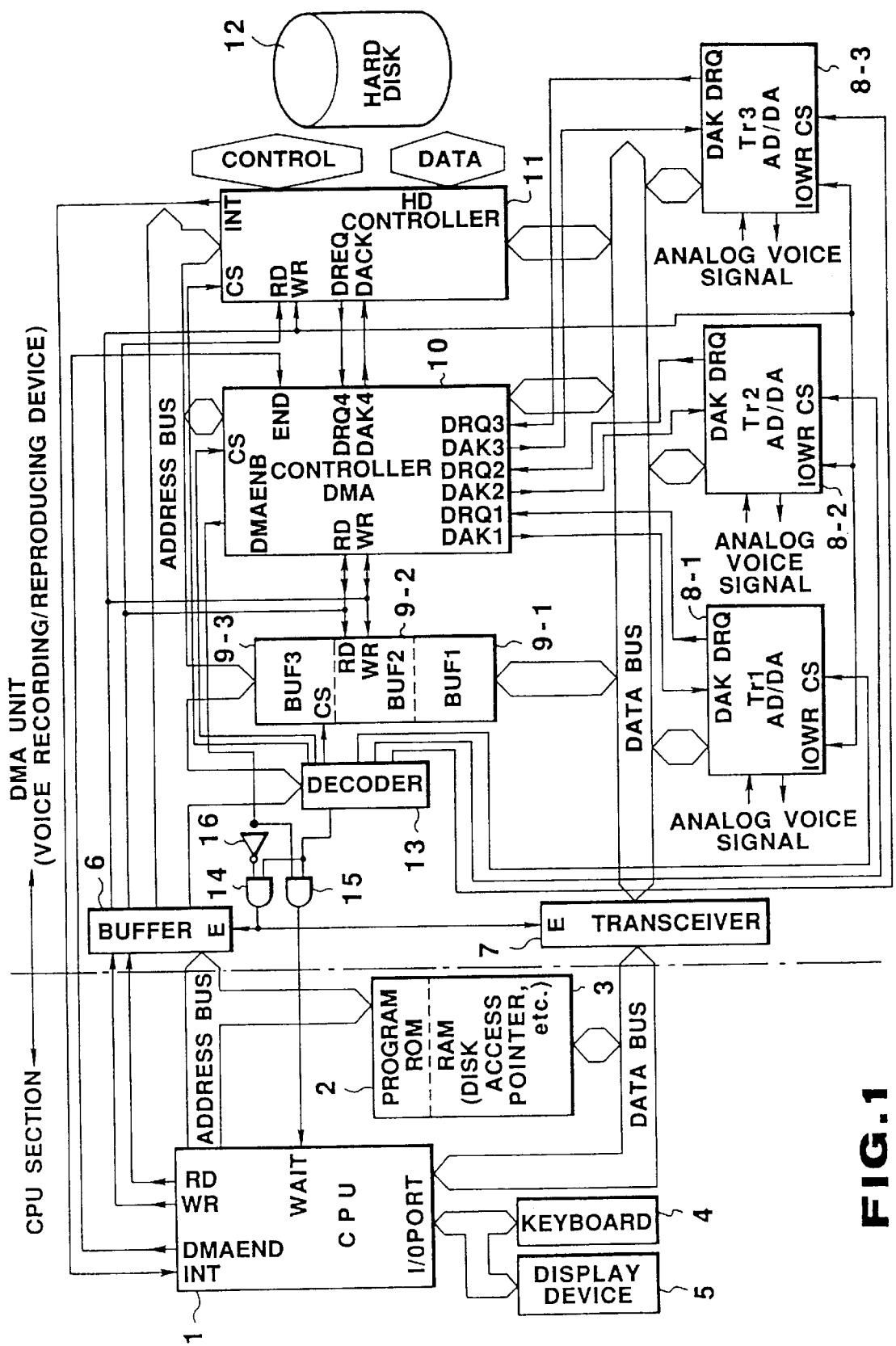
FIG. 1 is a diagram illustrating the general structure of the first embodiment according to the present invention.

FIG. 1 illustrates the general structure of the first embodiment, which is designed to be able to execute recording or playing with respect to up to three tracks at the same time. The structure is divided into a CPU section and a DMA unit (audio recording/playing unit), as shown in FIG. 1.

The CPU section comprises a CPU 1, a program ROM 2 which stores a program (to be described in detail later) for specifying the operation of the CPU 1, a RAM 3, which includes an area for storing various data, a three-track disk access pointer and a work area, a keyboard 4, which is connected as a peripheral device to an I/O port of the CPU 1 and has various function keys and data input keys, and a display device 5, which includes a CRT or an LCD and its driver to provide various displays. As will be described later, in the real-time operation, such as recording/playing, the CPU 1 controls individual components in the DMA unit as needed while an address bus and a data bus in the DMA unit are not busy. In editing an audio signal, the CPU 1 rearranges data blocks and manipulates a disk access pointer, for example. Setting a record/play mode for each track (hereafter referred to as "Tr"), starting and stopping the mode, locating the track, and designation of editing point can be effected using the keyboard 4, as will be described later.

An address signal is sent from the CPU I through an address bus to the address terminals of the program ROM 2 and RAM 3 which have their output terminals connected through a data bus to the CPU 1 or a transceiver 7.

A buffer 6 and the transceiver 7 are provided in the DMA unit to connect the CPU section to the DMA unit. The buffer 6 is connected via the address bus to the CPU 1, and is connected to an address bus in the DMA unit. The transceiver 7 is connected via the data bus to the CPU 1, and is also connected to a data bus in the DMA unit.

Provided in the DMA unit are an audio input/output (hereinafter referred to as I/O) device 8-1 for Tr1, an audio I/O device 8-2 for Tr2 and an audio I/O device 8-3 for Tr3, which will independently receive or output an analog voice signal as an analog audio signal.

The audio I/O devices 8-1 to 8-3 each include a converter for selectively executing A/D or D/A conversion, a low pass filter for eliminating sampling noise and a clock circuit for generating a clock in a sampling period. When the mentioned tracks for the respective audio I/O devices 8-1 to 8-3 are set in record mode, each I/O device properly filters the analog signal from the outside every sampling period, and performs A/D conversion of the signal to obtain digital audio data. When those tracks are set in play mode, the digital audio data which has been read out in advance is subjected to D/A conversion for each sampling period, and is then properly filtered, and is output as an analog audio signal.

The audio I/O device 8-1 to 8 3 for the respective Tr1 to Tr3 are connected via the data bus to buffers 9-1 (BUF1), 9-2 (BUF2) and 9-3 (BUF3), exchanging digital audio data therewith.

These buffers 9-1 to 9-3 respectively correspond to Tr1 to Tr3 and exchange data respectively with the audio I/O devices 8-1 to 8-3 through direct memory accessing under the control of a DMA controller 10.

In record mode, the audio I/O devices 8-1 to 8-3 request the DMA controller 10 for DMA transfer (single transfer) of digital data which is associated with one sampling from the devices 8-1 to 8-3 to the buffers 9-1 to 9-3 in the sampling period. That is, the audio I/O devices 8-1 to 8-3 send DRQ signals to the DMA controller 10 (signal DRQ1 from Tr1. DRQ2 from Tr2 and DRQ3 from Tr3). The data transfer will actually be executed according to the response from the DMA controller 10, i.e., when the DMA controller 10 sends a DAK1 to Tr1, a DAK2 to Tr2 and a DAK3 to Tr3 as acknowledgement.

In play mode, the audio I/O devices 8-1 to 8-3 request the DMA transfer (signal transfer) of digital data associated with one sampling from the buffers 9-1 to 9-3 to the devices 8-1 to 8-3 during the sampling period. Then, the data transfer is performed by the DMA controller 10 as described above.

The buffers 9-1 to 9-3 are capable of storing digital audio data for multiple periods. The individual buffers 9-1 to 9-3 are designed to function as FIFO buffers if, for example, the RAM is divided into Tr1 to Tr3 and each is used as a ring buffer (a buffer whose last address and first address are imaginarily linked together).

The buffers 9-1 to 9-3 are addressed through the address bus by the DMA controller 10. In other words, while the DMA transfer is being performed, the address bus, the data bus and a control signal line in the DMA unit are used by the DMA controller 10 alone.

The buffers 9-1 to 9-3 exchange data with a hard disk 12 through the data bus under the control of a disk controller (hereafter referred to as "HD controller") 11. The hard disk 12 and the HD controller 11 are connected to each other by the data bus and the control signal line. The HD controller 11 controls every read/write access to the hard disk 12. The hard disk 12 has three separate storage areas for the respective three tracks Tr1 to Tr3. The DMA controller 10 serves to transfer data between the hard disk 12 and the buffers 9-1 to 9-3 by sending an interrupt (INT) to the CPU 1 after one data block has been transferred, and sending the CPU 1 a command to transfer the next data block. Upon receiving the interrupt signal INT from the HD controller 11, the CPU 1 sets the DMA controller 10 and the HD controller 11 to the desired mode, or performs programming thereof, then allows the controllers to do the DMA transfer. A detailed description of this operation will be given later.

In play mode, the DMA controller 10 reads a predetermined amount (corresponding to plural sampling periods) of digital audio data from the hard disk 12, and functions to execute DMA transfer (block transfer) to a specified buffer among the buffers 9-1 to 9-3. In record mode, the DMA controller 10 reads a pre-designated amount (corresponding to plural sampling periods) of digital audio data from the specified buffer, and conducts DMA transfer (block transfer) of the data to a designated position on the hard disk 12.

For data transfer between the hard disk 12 and the buffers 9-1 to 9-3, the HD controller 11 sends a request signal DREQ to the DMA controller 10 (the DMA controller 10 receives the signal as DREQ4). When data transfer is possible, the HD controller 11 receives a response signal DACK from the DMA controller 10 (the DMA controller 10 outputs the signal as DAK4), entering the actual transfer mode.

As described above, the DMA controller 10 performs time-shared data transfer in four channels: data transfer between the audio I/O devices 8-1 to 8--3 for Tr1 to Tr3 and the buffers 9-1 to 9-3 in three channels (CH1–CH3 to be described later) and data transfer in one channel (CH4 to be described later) between the hard disk 12 and one of the buffers 9-1 to 9-3, which is selected sequentially.

The CPU 1 supplies an address signal to the buffer 6 trough the address bus to control the functions and operations of the components in the DMA unit. The CPU 1 also supplies designating signals for designating the components through the buffer 6 to a decoder 13, then sends the signals CS to the audio I/O devices 8-1 to 8-3, the buffers 9-1 to 9-3, the DMA controller 10 and the HD controller 11. At the same time, the CPU I exchanges various data with three components via the data bus through the transceiver 7.

Further, the CPU 1 sends a designation signal WR, which designates if the audio I/O devices 8-1 to 8-3 should be set to the record mode (write mode) or the play mode (read mode), to the IOWR terminals of the respective devices 8-1 to 8-3 through the buffer 6.

The CPU 1 also sends through the buffer 6 the designation signal (write signal) WR and another signal (read signal) RD to the buffers 9-1 to 9-3, the DMA controller 10 and the HD controller 11, to read data from or write data in the components. The DMA controller 10 also outputs these signals RD and WR in DMA transfer mode. The relationship between these signals and the functions and operations of the components will be described later.

The DMA controller 10 sets a DMA enabling signal DMAENB to "1" and outputs it while the DMA transfer is performed between the components. When the signal DMAENB is sent to an AND gate 14 through an inverter 16, the output of the gate 14 becomes "0". As a result, an enabling signal E is sent as "0" to the buffer 6 and the transceiver 7 to disable the CPU section and the DMA unit to exchange data and addresses with each other. When the signal of "1" is sent to an AND gate 15 from the decoder 13 in this case, the output of the gate 15 becomes "1", allowing a wait signal WAIT to be supplied to the CPU 1.

If DMA transfer starts while the CPU 1 is sending a predetermined signal to the decoder 13 to enable the buffer 6 and the transceiver 7 in order to control the DMA unit, i.e. while the CPU 1 is sending a signal of "1" from the decoder 13 to one of the input terminals of the AND gate 14 (when the CPU 1 outputs the address signal for accessing one of the buffer 9-1 to 9-3, the DMA controller 10, the HD controller 11 and the audio I/O devices 8-1 to 8-3, the output of the decoder 13 becomes active, sending a "1" to one input terminal of each of the AND gates 14 and 15), the CPU 1 receives the signal WAIT to execute the DMA transfer by priority over other operations. After the DMA transfer is completed, the WAIT is released to restart the operation of the CPU 1.

Even if the CPU 1 tries to access the DMA controller 10, while the DMA controller 10 is executing the DMA transfer, the signal WAIT is sent from the AND gate 15 to the CPU 1, and the execution cycle of the CPU 1 is made longer to disable the buffer 6 and the transceiver 7 during this period.

In short, the CPU 1 can access the components in the DMA unit under the following two conditions:

(1) when the CPU 1 outputs an address to access an individual components of the DMA unit, and (2) when signal DMAENB is inactive ("0"), i.e., when the data bus of the DMA unit is not busy.

The CPU 1, however, can continue processing without considering when to access the DMA unit in accordance with the action of gates 14, 15 and 16.

To alter the operating state of the DMA unit immediately in response to a key input or the triggering by the control data, the CPU 1 can send a command DMAEND to the DMA controller 10 to stop DMA transfer whatever state the controller 10 is in (the command is sent as an END signal to the DMA controller 10).

Structure of Essential Portions DMA of Controller
10

One example of the structure of the DMA controller 10 will now be explained. The DMA controller 10 can transfer in a bus cycle of several hundred nanoseconds. Therefore, it takes one to two microseconds to transfer sampling data for three tracks.

With a sampling frequency fs as 48 KHz, the interval of one sampling period is approximately 21 microseconds. It is possible to assign most of the sampling time interval to the time for data transfer between the buffers 9-1 to 9-3, the HD controller 11 and the hard disk 12, and the time for the CPU 1 to program the individual components.

Figure 2:
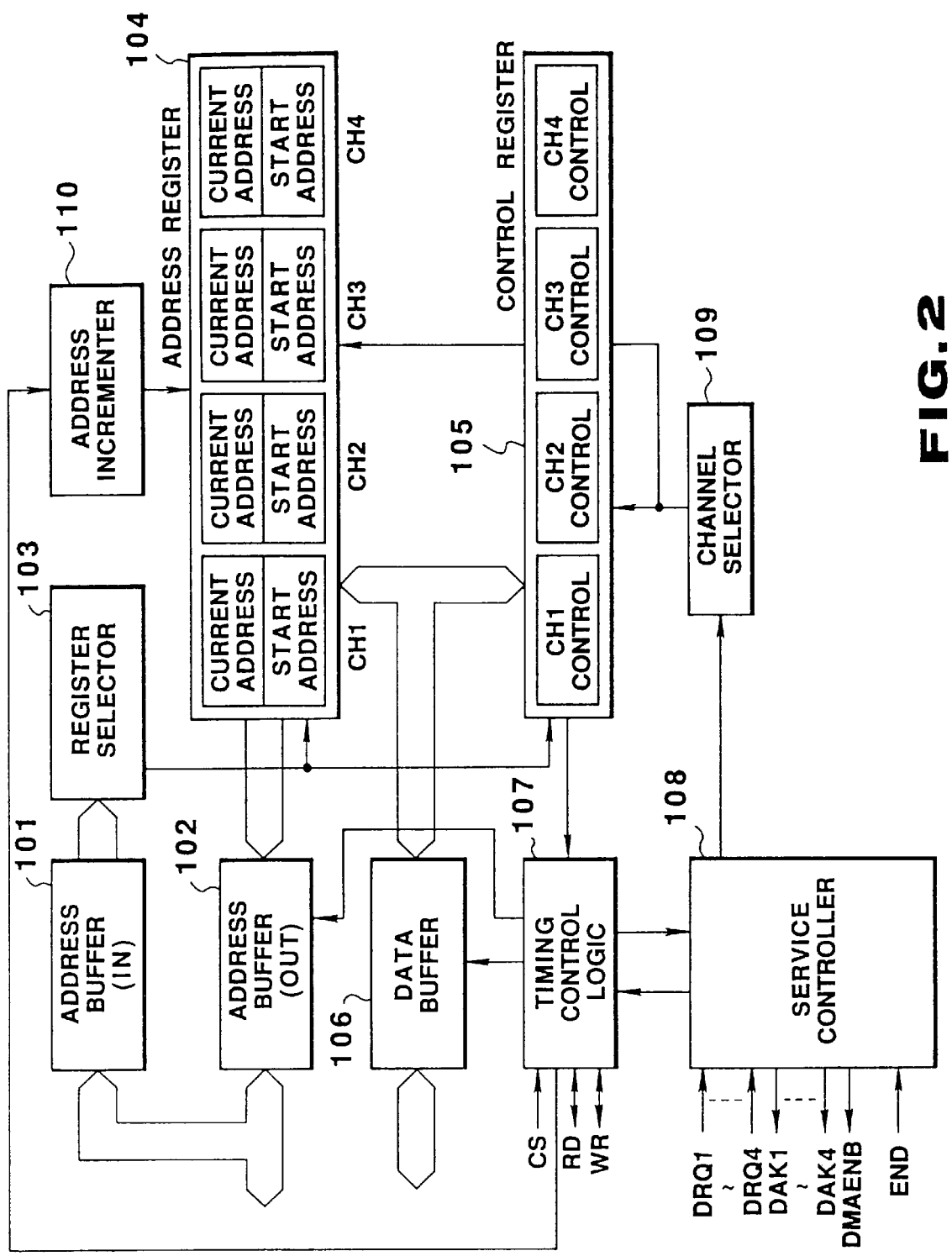
FIG. 2 is a detail diagram illustrating essential portions of a DMA controller in FIG. 1.

The structure of the essential portions is exemplified in FIG. 2. The DMA controller 10 includes an address buffer 101 on the input side (IN) to be connected to the address bus, and an address buffer 102 on the output side (OUT). According to the address signal sent to the address buffer 101, what is designated by a register selector 103 is changed to designate desired registers present in an address register 104 and a control register 105.

There are four channels CH1 to CH4 in both the address register 104 and the control register 105; the channels CH1 to CH3 are registers for DMA transfer between the buffers 9-1 to 9-3 and the audio I/O devices 8-1 to 8-3, and the channel CH4 is a register for DMA transfer between a designated one of the buffers 9-1 to 9-3 and the hard disk 12.

The channels CH1 to CH4 in the address register 104 each have an area for storing at least current addresses and start addresses of the corresponding buffer 9-1, 9-2 or 9-3 and the designated buffer. The channels CH1 to CH4 in the control register 105 store, for example, control data for designating the direction of DMA transfer.

The contents of the address register 104 and the control register 105 can be input from and output to the data bus through the data buffer 106. A timing control logic 107, a service controller 108 and a channel selector 109 control these components.

The service controller 108 is of a hard logic type or a microprogram-controlled type. The controller 108 receives a signal from the timing control logic 107, the DMA request signal DRQ1 to DRQ4 from the audio I/O devices 8-1 to 8-3 and the HD controller 11 and the DMA end command END (DMAEND) from the CPU 1, outputs the acknowledge signals DAK1 to DAK4 to these components. The controller 108 outputs the DMA enable signal DMAENB for indicating that the DMA transfer is in progress. Further, the controller 108 sends various commands to the timing control logic 107, and a channel select signal to a channel selector 109. The channel selector 109 selectively designates those registers in the address register 104 and the control. register 105 which correspond to the channels CH1 to CH4.

In response to the designation signal CS from the decoder 13, the control signal from the control register 105 and the control signal from the service controller 108, the timing control logic 107 controls the input and output of the address buffer 102 and the data buffer 106, and enables an address incrementer 110 to increase the current address of the designated channel in the address register 104.

Whole Operations of the CPU 1

Figure 3:
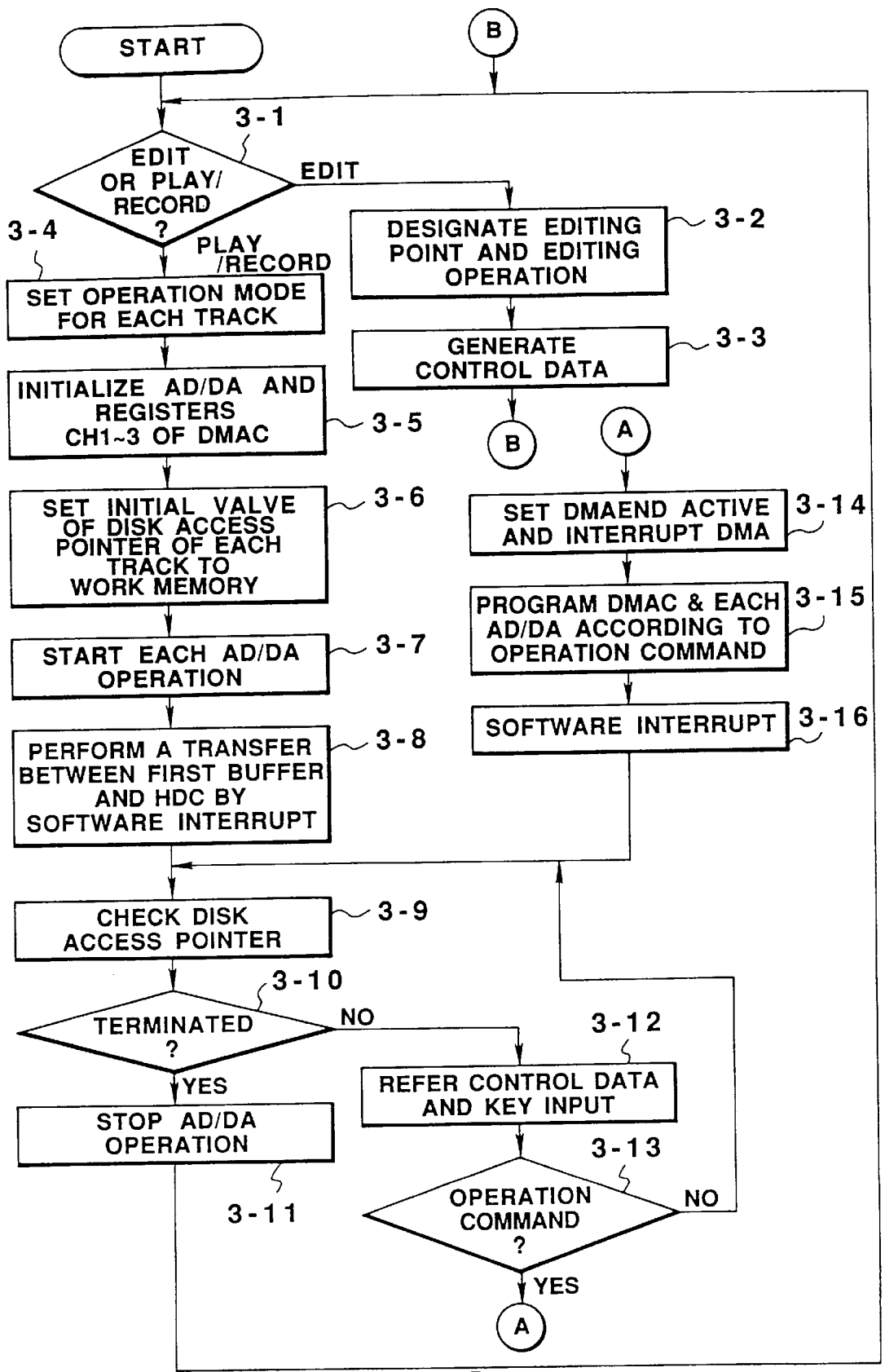
FIG. 3 is a diagram showing the main routine of a CPU in FIG. 1.
Figure 4:
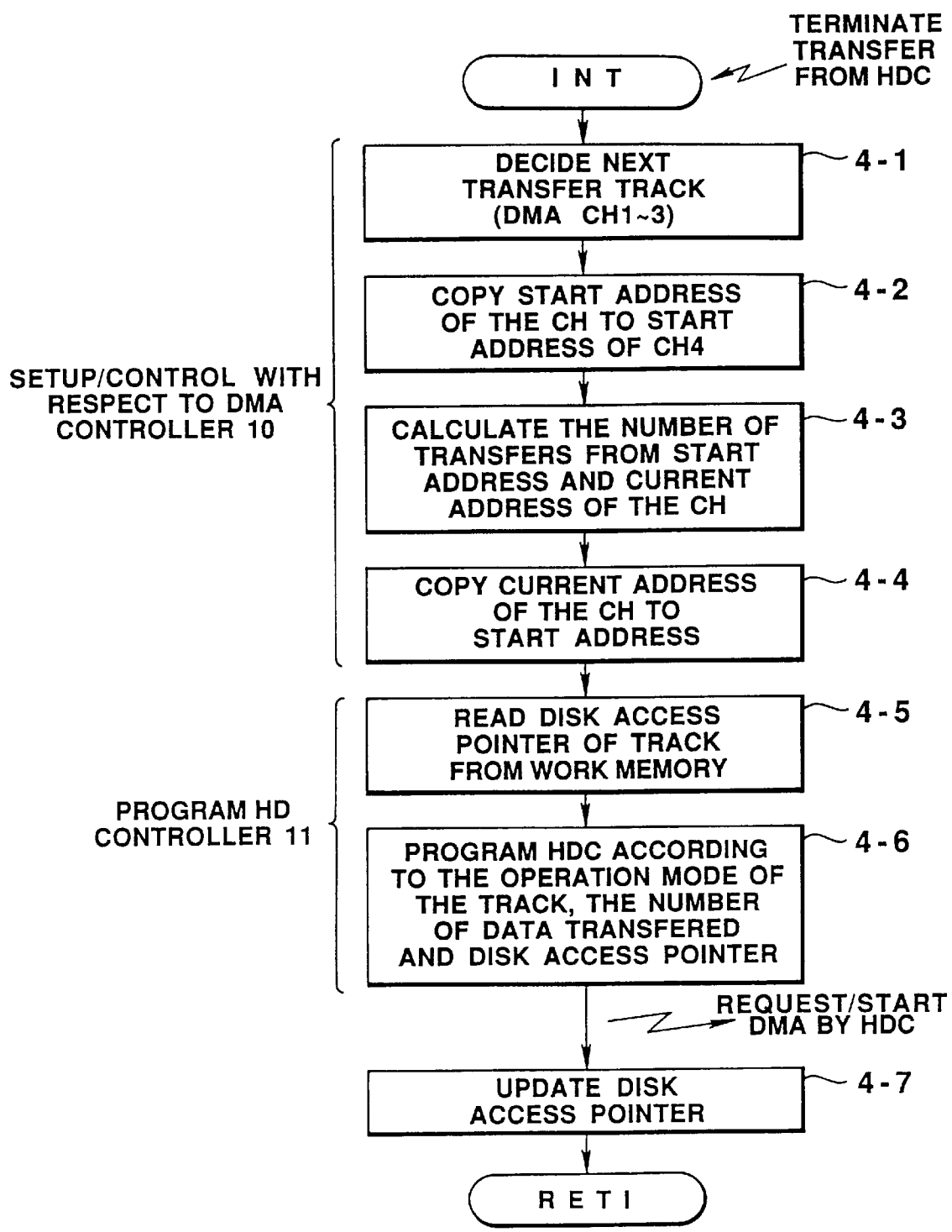
FIG. 4 is a diagram illustrating an interrupt routine of the CPU in FIG. 1.

The operation of this embodiment will be described as follows. Flow charts representing the operation of the CPU 1 are shown in FIGS. 3 and 4, and these routines are executed by a program (software) stored in the program ROM 2. FIG. 3 represents a main routine, and FIG. 4 shows an interrupt routine which is invoked in response to the interrupt signal INT from the HD controller 11.

In FIG. 3, it is determined whether a mode set through the keyboard 4 is a play/record mode or an edit mode (step 3-1). When the mode is the edit mode, the CPU 1 determines in step 3-2 a track and a point to be edited and how to edit (for example, shifting the timing of the sound recorded at a time-designated point, correcting or erasing the sound). The CPU 1 further generates control data based on the decision and stores the data in the RAM 3 (step 3-3), or executes various editing works before returning to step 3-1.

Though not described in detail, these editing works, which are executed under the control of the CPU 1, include programming of a read access point from the hard disk 12 with respect to the HD controller 11 and the DMA controller 10, transfer of the point to the RAM 3, various editions using the RAM 3, restorage of the edited digital audio data to the hard disk 12, and designation of the access point.

Figure 8:
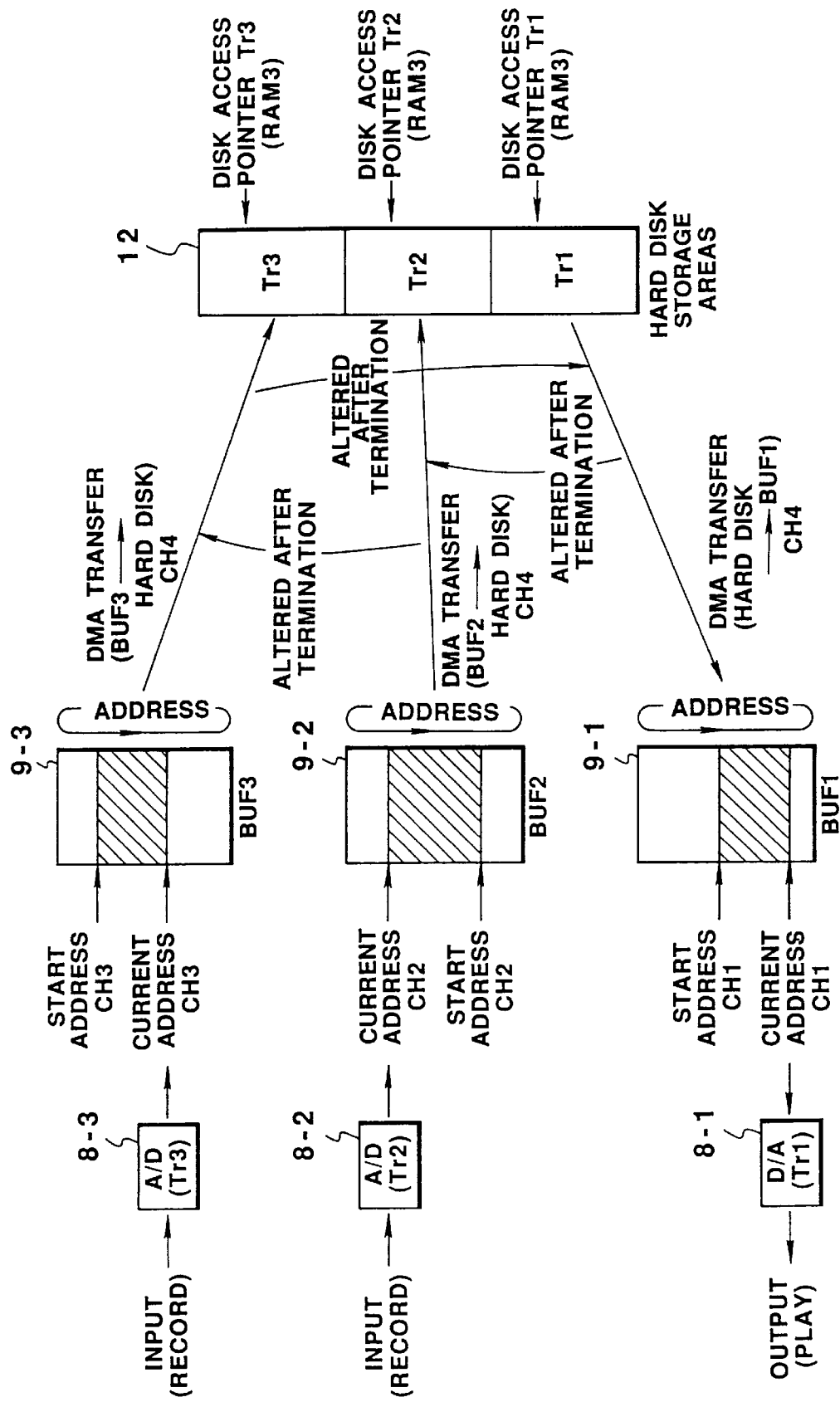
FIG. 8 is a schematic diagram illustrating the general operation of the first embodiment.

When the CPU 1 judges ill step 3-1 that the current mode is the play/record mode, the CPU 1 sets operation modes of the three tracks according to the input command from the keyboard 4 in step 3-4. In step 3-5, the CPU i sequentially sends the designation signal CS through the buffer 6 and the decoder 13 to the IOWR terminals of the audio I/O devices 8-1 to 8-3 to set up the I/O devices 8-1 to 8-3 to perform either A/D or D/A conversion. In this case, for example, Tr1 is set in play mode (D/A conversion state), and Tr2 and Tr3 are set in record mode (A/D conversion state). FIG. 8 presents conceptual illustration of the schematic operation in modes set as above.

Also in step 3-5, the initial addresses of the buffers 9-1 to 9-3 for Tr1 to Tr3 are set in the DMA controller 10. More specifically, the CPU 1 sets initial setup data to the registers which correspond to the channels CH1 to CH3 (those in the address register 104 and control register 105) through the data buffer 106 while permitting the address buffer 101, the register selector 103 and the channel selector 109 to designate the registers.

The buffers 9-1 to 9-3 are cyclically used to serve as the ring buffers. The start addresses and the current addresses of each of the individual buffers 9-1 to 9-3 are set to coincide with each other in the initialization. (FIG. 8 illustrates as a model that the start and current addresses of the individual buffers 9-1 to 9-3 are stored in those areas of the address register 104 which are associated with the respective is CH1 to CH3.)

The operation of CPU 1 moves to step 3-6, and initializes disk access pointers corresponding to the respective tracks Tr1–Tr3 of the hard disk 12 in the work memory area of the RAM 3. (FIG. 8 shows the relation between the storage area of the hard disk 12 and the disk access pointers.)

The CPU 1 then starts A/D conversion or D/A conversion in the audio I/O devices 8-1 through 8-3 (step 3-7). The CPU 1 then issues a software interrupt in step 3-8 to execute the same process as is performed when the HD controller 11 makes a program request for the data transfer between the hard disk 12 and one of the buffers 9-1 through 9-3, i.e., when the controller 11 applies the interrupt INT to the CPU 1, as will be described later.

More specifically, the operation according to the flow chart shown in FIG. 4 will be executed in step 3-8. For example, for DMA transfer of the digital audio data from the hard disk 12 to the buffer 9-1, the CPU 1 determines the channel, CH1, corresponding to Tri as the channel of the DMA controller 10 (step 4-1).

Then, the CPU 1 copies the start address of CH1 (initialized in step 3-5 as described above) as that of CH4 (step 4-2). The operation of the DMA controller 10 in this case will be described later. The CPU 1 calculates the number of data transfers referring to the start address and the current address of CH1 (step 4-3). Since it is in the initial state in this case, data has not been transferred yet to the Tr1 in the buffer 9-1. Therefore, data can be transferred to the entire memory area of the buffer 9-1 from the hard disk 12. When multiple tracks are in play mode, digital audio data stored in advance should be transferred promptly from the hard disk 12 to those buffers so that the data may not be sent full to one buffer, but DMA transfer may be performed sequentially with respect to each track. Alternatively, data may be transferred full in advance from the hard disk 12 to the required buffer 9-1, 9-2 or 9-3, then the play/record operation may be started in synchronism with the data transfer.

In step 4-4, the CPU 1 copies the content of the current address of the CH1 to the start address. The initial address will therefore be the start address in this case.

After the CPU 1 has performed each setup/control on the DMA controller 10 in steps 4-1 through 4-4 as described above, the CPU 1 reads the disk access pointer of the Tr1 from the work memory of the RAM 3 in step 4-5. In the next step 4-6, the CPU 1 programs the HD controller 11 in accordance with the operation mode (play mode in this case) of the Tr1, the disk access pointer for the Tr1 and the number of data transfers from the hard disk 12 to the buffer 9-1, determined in step 4-3. The operation mode is determined depending on the contents of the area of the CH1 of the control register 105 in the DMA controller 10. The operation of the HD controller 11 will be described in detail later, As a result, the HD controller 11 makes a request (outputs DREQ) to the DMA controller 10 to perform the DMA transfer from the hard disk 12 to the buffer 9-1. The DMA controller 10 will execute DMA transfer as requested. This operation will also be described later.

In step 4-7, the CPU 1 updates the disk access pointer of the Tr1 in the work area of the RAM 3 to a value to which the pointer will come after execution of the above transfer. As explained above, from now on, the DMA controller 10 executes all the data transfers between the hard disk 12 and the buffer 9-1. When the DMA transfer is completed, the CPU 1 sets a value which the disk access pointer of the hard disk 12 will take in step 4-7. Then, the flow returns to the main routine in FIG. 3.

As will be apparent from the later description, when the first interrupt routine in FIG. 4 is performed, and the HD controller 11 is activated once, the HD controller 11 issues the interrupt (to send the INT signal to the CPU 1) whenever transfer of the data block designated by the CPU 1 is completed, so that what the CPU 1 does is only to judge if the record/play operation is terminated, if the key input is made, or if the trigger indicated in the control data is initiated.

The CPU 1 refers to the disk access pointer of the RAM 3 in step 3-9, and judges in step 3-10 whether or not the memory area is over or the record/play operation is terminated. When the decision is affirmative (YES), the CPU 1 stops A/D or D/A conversion in the audio I/O devices 8-1 through 8-3 in step 3-11. When the memory area is not over, the CPU 1 checks the control data and the key input state in step 3-12. If no change has been found, the CPU 1 returns to step 3-9 to check the disk access pointer, and repeats steps 3-9 through 3-13.

When there is some change found in step 3-12, the process of the CPU 1 moves from step 3-13 to step 3-14 and outputs the DMA end command (DMAEND) to the DMA controller 10 for new setting. Then, according to a new input command or the like, the CPU 1 programs the DMA controller 10 and the audio I/O devices 8-1 through 8-3 (step 3-15), and advances to step 3-16 to restart the DMA operation. The CPU 1 returns to step 3-9 after executing the routine in FIG. 4 as done in step 3-8.

In play/record mode, after the initialization in steps 3-4 through 3-8, the CPU 1 repetitively executes steps 3-9, 3-10, 3-12, 3-13, and steps 3-14 through 3-16. In response to the change command through the keyboard (e.g., a pauses (step of A/D or D/A conversion) or a punch-in/out (switching between A/D and D/A conversions) for a certain track) and a chance in the control data obtained in edit mode, the CPU 1 immediately ends the DMA transfer control, and then restarts the same operation after changing the program.

Operation of Audio I/O Devices 8-1 to 8-3

The operation of the audio I/O devices 8-1 through 8-3 will now be explained referring to FIG. 5. This flow chart may be realized by either microprogram control or hard logic control, and there are various types means available to accomplish the function.

It is determined in step 5-1 whether the signal CS to designate the audio I/O devices has been sent from the CPU 1, i.e., whether the signal is active. When the judgment in affirmative (YES), bled operation mode (record, play, stop or the like) is set by the CPU 1 in step 5-2. This process is to be executed in response to steps 3-5 and 3-15 in the main routine of the CPU 1 in FIG. 3.

When the decision in step 5-1 is negative (NO), it is determined in step 5-3 if the audio I/O devices 8-1 through 8-3 are in record or play mode. If it is the record mode, the sequence of processes in steps 5-4 through 5-9 will be executed, and if it is the play mode, the flow branches to step 5-10 for execution of the sequence of processes in steps 5-10 to 5-15.

A description will be given first of the operation of the audio I/O devices set to the record mode (audio I/O devices 8-2 and 8-3 in this case). It is determined in step 5-4 whether it is the sampling time. Step 5-4 will be repeated until the sampling time is arrived. The audio I/O devices may have hardware times respectively, and judge the sampling time from their outputs. Or a common hardware timer may be provided so that each audio I/O device can be driven according to the timer output. It is to be understood from the later description that the sampling frequencies of the individual audio I/O devices 8-1 through 8-3 may be set different from one another.

When the decision in step 5-4 is YES, the given analog audio signal undergoes sample-holding (S/H), and A/D conversion. The DMA transfer request DRQ is set active and output to the DMA controller 10.

Upon receiving the request signal DRQ, the DMA controller 10 outputs the response signal DAK to perform DMA transfer (the detail operation will be described later). When the judgment is YES in step 5-7, the flow goes to step 5-8 where the audio I/O device 8-1, 8-2 or 8-3 (the audio I/O device 8-2 or 8-3 in this case) sends the A/D-converted digital audio data via the data bus to the corresponding buffer 9-1, 9-2 or 9-3 (buffer 9-2 or 9-3 in this case). The DMA transfer request DRQ is then set inactive in step 5-9. Therefore, the voice I/O device 8-2 or 8-3 in this case converts the analog audio signal given from the outside to a digital audio signal, and transfers it to the current address of the buffer 9-2 or 9-3 which is designated by the DMA controller 10, as will be described later (see FIG. 8).

When the mode of the audio I/O device is judged to be the play mode in step 5-3, the flow moves to step 5-10 so that the DMA transfer request DRQ to the DMA controller 10 is set active. Upon receiving the response signal DAK from the controller 10 (step 5-11), the audio I/O device reads the digital audio data on the data bus in step 5-12, then sets the request DRQ inactive in step 5-13. As shown in FIG. 8, through the above operation, the content of the current address of the buffer 9-1 corresponding to the Tr1 (where the content of the Tr1 area of the hard disk 12 has been transferred and recorded) is set in the audio I/O device 8-1. The operation of the DMA controller 10 in this case will be described later. Then, it is determined in step 5-14 whether it is the sampling time. The sampling time is detected in the same manner as in step 5-4.

When it is the sampling time, D/A conversion and low-pass filtering are executed in step 5-15 and the analog audio signal is output to the outside.

The operations in record and play modes at a single sampling time have been described. After the process in step 5-9 or 5-15 is terminated, the flow returns to step 5-1 to sequentially perform processing at the sampling time in the same manner.

Figure 9:
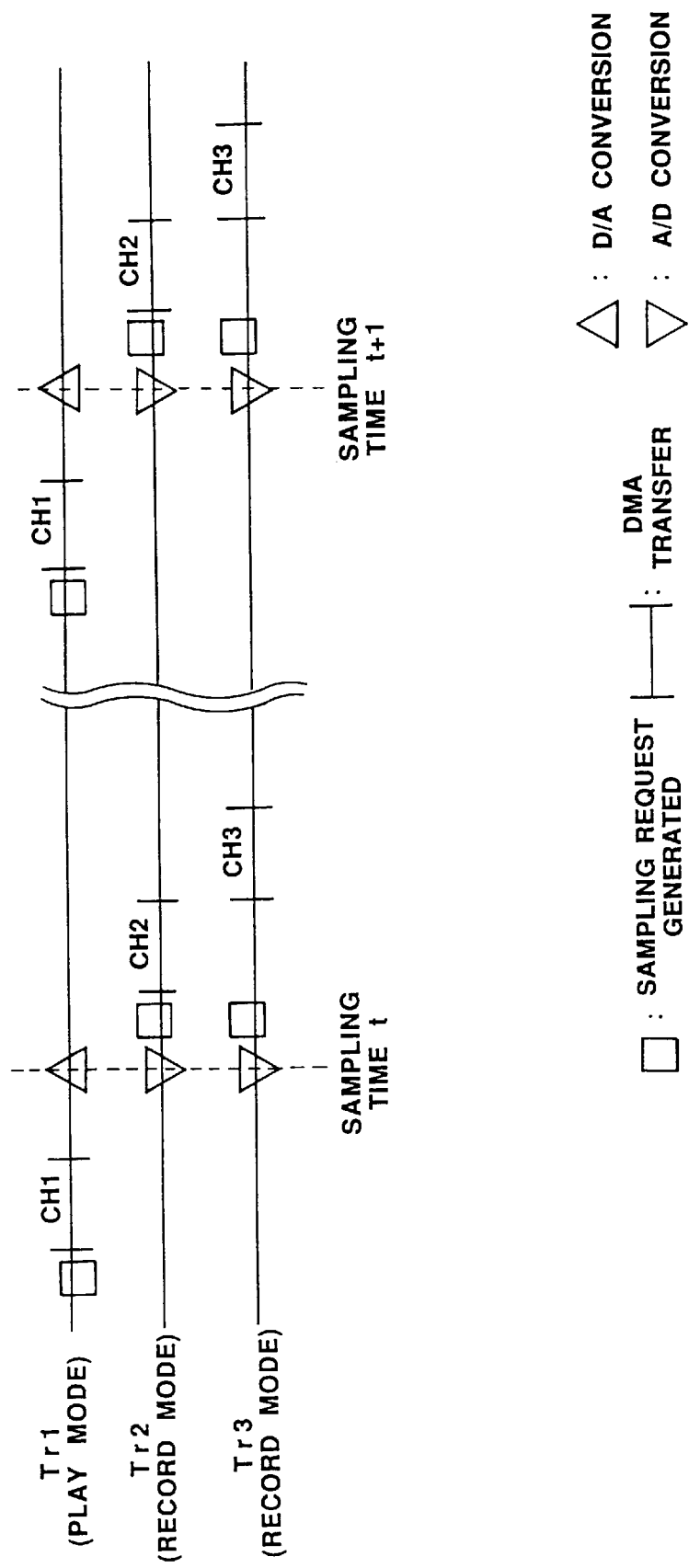
FIG. 9 is a time chart showing D/A and A/D conversions and a DMA transfer conducted by the DMA controller for each track.

FIG. 9 is a time chart of the operation of the audio I/O devices 8-1 through 8-3. In this chart, the audio I/O device 8-1 of the Tr1 is in play mode, and the sampling request DRQ is generated between sampling times t and t+1. Under the control of the channel CH1 the DMA controller 10, DMA transfer from the buffer 9-1 to the audio I/O device 8-1 is performed. Further in synchronism with sampling time t+1, D/A conversion is performed.

The audio I/O devices 8-2 and 8-3 of the respective Tr2 and Tr3 are in record mode. In synchronism with sampling time t or t+1, A/D conversion is performed, and then the DMA transfer command is output to the DMA controller 10. The DMA transfer is executed in the order of Tr2 and Tr3, because CH1>CH2>CH3>CH4 is the priority order when the DMA requests are simultaneously made. Thus, the data is to be transferred from the audio I/O device 8-2 or 8-3 to the buffer 9-2 or 9-3.

Operation of DMA Controller 10

The operation of the DMA controller 10 will be explained below referring to FIG. 6. The flow chart in FIG. 6 may illustrate that the service controller 108 in FIG. 2 is operated under the microprogram control, or that the function of the DMA controller 10 is realized by a hardware logic.

It is determined in step 6-1 whether the designation signal CS from the CPU 1 is received (active). When the signal is active, it is determined which signal, a read signal RD or a write signal WR, is received from the CPU 1. When the read signal RD is supplied, the flow advances to step 6-3. The contents of the registers 104 and 105, which are designated by the address signals provided through the address bus, are sent on the data bus so that the CPU 1 can read them. When the write signal WR is supplied, the flow moves to step 6-4 and the desired data is input to the designated register via the data bus. Steps 6-3 and 6-4 correspond to steps 3-5 and 3-15 in the main routine of the CPU 1. Therefore, in step 6-4 the desired data is to be set in the registers 104 and 105 in FIG. 2.

When the CPU 1 terminates the accessing to or the programming of the DMA controller 10, the designation signal CS becomes inactive and the flow moves from step 6-1 to step 6-5.

It is determined in step 6-5 if the DMA transfer requests DRQ1 to DRQ3 are supplied from the respective voice I/O devices 8-1 to 8-3, and if the DMA transfer request DREQ (DRQ4) is sent from the HD controller 11. When the request is sent from any of the components, the DMA enabling signal DMAENB is set to "1" (active) in step 6-6. Accordingly, only the DMA controller 10 uses the address bus and data bus in the DMA unit, disabling any access from the CPU 1.

When multiple requests are made, the DMA controller 10 selects a channel in step 6-7 in accordance with the priority order, from CH1 down to CH4. In FIG. 9, for example, though the data transfer requests are simultaneously made from the audio I/O devices 8-2 and 8-3 of the Tr2 and Tr3, since the Tr2 is given priority over Tr1, the DMA transfer of the CH2 is performed first. As apparent from the later description, since the CH4 has the lowest priority, if a data transfer request is made from any of the audio I/O devices 8-1 to 8-3 when data transfer between the hard disk 12 and one of the buffers 9-1 through 9-3 is in progress, the data transfer to the audio I/O device will he carried out by priority.

The DMA controller 10 outputs the current address (the content of the current address register of CH2 of the address register 104) of the selected channel (e.g., CH2) (step 6-8). Referring to the content of the control register 105 of the selected channel (e.g.. CH2), the DMA controller 10 determines in step 6-9 to which direction the DMA transfer should be performed. When the DMA controller 10 decides to transfer data from the buffers 9-1 to 9-3 to other components (I/O), the process of the DMA controller 10 moves from step 6-10 to step 6-11 to supply the read signal RD to the buffer selected among the buffers 9-1 through 9-3. When the data is to be transferred from other components (I/O) to the buffers 9-1 through 9-3, the process of the DMA controller 10 advances to step 6-12 to send a write signal WR to those buffers.

Then, the response signal DAK is rendered active in step 6-13. As a result, the audio I/O device 8-2 for the Tr2 sends audio data, which is after sampled in steps 5-7 and 5-8 in FIG. 5, to the data bus, allowing the DMA controller 10 to write this data at the current address in the buffer 9-2, as shown in FIG. 8.

In step 6-14, since the data transfer has been terminated, the read signal RD or the write signal WR, and the response signal DAK are set inactive. In step 6-15, the DMA controller 10 increments the content of the current address (in the address register 104 in FIG. 2) of the channel (CH2 in this case) by one. The current address is to be increased by this process of step 6-15, each time new sampled audio data is written into or read from the buffers 9-1 through 9-3. The flow then returns to step 6-1.

In the aforementioned case (referring to FIG. 9), the audio I/O devices 8-2 and 8-3 of the Tr2 and Tr3 have sent data transfer requests to the DMA controller 10. Since data transfer has been performed only in the Tr2, the DMA controller 10 judges in step 6-5 that more than one request are active. Through steps 6-7 to 6-10 and 6-12 to 6-15, the data transfer in the Tr3 is conducted from the audio I/O device 8-3 to the buffer 9-3 in the sane manner as above.

After the data transfer is completed, the flow moves from step 6-5 to step 6-15 to set the DMA enabling signal to "0" (inactive) and disable the DMA controller 10 to exclusively use the data bus and address bus in the DMA unit by itself, allowing the CPU 1 to access these buses.

With regard to the Tr2 and Tr3, the description of data transfer from the audio I/O devices 8-2 and 8-3 to the respective buffers 9-2 and 9-3 has been given. With respect to the Tr1, on the other hand, data is transferred from the buffer 9-1 to the audio I/O device 8-1 by the DMA controller 10.

Figure 5:
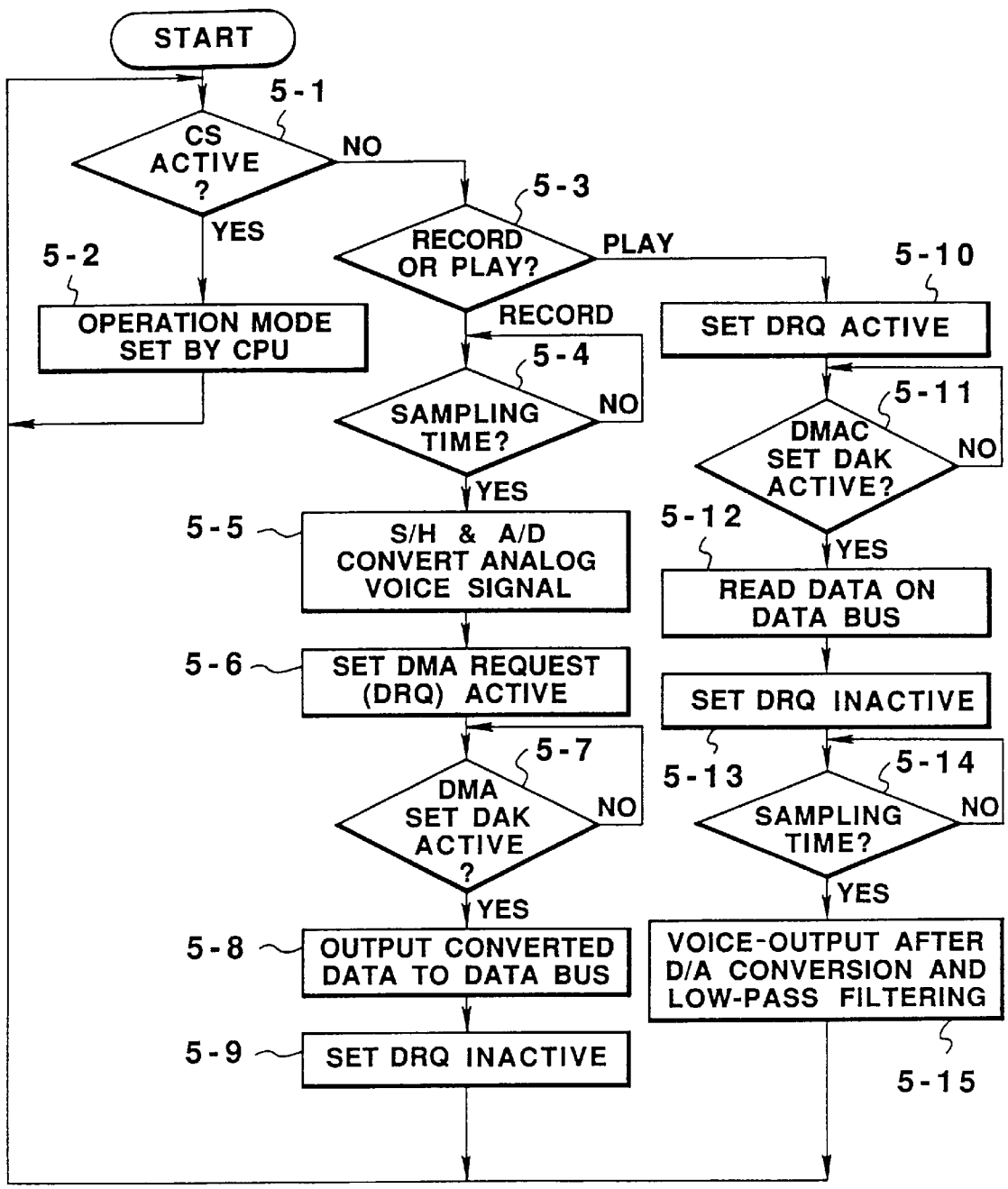
FIG. 5 is a diagram showing the operation of a voice signal I/O device in FIG. 1.

As shown in FIG. 9, the audio I/O device 8-1 corresponding to the Tr1 outputs the request signal DRQ to the DMA controller 10 between sampling times t and t+1 (see step 5-10 in FIG. 5).

In response to this signal, the DMA controller 10 executes steps 6-5 to 6-7 as done above, and supplies address data, indicating the address which should be read from the buffer 9-1, through the address data to the audio I/O device 8-1 in step 6-8. The process of the DMA controller 10 moves to step 6-11 through steps 6-9 and 6-10 to send the read signal RD to the buffer 9-1, and sets the response signal DAK to "1" in step 6-13.

As a result, digital audio data at the designated address in the buffer 9-1 is transferred through the data bus to the audio I/O device 8-1 of the Tr1 to be written therein. The flow returns to step 6-1 after steps 6-14 and 6-15 are executed.

The DMA controller 10 also transfers data between the hard disk 12 and the buffers 9-1 to 9-3. The address register 104 and the control register 105 in the channel CH4 are used for this operation. This data transfer is carried out after steps 4-1 to 4-4 in the interrupt routine of the CPU 1 in FIG. 4 is executed to set and control the DMA controller 10 and steps 4-5 and 4-6 to program the HD controller 11.

In response to steps 4-1 to 4-4 where the CPU 1 sets up and controls the DMA controller 10, the DMA controller 10 executes steps 6-3 and 6-4. The CPU 1 decides a track for data transfer through the channel CH4. The CPU 1 then sets the start address of the buffer corresponding to that track (i.e., address next to the block data previously transferred between the buffer and the hard disk 12) in the start address register of the CH4 (the address register 104 in FIG. 2). The CPU 1 acquires the number of data transfers executed to the track this time from the difference between the start address and the current address (address incremented after the data transfer has been previously conducted between the buffer and the hard disk 12). Further, the CPU 1 copies the current address of the track to the start address.

The CPU 1 transfers data between the buffer 9-1, 9-2 or 9-3, corresponding to the track in operation, and the hard disk 12 sequentially track by track. The data transfer following the previous data transfer (block transfer) is to be performed for each track. According to the example shown in FIG. 8, transferred from the hard disk 12 with respect to the Tr1 is data which corresponds to the shaded portion between the start address (CH1) and the current address (CH1) in FIG. 8. (It is apparent that the same operation is made to other tracks though the direction of the data transfer is reversed.) In the buffer 9-1 in play mode, the shaded portion corresponds to the audio data which has already been output, while the shaded portion of the buffer 9-2 or 9-3 in record mode corresponds to the data which has been received.

The CPU 1 programs the HD controller 11 in steps 4-5 and 4-6, allowing the HD controller 11 to issue an actual transfer request and start DMA transfer.

When the DMA controller 10 detects the transfer request from the HD controller 11 in step 6-5, the controller 10 executes the sequence of process in steps 6-6 through 6-9, then determines in step 6-10 whether the request is to transfer data from the buffers 9-1 to 9-3 to the hard disk 12 or in the opposite direction. When the request is for the former direction, the flow moves to step 6-11. When the request is for the latter direction, the flow advances to step 6-12 after which steps 6-13 to 6-15 are to be executed. At this time, since digital audio data for one sample is transferred by a signal transfer operation, the block transfer is executed by repeating the processes in steps 6-5 to 6-15 several times. The data transfer between the hard disk 12 and buffers 9-1 and 9-3 will be further described later because the operation of the HD controller 11 is involved greatly.

When the DMA transfer is completed, the transfer requests DRQ1–DRQ4 will not be sent forth, and the flow advances to step 6-16 from step 6-5 to set the DMA enable signal DMAENB to "0" (inactive).

Operation of HD Controller 11

The operation of the HD controller 11 will now be explained referring to FIG. 7. The HD controller 11 may be realized by either a hardware logic or microprogram control; in either case, the operational flow in FIG. 7 can be accomplished.

First, it is determined whether or not the designation signal CS has been given from the CPU 1 (step 7-1); this signal is applied by the interrupt routine of the CPU 1 (steps 4-5 and 4-6 in FIG. 4). If the decision is negative (NO), the flow returns to step 7-1 again, but if the decision is positive (YES), the flow goes to step 7-2. In this step 7-2, it is determined whether the read signal RD or the write signal WD is sent from the CPU 1. If it is the read signal RD, the designated data in the HD controller 11 (the content of the address register or the like) is sent through the data bus to the CPU 1.

If the write signal WR has been given from the CPU 1, the flow moves from step 7-2 to step 7-4 to set the direction of DMA transfer between buffer and hard disk 12 which are the present targets for DMA transfer to be conducted by the channel CH4 of the DMA controller 10. In the next step 7-5, the access point of the hard disk 12 to be accessed is set by the access pointer (step 4-5 in FIG. 4) for the track which the CPU 1 has acquired from the RAM 3.

In the subsequent step 7-6, the number of transfer data (the number of digital audio data) is set in an internal counter of the HD controller 11. This number of transfer data is obtained in step 4-6 in the interrupt routine of the CPU 1.

As steps 7-4 to 7-6 are executed, the HD controller 11 is programmed under the control of the CPU 1. Then, the HD controller 11 requests the DMA controller to transfer data (step 7-7). It should be understood from the above that upon receipt of the interrupt signal INT from the HD controller 11, the CPU 1 executes the setup and control for the DMA transfer associated with the next track (in the order of the Tr1, Tr2, Tr3, Tr1, ... provided that the Tr1 to Tr3 are all presently enabled) in the DMA controller 10. Then, the CPU 1 leaves the control of the HD controller 11 and DMA controller 10, permitting these controllers to perform the DMA transfer through the mutual interaction.

The process of the HD controller 11 moves from step 7-7 to 7-8, and repeats step 7-8 until the HD controller 11 receives the response signal DACK (DAK4) from the DMA controller 10.

When the judgment in step 7-8 is affirmative (YES), the flow advances to step 7-9 where digital audio data of one sample is transferred by the CH4 of the DMA controller 10 to decrement the transfer counter set in step 7-6 by "1" (step 7-10). According to the content of the transfer counter, it is determined in step 7-11 whether transfer of a preset number of data has been completed. When the judgment is negative (NO), the flow returns to step 7-8. Therefore, the DMA controller 10 continues receiving the transfer request DRQ4 until the transfer of the present amount of data (block transfer) from the HD controller 11 is completed. In response to the transfer request, the DMA controller 10 executes steps 6-5 to 6-15 while HD controller 11 performs steps 7-8 to 7-11.

When it is judged in step 7-11 that data transfer has been done, the flow moves to step 7-12 where the data transfer request DREQ (DRQ4) from the HD controller 11 to the DMA controller 10 is set to "0" (inactive). The HD controller 11 sends the interrupt signal INT to the CPU 1 to transfer data for the next track between the hard disk 12 and one of the buffers 9-1 to 9-3 (step 7-13). In response to this interrupt signal, the CPU 1 executes the interrupt routine shown in FIG. 4, as already described above.

Operation of Data Transfer Between Hard Disk 12 and Buffers 9-1 to 9-3

As data transfer between the hard disk 12 and the buffers 9-1 to 9-3 should be understood by now through the above explanation, a description will now be given of how the DMA request is made to the DMA controller 10 and how the DMA controller 10 responds to the request in a time-shared manner, referring to FIGS. 8 and 10.

As already explained, the Tr1 is set in play mode and the Tr2 and Tr3 are rendered in record mode in FIG. 8. Every sampling time (fs in FIG. 10), the audio I/O devices 8-1 to 8-3 for the respective tracks request the DMA controller 10 to transfer data between the hard disk 12 and the buffers 9-1 to 9-3.

Figure 6:
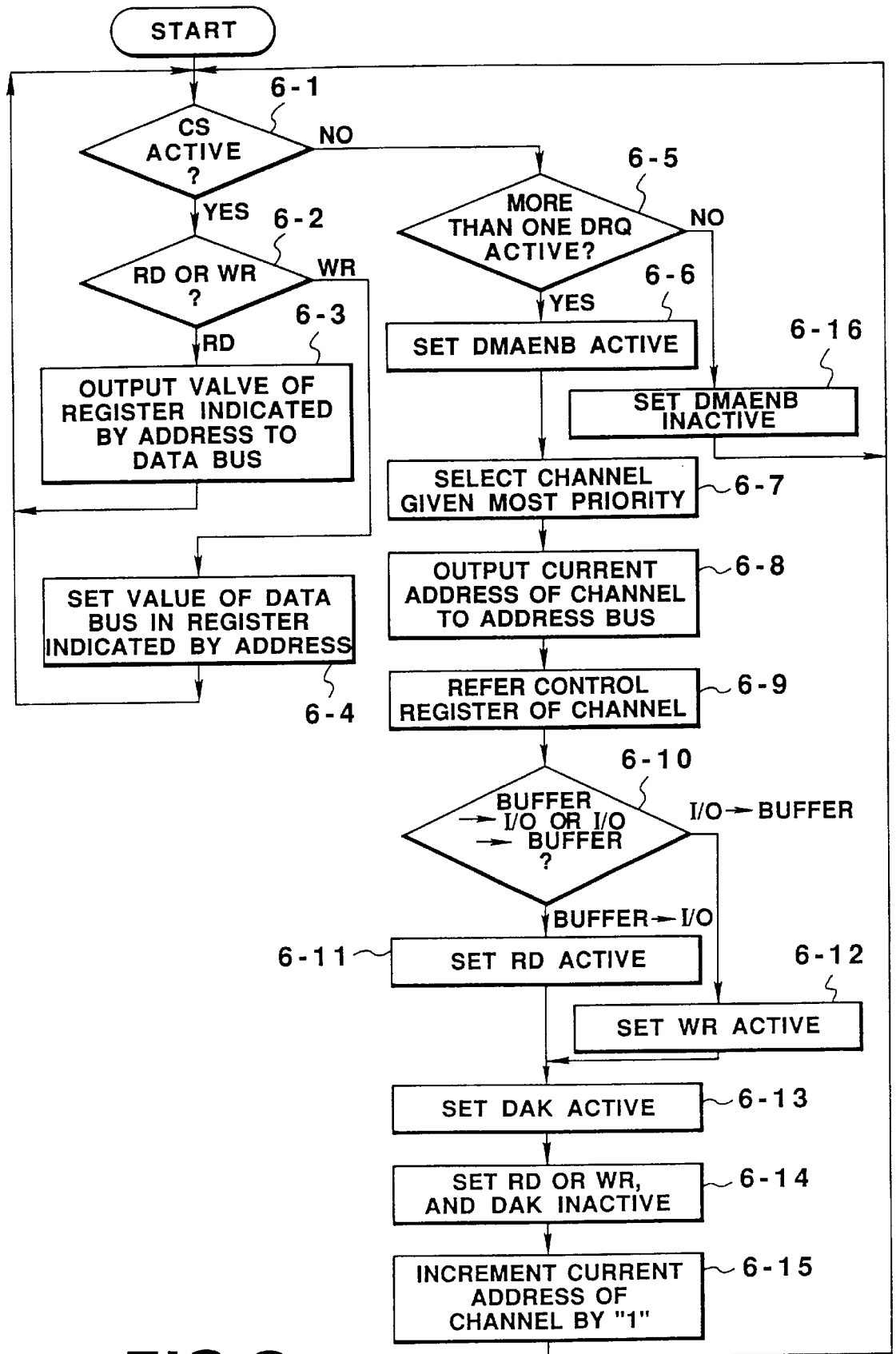
FIG. 6 is a diagram illustrating the operation of the DMA controller in FIG. 1.
Figure 7:
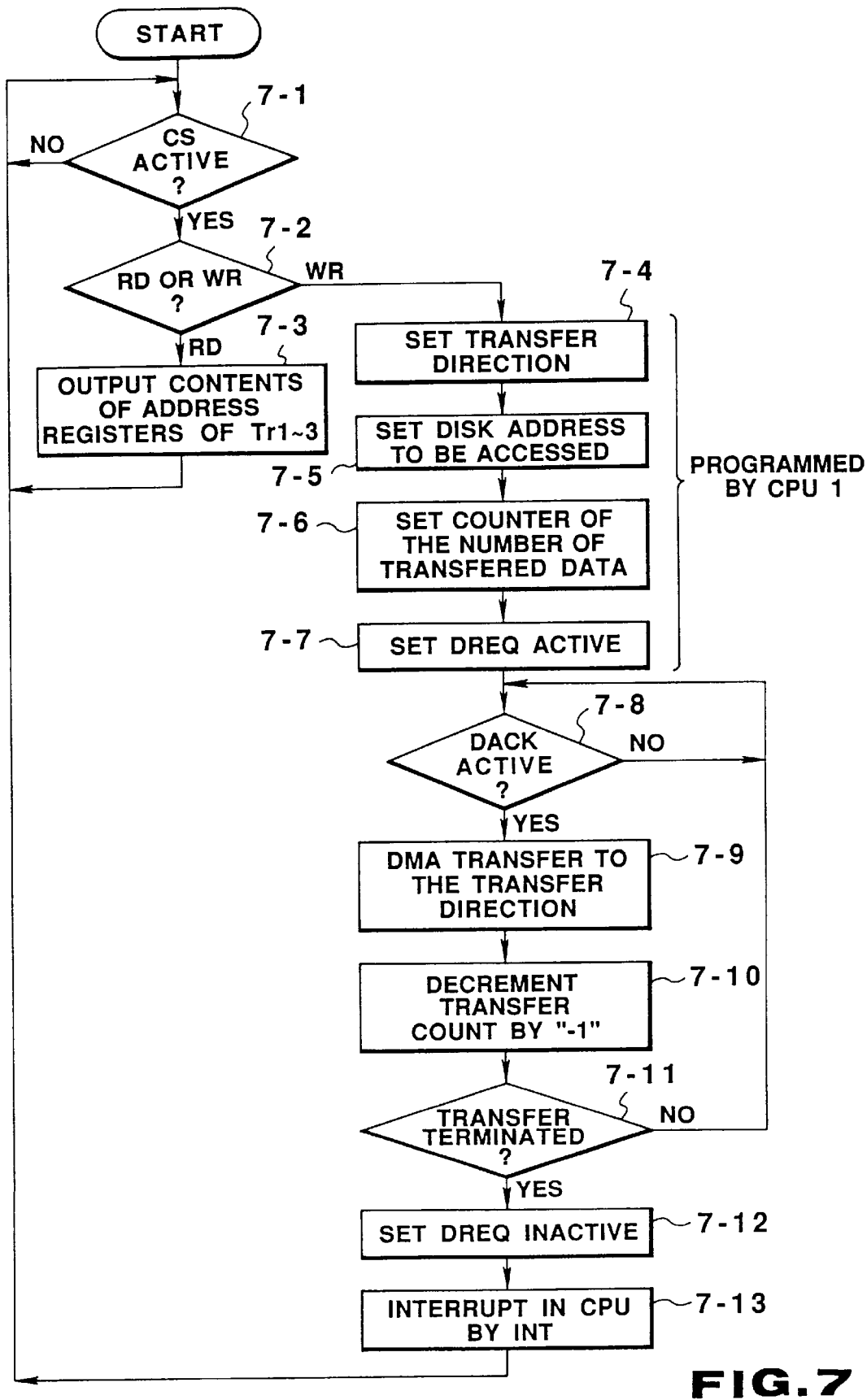
FIG. 7 is a diagram showing the operation of an HD controller in FIG. 1.

This request is made while the CPU 1 is programming the HD controller 11 (steps 4-5 and 4-6 in FIG. 4 and steps 7-4 to 7-7 in FIG. 7). Upon reception of the data transfer requests from the audio I/O devices 8-1 to 8-3, the DMA controller 10 outputs the DMA=enabling signal DMAENB as described above (step 6-6 in FIG. 6), disables the CPU 1 to program the HD controller 11 (WAIT), and then allows the CPU 1 to restart the programming after the DMA transfer by the channels CH1 to CH3 is completed.

Figure 10:
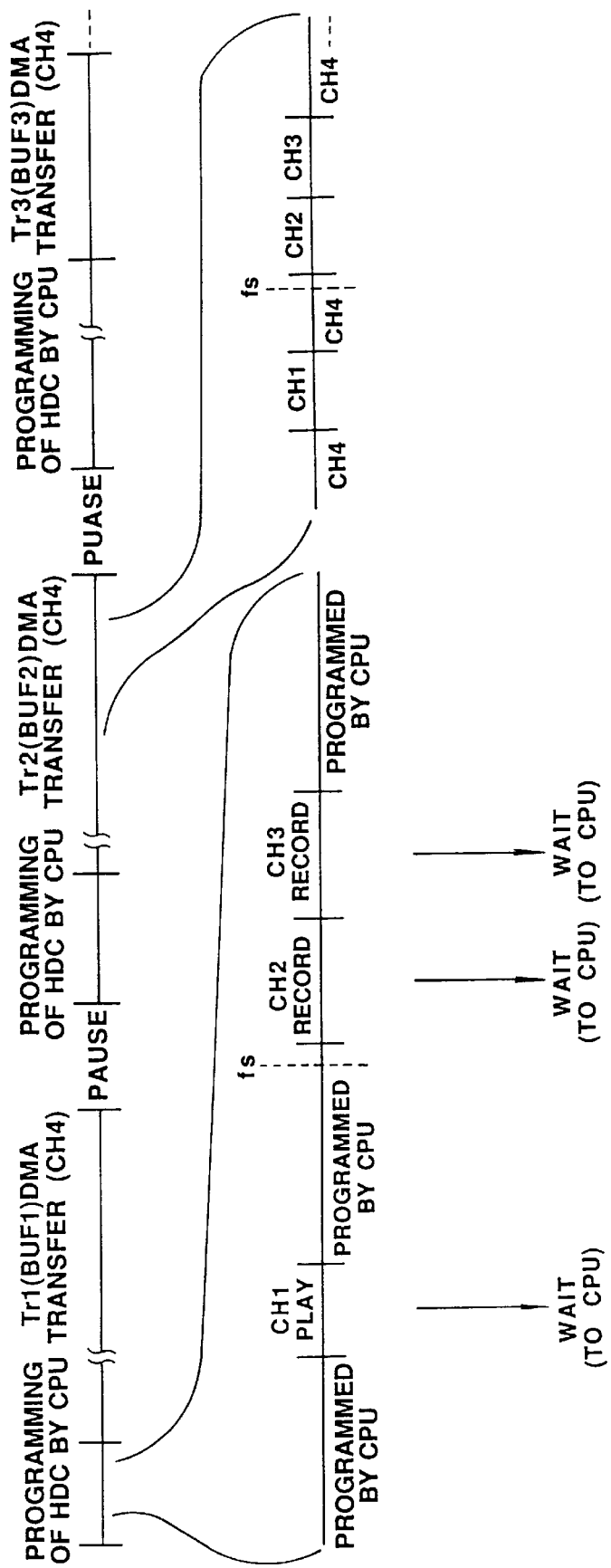
FIG. 10 is a time chart representing the DMA transfer between a hard disk and individual buffers.

While data transfer between the hard disk 12 and the buffers 9-1 to 9-3 is performed by the DMA transfer through the channel CH4, data transfer requests are supplied from the audio I/O devices 8-1 to 8-3 for every sampling time (fs in FIG. 10).

The DMA controller 10 this time transfers data of the channel (CH1 to CH3) which is given higher priority over the others based on the judgment made in step 6-7 in FIG. 6. Since the HD controller 11, though it keeps sending the data transfer request DRQ4 to the DMA controller 10, does not receive any response signal DAK4 from the DMA controller 10 (see step 7-7 in FIG. 7), the HD controller 11 has to wait for the next data transfer, i.e., step 7-8 is repeated.

Therefore, macroscopically, the DMA controller 10 repeats DMA transfer (block transfer) between the hard disk 12 and the buffers 9-1 to 9-3 for the Tr1, Tr2 and Tr3 as shown in FIG. 10. Microscopically, however, even during programming of the HD controller 11, the actual DMA transfer (by CH4) or a pause (idling), the DMA controller 10 executes DMA transfer (single transfer0 between the buffers 9-1 to 9-3 and the audio I/O devices 8-1 to 8-3 for the individual channels CH1 to CH3 for each sampling timing. The DMA controller 10 is also designed to sufficiently deal with high-speed A/D or D/A conversion.

Other Structural Example

One embodiment according to the present invention has been described in detail, but this invention may be modified in various manners and applied to various cases. One example is illustrated in FIG. 11.

Figure 11:
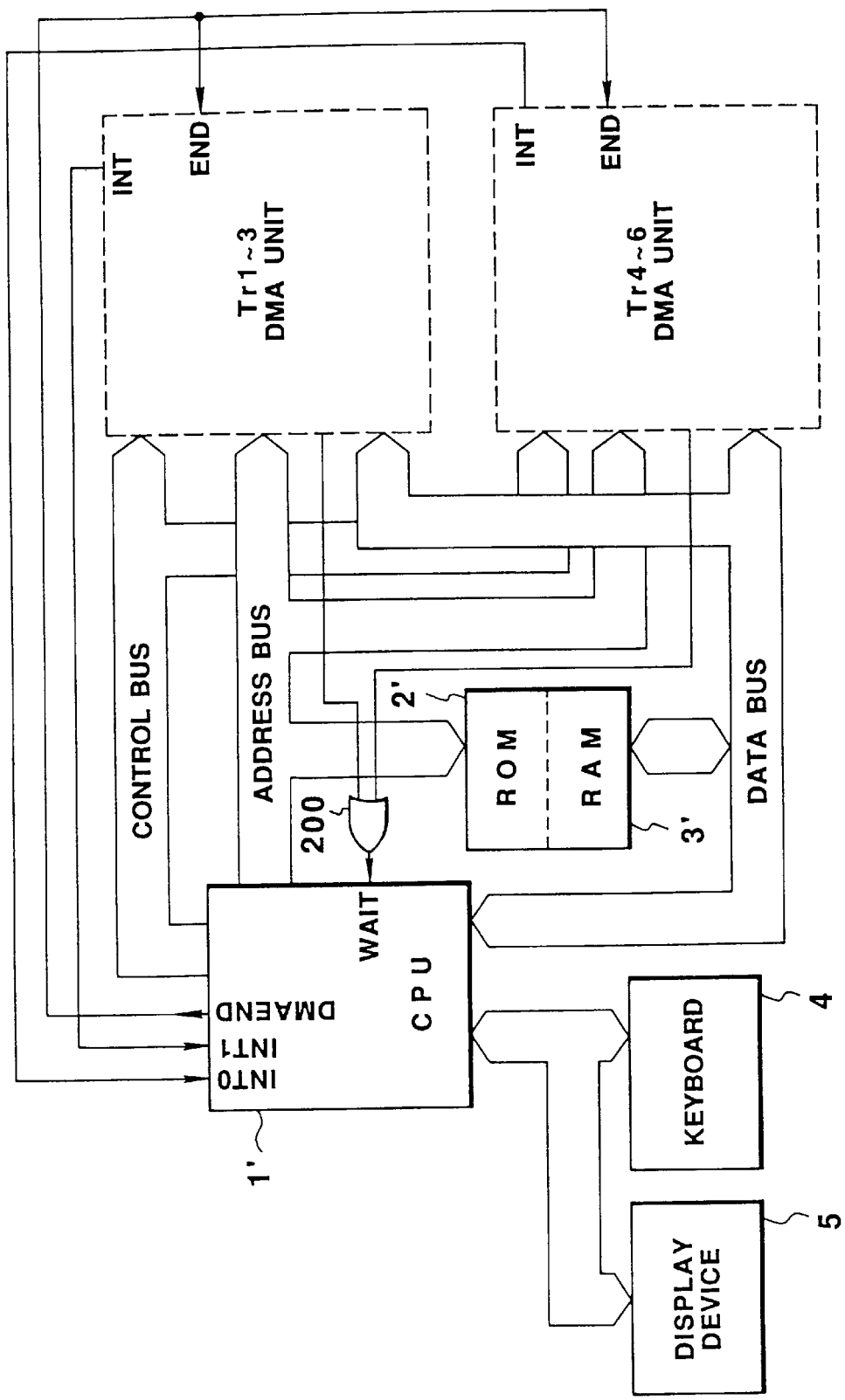
FIG. 11 is a block diagram illustrating a modification of the structure of FIG. 1.

FIG. 11 exemplifies a digital multi-track recorder of six tracks, which is provided with two DMA units of the above-described type, one for three tracks Tr1 to Tr3, and the other for three tracks Tr4 to Tr6, other words, the number of multi-tracks can be increased by additional provision of the DMA unit.

In FIG. 11, a CPU 1' is connected to every unit by the control bus, the address bus and the data bus to control and manage the six tracks. Both DMA units send the CPU 1' interrupt signals INT0 and INT1 indicating that the data transfer between the DMA units and the hard disk is terminated.

A ROM 2' and a RAM 3', like those in the first embodiment, store a program and data which are altered since the number of the tracks is doubled.

The CPU 1' receives through an OR gate 200 a signal from the DMA unit for the Tr1 to Tr3 and a signal from the DMA unit for the Tr4 to Tr6, both as a wait signal (WAIT).

A further description will not be given since the structure and functions of other components are the same as those in the first embodiment.

This invention may be applied to a digital multitrack recorder that has an audio I/O device, which inputs and outputs an audio signal at a fixed sampling rate, or the one that can change the sampling frequency of each audio I/O device. If the sampling frequency of the audio I/O device is altered depending on a note frequency (a sampling clock is to be generated by a VCO or a digital oscillator), the device itself will serve as a polyphonic sampler (sampling electronic musical instrument). In this case, the sampling clock of individual audio I/O device in reproduction mode (play mode) can be varied according to the operation to play music.

Setting different sampling frequencies for the respective tracks can ensure flexible track control such that a low sampling frequency is assigned to a track which does not need a high frequency, thus reducing the data capacity.

Further, this invention may be applied to a digital recorder for recording and reproducting a video signal or other signal digitally.

According to the above-described embodiment, the data transfer means executes transfer of digital audio data for each track between the audio input output means and the buffer means and transfer of digital audio data for each track between the buffer means and the external memory means in a time-shared manner while scheduling in accordance with a predetermined priority order. This design can simplify the overall structure.

The CPU can execute real-time input/output control simply by controlling the external memory means (for example, address control) without considering the timing. This reduces the load of the CPU, allowing for the use of a CPU which operates at a relatively low speed.

Second Embodiment

General Structure

Figure 12:
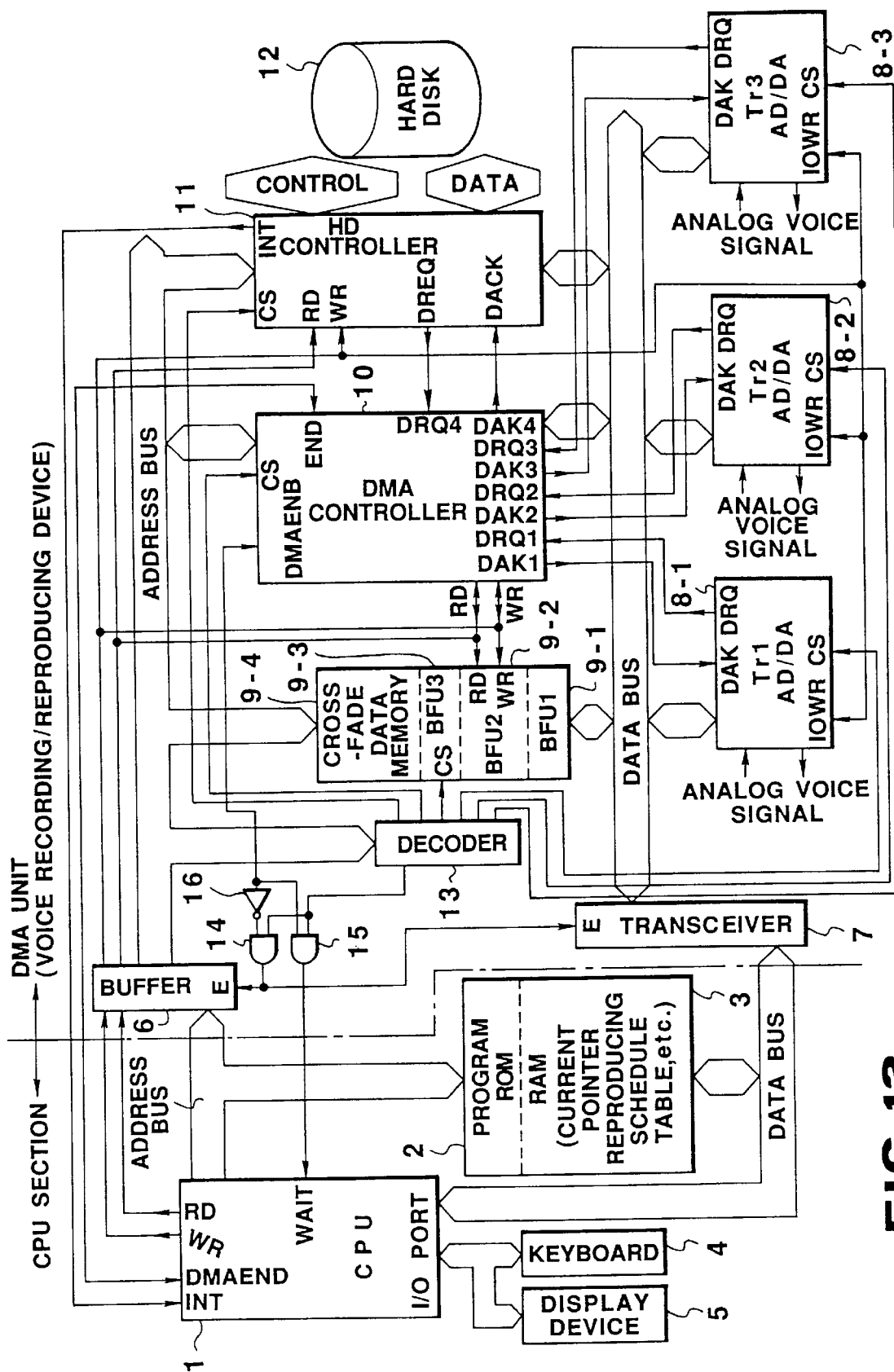
FIG. 12 is a diagram of the general structure of the second embodiment according to the present invention.

FIG. 12 illustrates the general structure of the second embodiment of the present invention. The description of those portions which have the same structure, and function in the same manner as the corresponding elements in the first embodiment will be omitted.

The RAM 3 in FIG. 12 includes an area for storing current pointers for three tracks, and an area for storing a reproduction schedule that indicates the order for reproduction of audio data and cross fade data. The current pointer includes type data (M or D) specifying memory means (a cross-fade data memory 9-4 to be described later or the hard disk 12) and data specifying the address of the memory means. That is, the current pointer is a pointer serving as both a disk access pointer and cross-fade data memory access pointer.

According to the second embodiment, the buffers 9-1, 9-2 and 9-3 and the cross-fade data memory 9-4 are provided in the same RAM respectively at addresses 0 to 9999, 10000 to 19999, 20000 to 29999, and 30000 to 39999, for example. The cross-fade data memory 9-4 is connected to the data bus and transceiver 7 to the CPU 1 to store cross fade data acquired through cross-fade processing of audio data executed by the CPU 1. Data transfer between the cross-fade data memory 9-4 and the buffers 9-1 to 9-3 is executed under the control of the DMA controller 10 (CH4) after the CPU 1 has programmed the DMA controller 10 via the address bus and buffer 6.

General Operation of CPU 1

As the main routine of the CPU 1 in the second embodiment is the same as the one for the first embodiment which has been explained referring to FIG. 3, its description will not be given below. It is to be noted, however, that in the second embodiment, in editing mode, the CPU 1 judges the cross fade time and volume curve in step 3-2, and stores the reproduction schedule table in the RAM 3 and executes various editions, such as preparation of cross fade data, in step 3-3 before returning to step 3-1. The preparation of cross fade data and the reproduction schedule table will be described in detail later referring to FIGS. 15 and 16, respectively.

Figure 13:
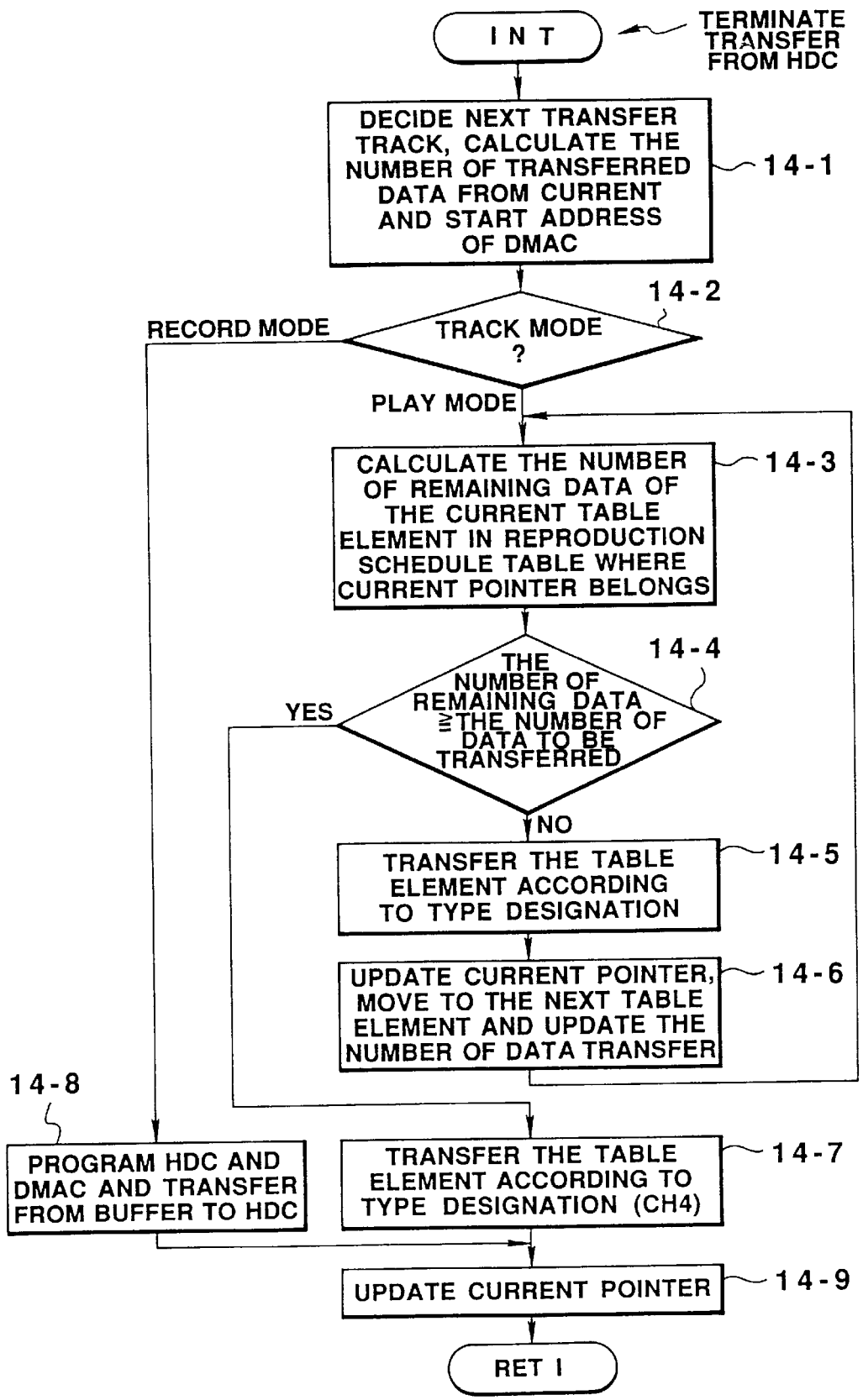
FIG. 13 is a flow chart representing an interrupt routine of the CPU in FIG. 12.

The interrupt routine which is executed when a software interrupt is issued, is as illustrated in FIG. 13. For example, for DMA transfer of digital audio data from the hard disk 12 to the buffer 9-1 or DMA transfer of cross fade data from the cross-fade data memory 9-4 to the buffer with respect to the Tr1, the CPU 1 determines the channel, CH1, corresponding to Tr1 as the channel of the DMA controller 10 (step 14-1). Further, the CPU 1 reads out the current address and start address from the CH1 area in the address register 104 of the DMA controller 10, and computes the number of data transferable from or to the buffer 9-1 (the volume of the data full area in the buffer 9-1 or the number of data transferable from the buffer 9-1 in record mode, and the volume of the free space in the buffer 9-1 or the number of data transferable to the buffer 9-1 in play mode) (step 14-1).

Then, it is judged whether the target track (track Tr1 in this case) is in record mode or play mode (step 14-2). If it is the record mode, the DMA controller 10 and the HD controller 11 are programmed to execute the data transfer from the buffer 9-1 to the HD controller 10 (step 14-8). More specifically, the programming of the DMA controller 10 is executed by copying the start address of the CH1 to the start address and current address of the CH4. The current address of the CH4 is incremented every time an unit amount of data is transferred to the HD controller 11 from the buffer 9-1. The programming of the HD controller 11 is executed in accordance with the current pointer of the Tr1, read out from the work memory in the RAM 3, the number of data transferable from the buffer 9-1 to the HD controller 11 calculated in step 14-1, and the mode (record mode) detected in step 14-2.

As a result, the HD controller 11 makes a request (output DREQ) to the DMA controller 10 to perform the DMA transfer from the buffer 9-1 to the hard disk 12 in this case.

The DMA controller 10 will execute the DMA transfer as requested. In the next step 14-9, the CPU 1 updates the current pointer to a value to which the pointer will come after execution of the above transfer. In other words, from now on, the DMA controller 10 executes all the data transfers between the hard disk 12 and the buffer 9-1. The CPU 1 sets the address of the hard disk 12, acquired when the DMA transfer is completed, to the current pointer.

If the mode is judged as the play mode in step 14-2 in FIG. 13, the CPU 1 calculates the number of remaining data of the present table element in the reproduction schedule table to which the current pointer in the RAM 3 belongs (step 14-3). The reproduction schedule table is generated for each track, and includes type data to distinguish the hard disk 12 from the cross-fade data memory 9-4 (D indicating the hard disk 12 while M indicates the cross-fade data memory 9-4), and a start address and an end address, which respectively specify the start and end of the area in in the memory means (disk 12 or memory 9-4) that should be reproduced. The reproduction schedule table is stored in the RAM 3 as described earlier. Each table element of this table includes a single piece of type data, one start address and one end address. In FIG. 16, the reproduction schedule table has five table elements.

The current pointer in the RAM 3 indicates the head of a data block in the hard disk 12 or cross-fade data memory 9-4, which is to be transferred next to the buffer 9-1, 9-2 or 9-3 (9-1 in this example), not the stored location of audio data presently reproduced by the audio I/O device 8-1, 8-2 or 8-3 (8-1 in this example). The current pointer has data (D or M) indicating the type of the memory means and address data, as described earlier. Assuming the value of the current pointer is "D49000," the table element to which this pointer belongs is the topmost table element in FIG. 16. In this case, the number of remaining data is

49899−(49000−1)=900.

In the next step 14-4, the previously acquired number of remaining data is compared with the number of transferable data calculated in step 14-1. If the number of transferable data is greater, data indicated by this table element is transferred to the buffer 9-1 in accordance with the type designation (D or M) in step 14-5. Assuming the value of the current pointer is "D49000" as mentioned above, the number of remaining data is "900" and the number of transferable data is "5000," then the audio data stored at 900 addresses starting with the address "49000" on the disk 12, which is indicated by the current pointer, is transferred to the buffer 9-1 because 900<5000.

The data transfer from the hard disk 12 to the buffer 9-1 is executed by programming the DMA controller 10 and the HD controller 11. The programming of the DMA controller 10 is executed by copying the start address of the CH1 to the start address and current address of the CH4. The current address of the CH4 is incremented every time an unit amount of data is transferred to the buffer 9-1 from the HD controller 11. The programming of the HD controller 11 is executed in accordance with the value of the current pointer (D49000 in this example), the number of the remaining data of the present table element, calculated in step 14-3, and the mode (play mode in this example) detected in step 14-2.

As a result, the HD controller 11 makes a request (outputs DREQ) to the DMA controller 10 to perform the DMA transfer from the hard disk 12 to the buffer 9-1. The DMA controller 10 will execute the DMA transfer as requested. In the next step 14-6, the CPU 1 updates the current pointer to a value to which the pointer will come after execution of the above transfer. In the above example (see FIG. 16). The current pointer is updated to "M3000" and the processing moves for the next table element (second table element from the top in FIG. 16). Then, the number of data transferable to the buffer 9-1 is also updated (to "4100" in this example).

The flow returns to step 14-3 again to calculate the number of remaining data of the present table element in the reproduction schedule table to which the current pointer belongs (the number will be from "M30000" to "M30199" or "200" in this example). In the next step 14-4, the number of remaining data, "200," is compared with the number of transferable data to the buffer 9-1, "4100." In this example, since the number of transferable data is greater, the data indicated by the present table element is transferred to the buffer 9-1 according to the type designation. (In this example, 200 pieces of cross fade data from the address "30000" to "30199" in the cross-fade data memory 9-4 is transferred.) This data transfer is executed by programming the DMA controller 10 using the current pointer and the number of remaining data. This programming sets the start address of the CH1 to the start address and current address of the CH4. When the current address is incremented by the number of remaining data, the data transfer from the cross-fade data memory 9-4 to the buffer 9-1 is completed. During the transfer conducted in step 14-6, the CPU 1 may execute the main routine shown in FIG. 3 and may return to the interrupt routine in FIG. 13 in response to the acknowledgement from the DMA controller 10 or HD controller 11 that the transfer has been completed. Upon completion of the data transfer, the current pointer is renewed to "D120100" (FIG. 16), and the number of transferable data is updated to "3900" (step 14-6).

The flow then returns to step 14-3 to compute the number of remaining data of the table element again. This time, since the number of remaining data is 19800=(139899−120100+1), greater than the number of transferable data "3900", the flow advances from step 14-4 to step 14-7 where 3900 pieces of data starting with the address 120100 on the hard disk 12 is transferred. The flow moves to step 14-9 where the current pointer is updated to "D124000" before returning to the main routine (see FIG. 3).

Data Transfer Between Hard Disk 12 and Buffers 9-1 to 9-3

Although the way of performing the data transfer between the hard disk 12 and the buffers 9-1 to 9-3 are the same as the one executed in the first embodiment, it will be described in detail referring to the drawings since the cross-fade processing is executed in the second embodiment.

Figure 14:
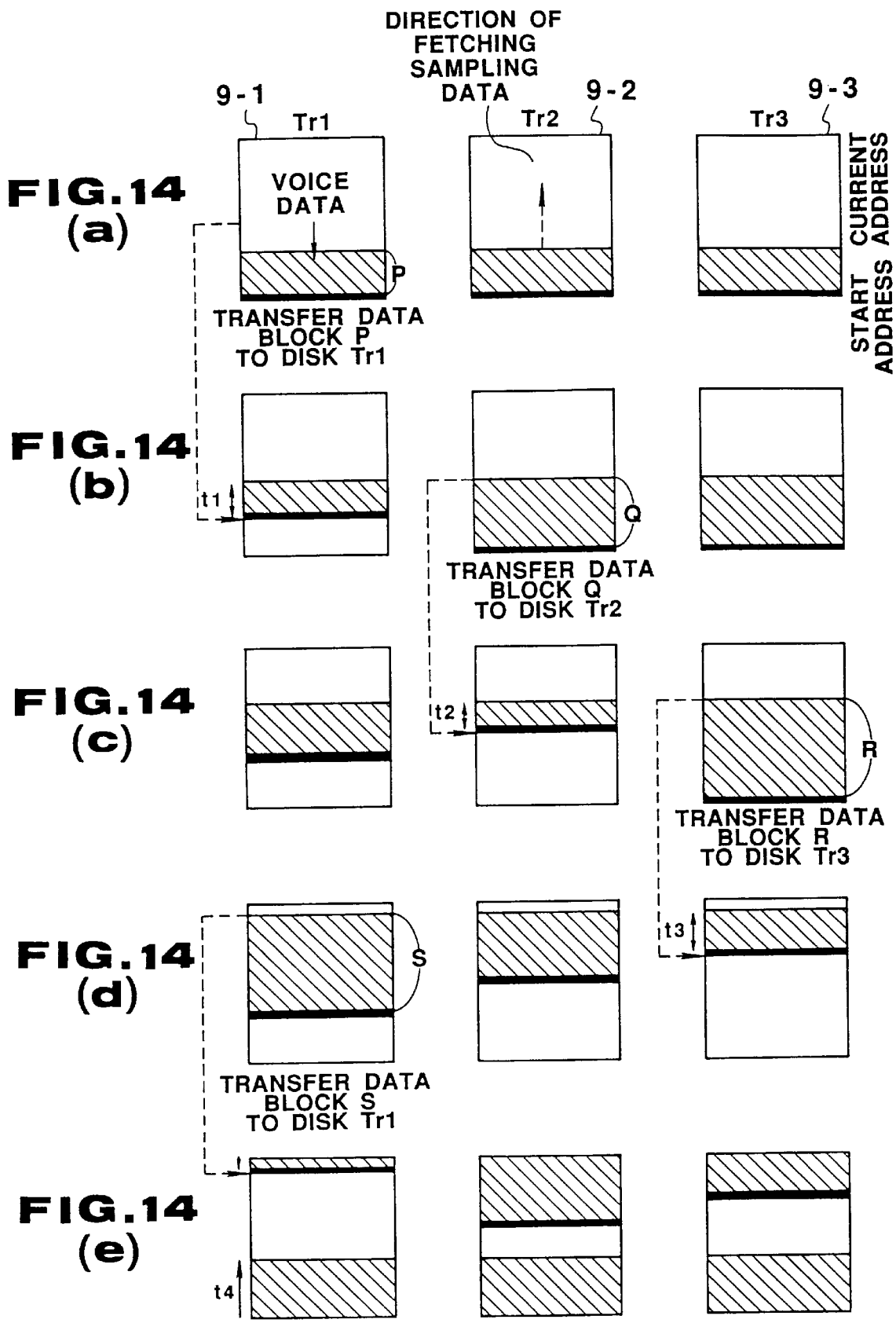
FIGS. 14(a) to 14(e) show schematic diagrams illustrating the operation of a buffer at the time a voice signal is recorded.

FIGS. 14(a) to 14(e) illustrate the operation of the buffers 9-1, 9-2 and 9-3 in record mode. Suppose that the audio I/O devices 8-1 to 8-3 are all in record mode and the same quantity of audio data is stored in the buffer 9-1 to 9-3 as shown in FIG. 14(a) (the audio data is assumed to be stored in the shaded area in the diagram). Since the priority order is Tr1>Tr2>Tr3, the data block P stored in the buffer 9-1 corresponding to the Tr1 is transferred first to the hard disk 12. When the transfer is completed, the current address of the buffer 9-1 becomes the start address as shown in FIG. 14(b), and storage of audio data starts again. Then, the data block Q stored in the buffer 9-2 corresponding to the Tr2 is transferred to the hard disk 12. When the transfer is completed, the current address of the buffer 9-2 becomes the start address as shown in FIG. 14(c), and storage of audio data starts again. Finally, the data block R stored in the buffer 9-3 corresponding to the Tr3 is transferred to the hard disk 12. When the transfer is completed, the current address of the buffer 9-1 becomes the start address as shown in FIG. 14(d), and storage of audio data starts again.

When the data transfers for the Tr1, Tr2 and Tr3 are completed in the above manner, the operation returns for the Tr1 to transfer data block S, which has been stored in the buffer 9-1 during the above period, to the hard disk 12.

Figure 15:
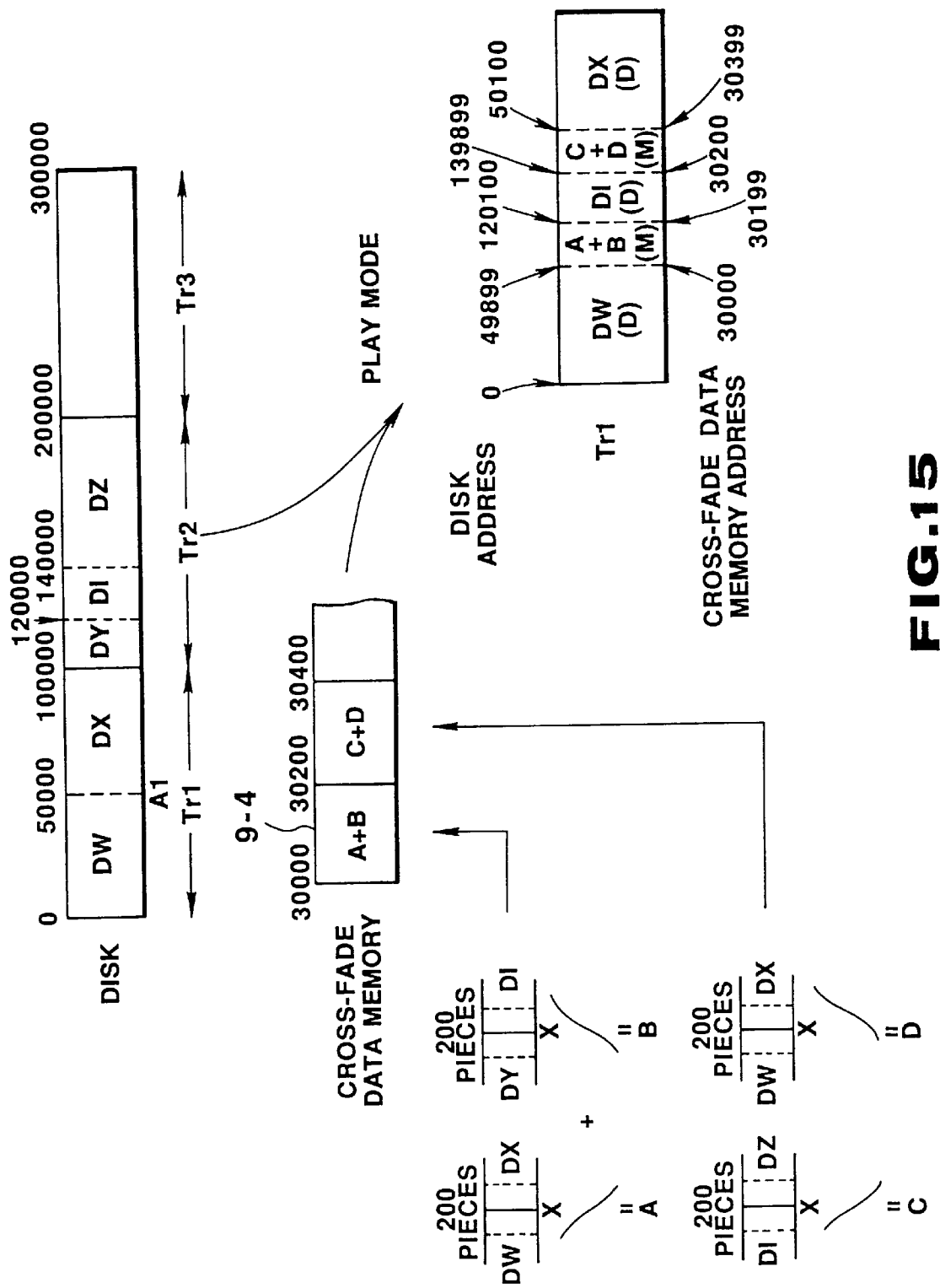
FIG. 15 is a diagram for explaining a cross fade operation.

FIG. 15 exemplifies the stored location of audio data in the hard disk 12, cross-fade processing of audio data, the stored location of cross-fade data in the memory 9-4, and the arrangement of those data in play mode. The hard disk 12 is so designed to store audio data DW at addresses 0 to 49999, audio data DX at addresses 50000 to 99999, audio data DY at addresses 100000 to 119999, audio data D1 at addresses 120000 to 139999 and audio data DZ at addresses 140000 to 199999. Addresses 0 to 99999, addresses 100000 to 199999 and addresses 200000 to 299999 respectively correspond to the Tr1, Tr2 and Tr3.

In the case where the audio data D1 is inserted between the audio data DW and DX and the resultant data is to be reproduced, cross fade data (A+B) between the audio data DW and D1 is acquired as follows. This processing is executed in steps 3-2 and 3-3 in FIG. 3. That is, the CPU 1 controls the HD controller 11 to read out the audio data DW stored at the addresses 49900 to 49999 and the audio data DX stored at the addresses 50000 mto 50099 from the hard disk 12, and multiplies these data by a coefficient of a gradually-decreasing volume curve, yielding audio data A. The CPU 1 also controls the HD controller 11 to read out the audio data DY stored at the addresses 119900 to 119999 and the audio data D1 stored at the addresses 120000 to 120099 from the hard disk 12, and multiplies these data by a coefficient of a gradually-increasing volume curve, yielding audio data B. The items of the audio data A and B are added data the resultant data is stored in the cross-fade data memory 9-4 at addresses 30000 to 30199.

The cross fade data (C+D) between the audio data D1 and DX is acquired as follows. The CPU 1 controls the HD controller 11 to read out the audio data D1 stored at the addresses 139900 to 139999 and the audio data DZ stored at addresses 140000 to 140099 from the hard disk 12, and multiplies these data by a coefficient of a gradually-decreasing volume curve, yielding audio data C. The CPU 1 also controls the HD controller 11 to read out the audio data DW stored at the addresses 49900 to 49999 and the audio data DX stored at the addresses 50000 to 50099 from the hard disk 12, and multiplies these items of data by a coefficient of a gradually-increasing volume curve, yielding audio data D. The result of addition of the data C and D is stored in the cross-fade data memory 9-4 at the addresses 30200 to 30399.

The audio data DW, D1 and DX and the cross fade data (A+B) and (C+D) will be reproduced in the order of DW, (A+B), D1, (C+D) and DX, as shown on the right side in FIG. 15. To realize the data reproduction in this order, the aforementioned reproduction schedule table shown in FIG. 16 is provided in the RAM 3 by the CPU 1.

Figure 17:
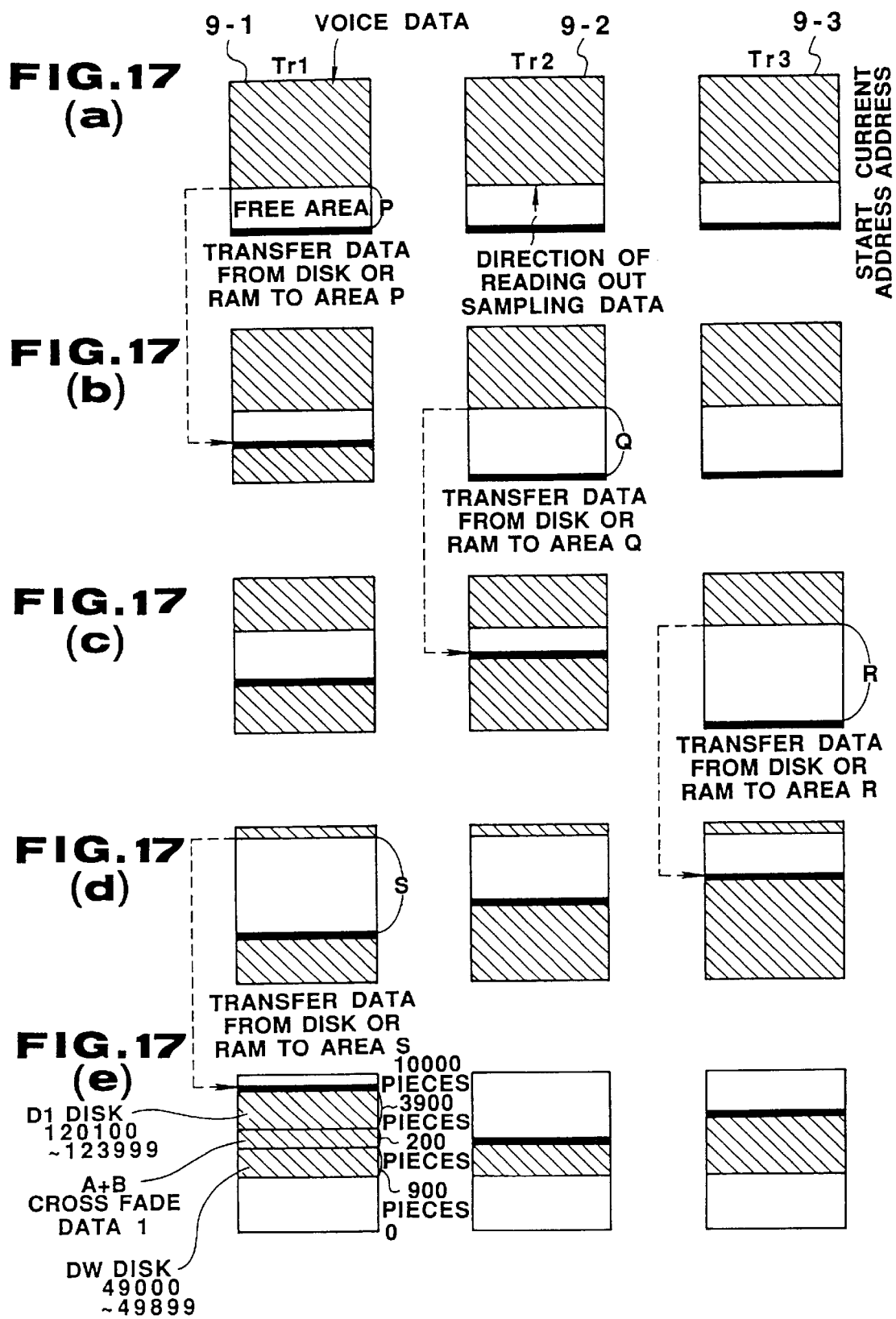
FIGS. 17(a) to 17(e) show schematic diagrams illustrating the operation of a buffer at the time a voice signal is reproduced.

FIGS. 17(a) to 17(e) illustrate the operation of the buffers 9-1, 9-2 and 9-3 in play mode. Suppose that the audio I/O devices 8-1 to 8-3 are all in play mode and free space exists at the same location in the buffers 9-1 to 9-3 due to the reproduction of the audio data, as shown in FIG. 17(a) (the audio data is assumed to be stored in the shaded area in the diagram). Since the priority order is Tr1>Tr2>Tr3, data is transferred to the hard disk 12 or cross-fade data memory 9-4 at the free space P in the buffer 9-1 corresponding to the Tr1. When the transfer is completed, the current address of the buffer 9-1 becomes the start address as shown in FIG. 17(b). During this period, the audio data having been already stored will be read out and transferred to the audio I/O device 8-1. Then, data is transferred to the hard disk 12 or cross-fade data memory 9-4 at the free space Q in the buffer 9-2 corresponding to the Tr2. When the transfer is completed, the current address of the buffer 9-2 becomes the start address as shown in FIG. 17(c). During this period also, the audio data having been already stored will be transferred to the audio I/O device 8-2. Then, data is transferred to the hard disk 12 or cross-fade data memory 9-4 at the free space R in the buffer 9-3 corresponding to the Tr3. When the transfer is completed, the current address of the buffer 9-3 becomes the start address as shown in FIG. 17(d). During this period, the audio data having been already stored will be transferred to the audio I/O device 8-3.

Suppose that the audio data stored at addresses 49000 to 49899 in the hard disk 12, the data (A+B) at addresses 30000 to 30199 in the cross-fade data memory 9-4 and the audio addresses 120100 to 123999 in the hard disk 12 are transferred in the named order to the free space S in the buffer 9-1 corresponding to the Tr1. This transfer operation will now be described referring to FIGS. 13, 15, 16 and 17.

First, the CPU 1 determines the channel CH1 corresponding to Tr1 as the channel of the DMA controller 10 (step 14-1 in FIG. 13). Further, the CPU 1 reads out the current address and start address from the CH1 area in the address register 104 of the DMA controller 10, and computes the number of data transferable to the buffer 9-1 or the amount of the free space S in the buffer 9-1 (step 14-1 in FIG. 13). In this example, the number of data transferable is "5000."

Then, it is judged whether the track Tr1 is in record mode or play mode (step 14-2 in FIG. 13). Since it is the play mode in this example, the CPU 1 calculates the number of remaining data of the present table element in the reproduction schedule table (FIG. 16) to which the current pointer in the RAM 3 belongs (step 14-3 in FIG. 13). Assuming the value of the current pointer is "D49000," the table element to which this pointer belongs is the topmost table element in FIG. 16. In this case, the number of remaining data is

49899−(49000−1)=900.

In the next step 14-4 (FIG. 13), the previously acquired number of remaining data, "900," is compared with the number of transferable data, "5000," calculated in step 14-1. As the latter value is greater than the former, the audio data DW stored at 900 addresses starting with the address "D49000" on the disk 12, which is indicated by the current pointer, is transferred to the buffer 9-1 (step 14-5 in FIG. 13).

The data transfer from the hard disk 12 to the buffer 9-1 is executed by programming the DMA controller 10 and the HD controller 11. The programming of the DMA controller 10 is executed by copying the start address of the CH1 (the start address of the space S shown in FIG. 17(d)) to the start address and current address of the CH4. The current address of the CH4 is incremented every time a unit amount of data is transferred to the buffer 9-1 from the HD controller 11. The programming of the HD controller 11 is executed in accordance with the value of the current pointer (D49000) in the RAM 3, the number of the remaining data of the present table element, "900," calculated in step 14-3 (FIG. 13), and the mode (play mode) detected in step 14-2.

As a result, the HD controller 11 makes a request (outputs DREQ) to the DMA controller 10 to perform the DMA transfer from the hard disk 12 to the buffer 9-1. The DMA controller 10 will execute the DMA transfer as requested. Subsequently, the CPU 1 updates the current pointer to a value (M30000) to which the pointer will come after execution of the above transfer. Accordingly, the processing moves for the second table element from the top in FIG. 16, and the number of transferable data is updated to "4100" (step 14-6 in FIG. 13).

The flow returns to step 14-3 again to calculate the number of remaining data of the present table element (second table element) in the reproduction schedule table to which the current pointer belongs. The number of remaining data here is 30199−(30000−1)=200. In the next step 14-4, the number of remaining data, "200", is compared with the number of transferable data to the buffer 9-1, "4100." Since the latter number is greater, the data (A+B) stored at addresses 30000 to 30199 in the cross-fade data memory 9-4 is transferred to the buffer 9-1 (step 14-5). This data transfer is executed by programming the DMA controller 10 using the current pointer and the number of remaining data. This programming sets the start address of the CH1 to the start address and current address of the CH4. When the current address is incremented by the number of remaining data, the data transfer from the cross-fade data memory 9-4 to the buffer 9-1 is completed.

Upon completion of the data transfer, the CPU 1 update the current pointer in the RAM 3 to "D120100" and the processing moves for the third table element from the top in the reproduction schedule table. Then, the number of data transferable to the buffer 9-1 is updated to "3900" (step 14-6).

The flow returns to step 14-3 again to calculate the number of remaining data of the third table element to which the current pointer (D120100) belongs. The number of remaining data here is "19800" from "D120100" to "D139899." In the subsequent step 14-4, the number of remaining data, "19800," is compared with the number of data transferable to the buffer 9-1, "3900." Since the number of remaining data is greater, 3900 pieces of audio data D1 from address 120100 to address 123999 in the hard disk 12 is transferred to the buffer 9-1. This data transfer is executed by programming the DMA controller 10 and the HD controller 11 using the current pointer and the number of remaining data, as described earlier.

Thereafter, the data transfer to the buffers 9-2 and 9-3 respectively corresponding to the tracks Tr2 and Tr3 will be executed. Upon completion of the data transfer, the data transfer to the buffer 9-1 corresponding to the track Tr1 will be executed again, and the audio data D2 stored on the disk 12, the cross fade data (C+D) stored in the memory 9-4 and the audio data DX stored on the disk 12 will be transferred to the buffer 9-1 in the same manner as described above.

Since the cross-fade data memory 9-4 is provided as separate from the hard disk 12 in the above described embodiment, the storage area of the hard disk 12 is not limited. Further, as the storage area of the hard disk 12 is not divided, a wait for disk access is prevented from frequently occurring, which would otherwise result in reduction of data transfer rate.

Other Structural Example

Figure 18:
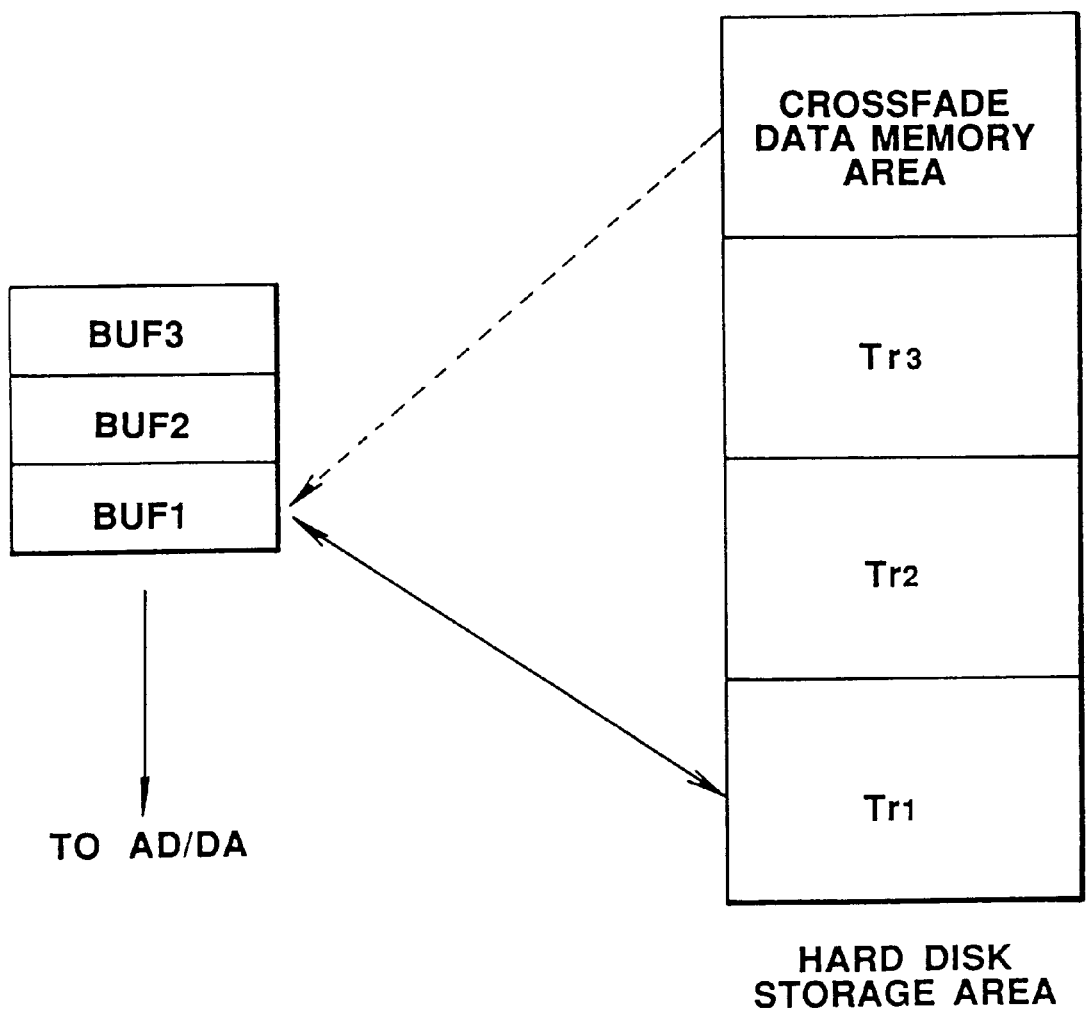
FIG. 18 is a block diagram illustrating a modification of the structure of FIG. 12.

The present invention is not restricted to the second embodiment of the present invention, which has been described in detail above, but may be modified in various manners. FIG. 18 exemplifies one modification.

Referring to FIG. 18, the cross-fade data memory is provided in the hard disk is which stores audio data such as voice data, not in the RAM which is controlled by the DMA controller 10. As the cross-fade data memory area is additionally provided in this example, the number of accesses to the disk 12 increases accordingly so that the data transfer rate becomes lower. However, since it is unnecessary to provide information (D or M in FIG. 16) in the reproduction schedule table, which designates the memory means stored in RAM 3, and no DMA transfer between memories in the same RAM is performed, the operation can be simplified.

In the cross-fade processing shown in FIG. 15, cross fade data has been prepared using the last 100 addresses and the first 100 addresses of the respective two audio data (e.g., DW and DX) that are linked together. The number of data to be used, however, can be set different values according to the purposes.

The volume curve may also take various forms; for example, several volume curves may be stored in the RAM 3 in advance so as to permit the desired curve to be selected through the keyboard.

According to these embodiments, audio data stored in the audio storing means are not rewritten and held intact, ensuring free editing of the data. Further, as cross fade data is stored in the exclusive memory means, it is unnecessary to perform real-time processing, so that high-speed signal processing is not required.

The cross-fade data memory can be realized utilizing part of the buffer (RAM) provided between the audio I/O device and the audio data memory means, so that the audio data memory area on the disk for storing the cross fade data is not limited. Further, the rate of transferring cross fade data will not be reduced by a disk access wait.

Third Embodiment

General Structure

Figure 19:
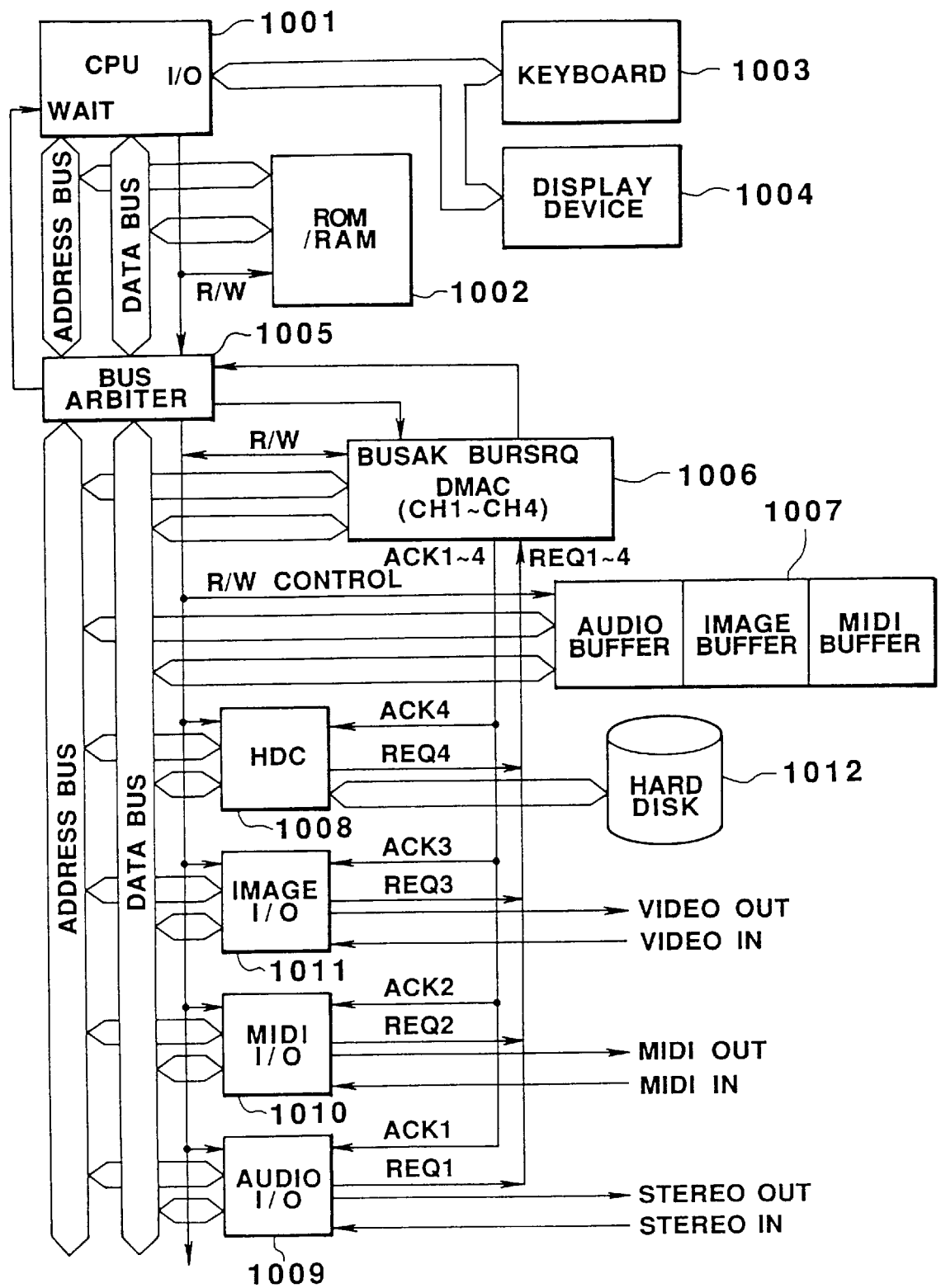
FIG. 19 is a circuit diagram showing the general structure of a multimedia recorder according to the third embodiment of the present invention.

FIG. 19 shows the general structure of the third embodiment. In this embodiment, stereophonic audio data, sequencer data (MIDI data), and video (image) data can be integrally recorded/reproduced and edited.

Of these data, audio data must be transferred periodically (at a sampling timing). Sequencer data must be transferred non-periodically (when the contents of the sequencer data are changed). Video data needs to be transferred periodically or non-periodically in a large amount.

In this embodiment, transfer operations of data in different data transfer amounts and at different data transfer rates can be handled.

More specifically, reference numeral 1001 denotes a CPU, which controls the overall operations of the embodiment and is operated in accordance with programs stored in a ROM/RAM 1002. In addition, the CPU 1001 designates read/write areas of a hard disk 1012 (to be described later) and edits data by using predetermined areas of the ROM/RAM 1002.

A keyboard 1003 and a display device 1004 are connected to the input/output terminal I/O of the CPU 1001. A user can designate an operation mode for each track (an audio track, a sequencer track, and a video track), and can designate various editing modes.

In a real-time operation (recording/reproduction of data), the CPU 1001 controls each constituent element (to be described later) only for the idle time of address and data buses. Such bus control is performed by a bus arbiter 1005. A wait signal WAIT is kept supplied to the CPU 1001 until the buses can be used.

The bus arbiter 1005, a DMAC (DMA controller) 1006, a buffer section 1007, an HDC (hard disk controller) 1008, an audio I/O (input/output interface) 1009, a MIDI I/O (input/output interface) 1010, and an image I/O (input/output interface) 1011 are connected to each other.

The DMAC 1006 is constituted by four channels CH1 to CH4. The channel CH1 serves to execute DMA transfer between an audio buffer (of a ring buffer type, in which audio data corresponding to a plurality of sampling operations can be stored) and the audio I/O 1009. The channel CH2 executes DMA transfer between a MIDI buffer (of a ring buffer type, in which the MIDI data corresponding to a plurality of events can be stored) and the MIDI I/O 1010. The channel CH3 performs DMA transfer between an image buffer (in which image data corresponding to at least one frame can be temporarily stored) and the video I/O 1011.

The channel CH4 serves to perform data transfer (DMA transfer) between each area in the buffer section 1007 and a corresponding area in the hard disk 1012. That is, data transfer between the hard disk 1012 and the buffer section 1007 is performed depending on whether a proper free space exists in an area designated by the buffer section 1007 in the data reproduction mode. In the record mode, such data transfer is performed depending on whether a proper data block to be transferred to the hard disk 1012 is formed in an area designated by the buffer section 1007.

The hard disk 1012 is connected to the HDC 1008. A data read/write operation with respect to the hard disk 1012 is performed under the control of the HDC 1008. Programming control for the HDC 1008 is performed by the CPU 1001 every time data transfer (corresponding to one block) is performed.

More specifically, the audio I/O 1009 is designed to exchange stereophonic audio signals (analog signals) with external devices. The audio I/O 1009 includes a D/A converter and an A/D converter and serves to receive an external analog signal upon converting it to a digital signal. In contrast to this, the audio I/O 1009 converts a stereophonic digital audio signal into an analog signal and outputs it to an external device. In addition, the audio I/O 1009 incorporates a data buffer having a capacity corresponding to one sampling operation. The audio I/O 1009 generates a DMA transfer request signal REQ1 to the DMAC 1006 in synchronism with a sampling clock (or may be operated in synchronism with an output from an incorporated clock generator or a sampling clock from an external device).

In response to the request signal REQ1, the channel CH1 of the DMAC 1006 requests (outputs a signal BUSRQ) the bus arbiter 1005 to pass control of the address and data buses to execute DMA transfer. Upon reception of an acknowledge signal BUSAK, the channel CH1 gains control of the address and data buses and performs DMA transfer. That is, the DMAC 1006 supplies an acknowledge signal ACK1 to the audio I/O 1009 to transfer audio data between the audio I/O 1009 and the voice buffer in the buffer section 1007. In addition, the DMAC 1006 outputs a predetermined read/write control signal R/W.

The MIDI I/O 1010 is designed to exchange the MIDI signal (MIDI message) with an external device. The MIDI I/O 1010 incorporates converters for performing parallel/serial conversion of the MIDI message output to a port MIDI OUT and serial/parallel conversion of the MIDI message received from a port MIDI IN, and a timer for controlling the input/output timing of the message MIDI.

In the reproduction mode, as will be described later, with the aid of this timer, the MIDI I/O 1010 outputs the MIDI data portion of a packet at a proper timing with respect to the previous MIDI output in accordance with interval data of the packet. In the record mode, interval data representing a time interval started when the previous MIDI data is input is added to the MIDI input by the MIDI I/O 1010, thus forming the input data into packet data.

Owing to the above-described function of the timer, the MIDI I/O 1010 generates a DMA transfer request signal REQ2 to the DMAC 1006 at a proper timing.

In response to the request signal REQ2, the DMAC 1006 requests (outputs the signal BUSRQ) the bus arbiter 1005 to pass control of the address and data buses, and gains control of the buses upon reception of the acknowledge signal BUSAK, thus performing DMA transfer, in the same manner as described above. That is, the DMAC 1006 supplies an acknowledge signal ACK2 to the MIDI I/O 1010 to transfer the MIDI data between the MIDI I/O 1010 and the MIDI buffer in the buffer section 1007. In addition, the DMAC 1006 outputs a predetermined read/write control signal R/W.

The image I/O 1011 is designed to exchange video signals with external devices and incorporates a frame buffer (e.g., an RGB data frame buffer) corresponding to one frame. In the reproduction mode, this frame buffer is updated in accordance with the contents of the image buffer in the buffer section 1007 at several periods per second. In the record mode, a digitizer incorporated in the image I/O 1011 digitizes input image signals periodically (several times per second), thus updating the frame buffer. In the record mode, data is sequentially transferred from the frame buffer to the image buffer in the buffer section 1007.

The image I/O 1011 generates and supplies a DMA transfer request signal REQ3 to the DMAC 1006 several times per second (strictly speaking, several sets of request signals) every time sampling is performed.

In response to the request signal REQ3, the channel CH3 of the DMAC 1006 requests (outputs the signal BUSRQ) the bus arbiter 1005 to pass control of the address and data buses, and gains control of the buses upon reception of the acknowledge signal BUSAK, thus performing DMA transfer, in the same manner as described above. That is, the DMAC 1006 supplies an acknowledge signal ACK3 to the image I/O 1011 to perform transfer of image data between the image I/O 1011 and the image buffer in the buffer section 1007. In addition, the DMAC 1006 outputs a predetermined read/write control signal R/W.

The HDC 1008 requests (outputs a request signal REQ4) the DMAC 1006 to perform data transfer between the hard disk 1012 and a desired area of the buffer section 1007 in accordance with programming of the CPU 1001. In response to the request signal REQ4, the channel CH4 of the DMAC 1006 requests (outputs the signal BUSRQ) the bus arbiter 1005 to pass control of the address and data buses, and gains control of the buses upon reception of the acknowledge signal BUSAK, thus performing DMA transfer, in the same manner as described above. That is, the DMAC 1006 supplies an acknowledge signal ACK4 to the HDC 1008 to perform data transfer between the hard disk 1012 and a designed buffer in the buffer section 1007. In addition, the DMAC 1006 outputs a predetermined read/write control signal R/W.

A plurality of request signals REQ may be simultaneously supplied to the DMAC 1006. In this case, the DMAC 1006 executes DMA transfer control in accordance with the following priority order: REQ1>REQ2>REQ3>REQ4. This priority order is based on the degree of emergency of the execution of DMA transfer.

More specifically, if data transfer of an audio signal is not properly performed at each sampling timing, the reproduced sound becomes very unnatural. In contrast to this, the data transfer timing of the MIDI signal is not so severe as that of an audio signal. Therefore, the priority of data transfer of the MIDI signal is lower than that of an audio signal. Similarly, since management of switching of frames need not be as severe as that of the change timing of sounds and automatic performances, data transfer of a video signal is lower in priority than the signals described above. The channel CH4 is designed to perform data transfer between the hard disk 1012 and the buffer section 1007. Since a large time margin is set in the buffer section 1007, even if data transfer between the hard disk 1012 and the buffer section 1007 is interrupted by another DMA transfer request, and the interruption is executed first, no problems are posed.

Storage Contents of Hard Disk 1012

Figure 20:
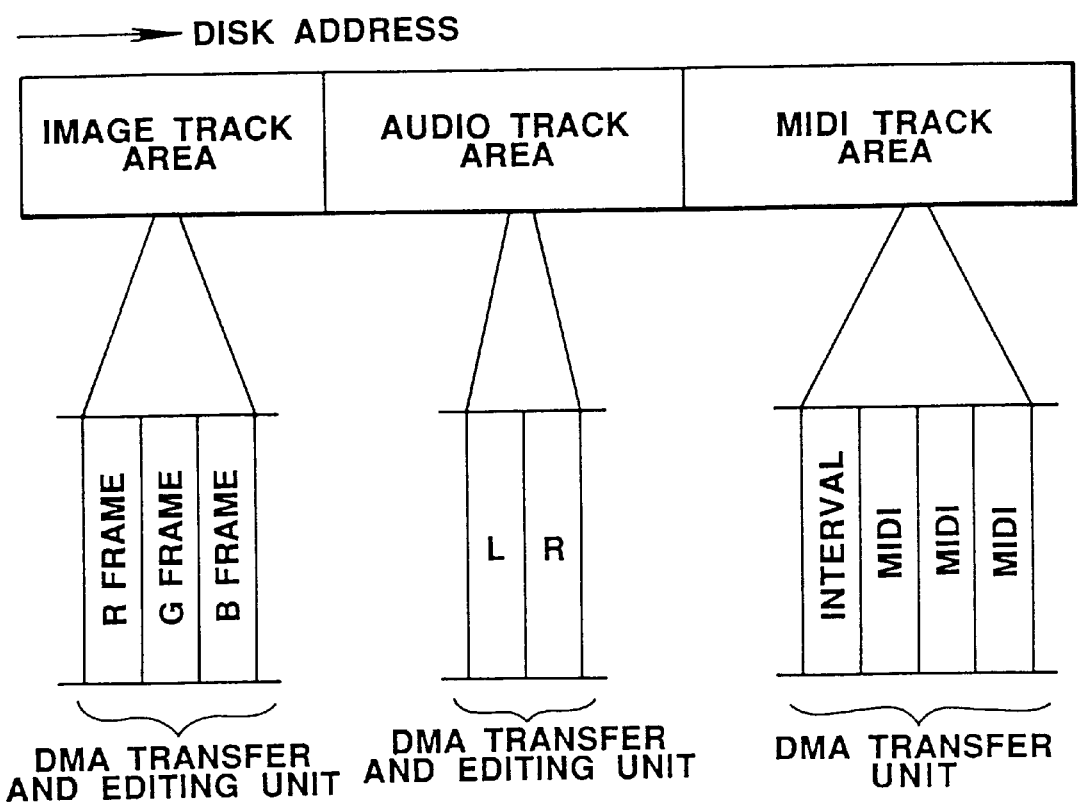
FIG. 20 is a view showing the data format of a hard disk 12 in FIG. 19.

FIG. 20 shows a data format of the hard disk 1012, which is roughly divided into three areas. The three areas are: an audio track area for exchanging data with the audio buffer in the buffer section 1007; a MIDI track area for exchanging data with the MIDI buffer in the buffer section 1007; and an image track area for exchanging data with the image buffer in the buffer section 1007.

As audio data, left (L) and right (R) data are alternately stored in one track. This pair of data serve as a basic unit for DMA transfer and editing processing to be described later. Assume that one sampled data is expressed by 16 bits, and the sampling frequency is 48 kHz.

The unit of the MIDI data is constituted by interval data for the above-described timing control and the MIDI data (MIDI message) having 0 byte or more. Note that this byte length is arbitrary and is changed in accordance with the arrangement of the MIDI data for each operation. Note that when the MIDI data is 0 byte, it simply represents a time interval. This variable-length data is the basic unit of DMA transfer.

When a color image is to be displayed, a set of R, G, and B image data, as video data, constitutes one frame. Each frame is constituted by N dots×M dots e.g., 640 dots×400 dots). Several frames can be changed per second. This set of R, G, and B image data constitutes a base unit for DMA transfer and editing processing.

Note that data transfer between the hard disk 1012 and the buffer section 1007 need not always be performed in the above-described unit as long as the data storage/reproduction order of the hard disk 1012 corresponds to that of the buffer section 1007. It is, however, important that the units of data transfer between the buffer section 1007 and the respective I/O interfaces 1009 to loll be controlled in the above-described manner.

Audio Input/output Operation

Of the operations of this embodiment, operations associated with the relationship between the audio I/O 1009 and the buffer section 1007 or the hard disk 1012 will be described below.

FIG. 21 shows timing charts of the operations. FIG. 21(*a*) shows an operation in the play mode. FIG. 21(*b*) shows an operation in the record mode.

In the play mode, data is sequentially transferred from the hard disk 1012 to the audio buffer (part of the buffer section 1007) as a ring buffer, thus performing a pre-load operation. In order to read out audio data from the audio buffer, the audio I/O 1009 outputs the DMA transfer request REQ1 to the DMAC 1006 at every sampling timing (strictly speaking, before every sampling period (fs), as shown in FIG. 21(a)). When DMA transfer can be performed, the acknowledge signal ACK1 is supplied from the channel CH1 of the DMAC 1006, and data transfer is actually performed from the buffer section 1007 to the audio I/O 1009.

At this time, since the audio data is stereophonic data, as described above, the request signal is supplied from the audio I/O 1009 to the DMAC 1006 twice to perform data transfer twice, thus transferring the left (L) and right (R) data to be used for one sampling operation.

The audio data, i.e., the left (L) and right (R) data, stored in the internal buffer of the audio I/O 1009 are simultaneously digital/analog-converted in synchronism with a sampling clock (fs) to be stereophonically output.

The audio data pre-loaded from the hard disk 1012 and stored in the audio buffer are sequentially read out and converted into analog signals at every sampling period to be output. As will be described later, with the function of the channel CH4 of the DMAC 1006, before all the data are read out to empty the audio buffer, the next audio data block is transferred from the hard disk 1012. Therefore, even if the access speed of the hard disk 1012 is not so high, a audio reproducing operation during a sampling period can be performed at high speed.

In the record mode, an externally supplied analog stereophonic signal is converted into a digital signal in synchronism with the sampling clock (fs) and stored in the internal buffer of the audio I/O 1009. Since the digital signal is constituted by left (L) and right (R) data, the DMA transfer request REQ1 is supplied to the DMAC 1006 twice to DAM-transfer the data from the audio I/O 1009 to the audio buffer in the buffer section 1007 in response to the acknowledge signal ACK1.

In this manner, audio data is stored in the audio buffer in the buffer section 1007 at every sampling timing. However, with the function of the channel CH4 of the DMAC 1006, before the audio buffer is filled with data, the audio data stored in the buffer section 1007 in advance is transferred to the hard disk 1012 in blocks. Therefore, similar to the play mode, in the record mode, even if the access speed of the hard disk 1012 is not so high, an audio signal recording operation in a sampling period can be performed at high speed.

MIDI Input/output Operation

FIG. 22 shows automatic performance control operations based on the MIDI data. FIG. 22(a) and FIG. 22(b) respectively show operations in the play mode and the record mode.

In the play mode, the MIDI data corresponding to a plurality of operations is transferred beforehand from the MIDI track area of the hard disk 1012 to the MIDI buffer in the buffer section 1007. This data transfer is performed by the channel CH4 of the DMAC 1006.

The MIDI I/O 1010 requests (outputs the request signal REQ2) the DMAC 1006 to transfer the interval data of the MIDI data associated with one packet. In response to the acknowledge signal ACK2, the data is supplied from the MIDI buffer in the buffer section 1007 to the MIDI I/O 1010, and measurement of the corresponding time interval is started in the above-described internal timer.

If the lapse of the time interval is determined in the MIDI I/O 1010, the MIDI I/O sends the DMA transfer request REQ2 to the DMAC 1006 again. When the MIDI message is transferred from the MIDI buffer in the buffer section 1007, the MIDI I/O 1010 performs parallel/serial conversion and outputs the resultant serial MIDI signal to an external MIDI device. This operation is repeatedly performed a number of times corresponding to the number of the bytes of the message included in one packet. Upon completion of this processing, DMA transfer of the next interval data is requested.

In this manner, the MIDI data is sequentially reproduced every time the time designated by the interval data elapses. Subsequently, the contents of the MIDI buffer are sequentially used. However, before the MIDI buffer becomes empty, the next MIDI data is transferred from the hard disk 1012 in blocks by the channel CH4 of the DMAC 1006.

In the record mode, the MIDI data is externally supplied in the serial form. Upon reception of the new MIDI data, the MIDI I/O 1010 sends the transfer request signal REQ2 to the DMAC 1006 to transfer an output from the timer, which has measured the lapse of time after the previous MIDI data was input, as interval data, to the MIDI buffer. In response to the acknowledge signal ACK2, data transfer from the MIDI I/O 1010 to the MIDI buffer is executed.

In the MIDI I/O 1010, the input MIDI data is converted into a parallel signal by the internal serial/parallel converter. Thereafter, DMA transfer is executed between the MIDI I/O 1010 and the buffer section 1007. Such an operation is repeatedly executed a number of times corresponding to the number of bytes associated with the MIDI input.

As such data transfer is repeated, the MIDI data are accumulated in the MIDI buffer in the buffer section 1007. However, before the MIDI buffer is filled with the data, the MIDI data is transferred from the MIDI buffer to the MIDI track area of the hard disk 1012 in blocks by the channel CH4 of the DMAC 1006.

With the above-described operation, even if the access speed of the hard disk 1012 is not much high, real-time recording/reproduction of the MIDI data can be performed by the function of the buffer section 1007.

Video Data Input/output Operation

Of the operations of this embodiment, the relationship between the image I/O 1011 and the image buffer in the buffer section 1007, and the relationship between the image I/O 1011 and the hard disk 1012 will be described below.

FIG. 23 shows timing charts in such image recording/reproduction processing. FIG. 23(a) and FIG. 23(b) respectively show operations in the play mode and the record mode.

In the play mode, image data is transferred beforehand from the image track area of the hard disk 1012 to the image buffer in the buffer section 1007 to be stored therein. This operation is performed by the channel CH4 of the DMAC 1006, as described above.

At a frame switching timing (if n frames of images are displayed per second (motion-picture display), the switching timing comes every 1/n seconds), the image I/O 1011 supplies the data transfer request signal REQ3 to the DMAC 1006. As described above, one frame is constituted by a data set of a plurality of R, G, and B dots, and data transfer corresponding to one frame is completed by a plurality of data transfer operations. Therefore, as shown in FIG. 23 the data transfer request signal REQ3 is supplied from the image I/O 1011 to the DMAC 1006 a number of times corresponding to the amount of data, and transfer of image data from the image buffer in the buffer section 1007 to the frame buffer of the image I/O 1011 is executed by the channel CH3 of the DMAC 1006 every time the acknowledge signal ACK3 is supplied from the DMAC 1006. When the image data is written in the frame buffer of the image I/O 1011, a new frame is displayed. Such an operation is performed every 1/n seconds to continuously change frames, thus performing motion-picture display.

In this manner, the image data sequentially pre-loaded from the image track area of the hard disk 1012 and input to the image buffer in the buffer section 1007 is input/stored to/in the frame buffer of the image I/O 1011 at every predetermined timing and is output as video signals.

In the record mode, video signals transferred every 1/n seconds are digitized and input to the frame buffer in the image I/O 1011. In order to perform DMA transfer of the digitized signals to the video buffer in the buffer section 1007, the request signal REQ3 is output a number of times corresponding to the data transfer amount, and the channel CH3 of the DMAC 1006 repeatedly executes data transfer in response to the acknowledge signal ACK3. Subsequently, the channel CH4 of the DMAC 1006 transfers the frame data, transferred to the buffer section 1007 every 1/n seconds in this manner, from the frame buffer to the image track area of the hard disk 1007 to store them therein.

By repeating such an operation, video signals (motion picture) supplied from an external video device are sequentially digitized and transferred/recorded to/on the hard disk 1012 through the buffer section 1007.

Operation of Channel CH4 of DMAC 1006

An operation of the channel CH4 of the DMAC 1006 will be described next. As described above, with the functions of the channels CH1 to CH3 of the DMAC 1006, data transfer (DMA transfer) between the audio I/O 1009 and the audio buffer in the buffer section 1007, data transfer (DMA transfer) between the MIDI I/O 1010 and the MIDI buffer in the buffer section 1007, and data transfer (DMA transfer) between the image I/O 1011 and the image buffer in the buffer section 1007 are selectively executed (since a track (an audio track, a MIDI track, or a video track) to be operated is designated by a user, it is apparent that all the tracks need not be set in the play or record mode). As a result of such data transfer, data pre-loaded in the buffer section 1007 is sequentially consumed in the play mode, and data is sequentially stored in the buffer section 1007 in the record mode. The channel CH4 of the DMAC 1006 serves to transfer new data subsequent to the previously transferred data from the hard disk 1012 to the buffer section 1007 or to transfer new data subsequent to the previously transferred data from the buffer section 1007 to the hard disk 1012.

FIG. 24 is a timing chart showing such an operation state. When transfer of a data block corresponding to one track is completed under the control of the CPU 1001, selection and programming of the transfer area of the next data block and its direction (from the hard disk 1012 to the buffer section 1007 or from the buffer section 1007 to the hard disk 1012) are performed with respect to the DMAC 1006 and the HDC 1008. The channel CH4 of the DMAC 1006 performs data transfer associated with the designated area of the designated track in response to the transfer request signal REQ4 from the HDC 1008.

In the case shown in FIG. 24, data transfer between the hard disk 1012 and the buffer section 1007 is performed in the following order: between the hard disk 1012 and the image buffer; between the hard disk 1012 and the audio buffer; and between the hard disk 1012 and the MIDI buffer. However, after data transfer corresponding one block is completed, a specific track to be subjected to DMA transfer processing by the channel CH4 of the DMAC 1006 is determined depending on the state of each buffer at that time. More specifically, in the play mode, determination is performed depending on whether sufficient data is pre-loaded in each buffer. In the record mode, it is determined whether each buffer has a sufficient free area, and DMA transfer is performed first with respect to a buffer in which pre-loaded data is decreased in amount or to a buffer in which the free area is reduced.

Editing Operation

FIG. 25 shows examples of editing operations by this embodiment. In the hard disk 1012, data is stored in units of tracks. Each data is divided into data components as events having desired lengths. This operation is executed by the CPU 1001 in accordance with an operation of the keyboard 1003 or the like by a user. As a result, for example, the data in the audio track is divided into events S1 to S4, while the data in the image tack is divided into events P1 to P5.

Data designating the address ranges of the respective events in the hard disk 1012 is recorded in specific areas in the ROM/RAM 1002 by the function of the CPU 1001. In this manner, an event table is completed.

Since the hard disk 1012 is capable of random access, the above-mentioned events can be read out in any order. For example, as shown in FIG. 25(*b*), the data in the audio track can be reproduced in the order of S1, S4, S2, S2, and S2, and the data in the image track can be reproduced in the order of P2, P3, P1, P3, and P4, and P3, accordingly, without actually rewriting the stored data of the hard disk 1012. Reproduction in such orders can be realized by supplying commands to the CPU 1001 upon operation of the keyboard 1003 or the like and forming a track schedule table using specific areas of the ROM/RAM 1002.

Assume that such a track schedule table is completed. In this case, when these tracks are set in the play mode, the CPU 1001 always monitors the track schedule table to control the contents of data transferred from the hard disk 1012 to the buffer section 1007, thus performing data transfer with respect to areas corresponding to the orders designated by the track schedule table.

Note that an editing operation can be performed with respect to the MIDI track, similar to other tracks. In this case, however, the interval data must be updated upon editing processing, and hence the stored data of the hard disk 1012 is actually updated.

Modification

The third embodiment of the present invention has been described in detail. The present invention is not limited to this.

More specifically, in the above-described embodiment, three types of data, i.e., audio, MIDI, and image data, are integrated to be recorded/reproduced. However, of these data, at least two arbitrary types of data may be integrated to be recorded/reproduced. Alternatively, other types of data, e.g., sequence data for determining a sequence of functions and operations, may be integrated with the three types of data to be recorded/reproduced.

In addition, in the above embodiment, image data are continuously recorded/reproduced to realize motion-picture display. However, if still-image display is to be performed, a combination of image data associated with each still image and interval data (representing the time interval between change timings of image data and formed in the timer in the image I/O 1011) is recorded, and in the reproduction mode, the reproduction timing of each image data is determined while the lapse of time corresponding to each interval data is measured by the timer. This technique is the same as the above-described technique of reproducing the MIDI data.

Furthermore, if image data is compressed/expanded by using a data compression/expansion technique so as to be recorded/reproduced on/from the hard disk 1012, image data of a larger number of frames can be recorded/reproduced.

According to the arrangement described above, a multimedia recorder having a relatively simple arrangement can be provided, and a plurality of types of data (multimedia) can be integrally recorded/reproduced. In addition, editing processing can be efficiently performed.

Fourth Embodiment

General Structure

Figure 26:
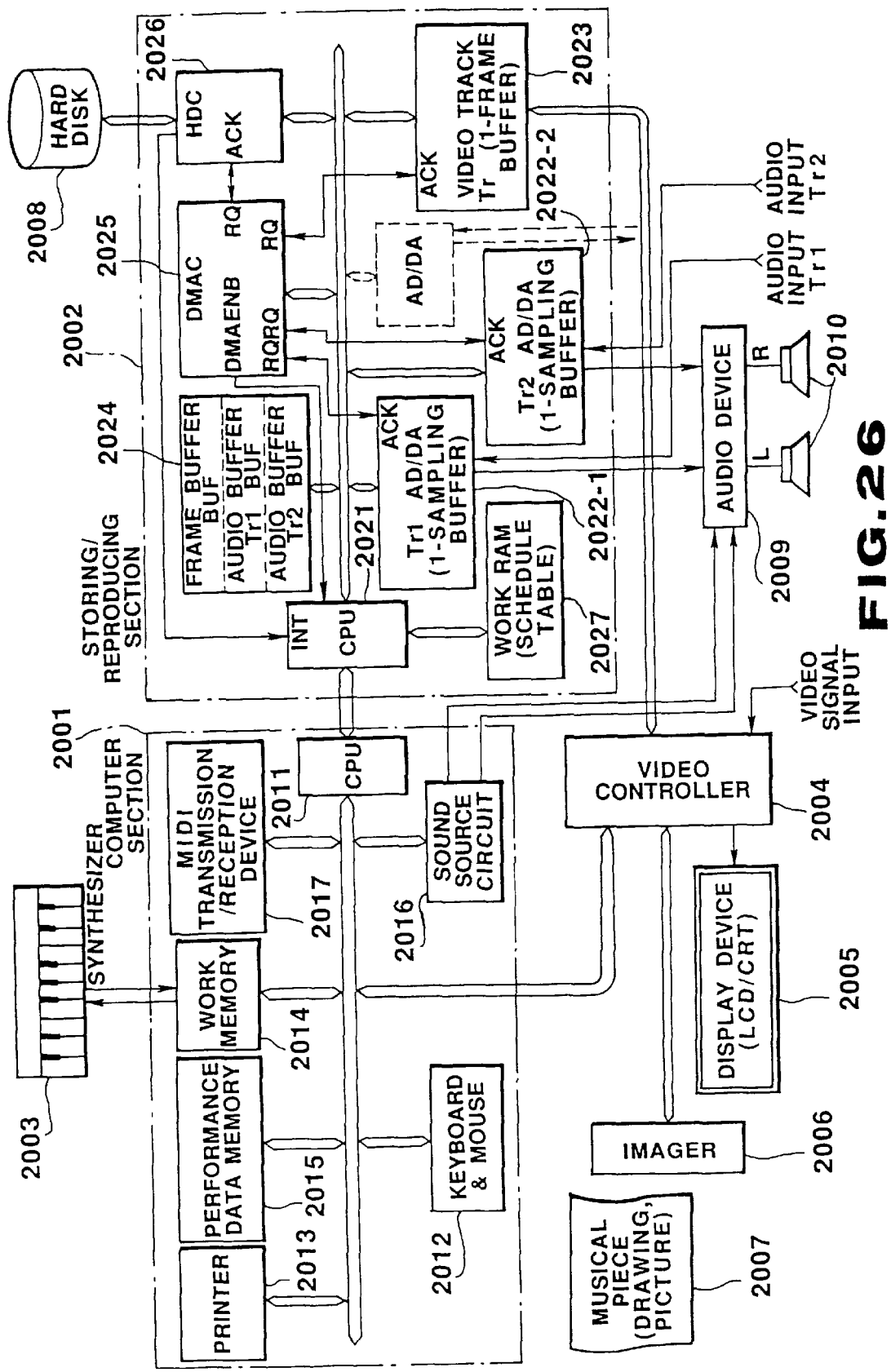
FIG. 26 is a circuit diagram showing the general structure of an automatic performance apparatus according to the fourth embodiment of the present invention.

FIG. 26 is a circuit diagram showing the general structure of an automatic performance apparatus according to the present invention, which includes a computer section 2001 and a storing/reproducing section 2002. In addition to a CPU 2011 as a main component constituted by a microcomputer or the like, the computer section 2001 includes a keyboard and mouse 2012 as an input device, a printer 2013 as an output device, and a work memory 2014 for storing data. The computer section 2001 further includes the following components for automatic musical performances: a performance data memory 2015, a sound source circuit 2016, and a MIDI (Musical Instrument Digital Interface) transmission/reception device 2017. These components are connected to the CPU 2011 and perform various operations under the control of the CPU 2011.

The MIDI transmission/reception device 2017 can be connected to an external synthesizer 2003 so that input performance data (supplied as the MIDI message) from the external synthesizer 2003 can be received and stored, as data (e.g., pitch and note length data), in the performance data memory 2015. In addition, the computer section 2001 can transmit performance data to the external synthesizer 2003 through the MIDI transmission/reception device 2017 to cause the synthesizer 2003 to automatically play a music. The performance data memory 2015 not only can store input performance data (real-time input) from the synthesizer 2003 as automatic performance data, but also can sequentially receive note data (step input) as automatic performance data through the keyboard and mouse 2012.

The CPU 2011 can automatically generate musical score data from automatic performance data input in this manner. Video data from the CPU 2011 is displayed on a display device 2005 through a video controller 2004. In addition to frame data preset in the computer section 2001, various types of data input through the keyboard and mouse 2012 are displayed on the display device 2005. The display device 2005 is constituted by a liquid crystal display (LCD) or a CRT and is preferably capable of color display.

An imager 2006 is connected to the video controller 2004 so that image data of a musical score, painting, or photograph 2007 can be input. In addition, video signals from a VTR, a video camera, and the like can be input to the video controller 4. The video controller 2004 can display these video signals on the display device 2005 and can convert them into digital signals to send them to the storing/reproducing section 2002. In contrast to this, digital video signals from the storing/reproducing section 2002 are supplied to the video controller 2004 to be displayed on the display device 2005. Note that a circuit for compressing/expanding (restoring) image data may be arranged in the video controller 2004 to decrease the number of bits of image data to be supplied to the storing/reproducing section 2002.

The storing/reproducing section 2002 performs storage/reproduction control with respect to a hard disk 2008 (can be replaced with a random access type large-capacity memory capable of read/write processing, e.g., an optomagnetic disk) as an external memory device. In addition to a CPU 2021 as a main component, the storing/reproducing section 2002 includes audio input/output devices 2022-1 and 2022-2, a video input/output device 2023, a three-track buffer section 2024, a DMA (Direct Memory Access) controller (DMAC) 2025, a hard disk controller (HDC) 2026, and a work RAM 2027.

More specifically, the CPU 2021 is connected to the CPU 2011 in the computer section 2001 and controls the operations of the respective circuits in the storing/reproducing section 2002 under the control of the CPU 2011. The audio input/output devices 2022-1 and 2022-2 are in charge of audio tracks 1 and 2 (Tr1 and Tr2), respectively. In this embodiment, a two-track audio input/output operation can be performed. However, as indicated by broken lines in FIG. 26, an audio input/output device corresponding to another track can be additionally arranged.

Each of the audio input/output devices 2022-1 and 2022-2 incorporates an A/D converter for converting an externally supplied analog audio signal into a digital audio signal at a sampling timing, a D/A converter for converting a digital audio signal into an analog audio signal and outputting it to an external device at a sampling timing, and a one-sampling buffer for storing audio data corresponding to one sampling operation. The video input/output device 2023 is in charge of a video track and incorporates a one-frame buffer for storing a one-frame digital video signal in synchronism with a frame change timing. In a video reproducing operation, the display contents of the display device 2005 are changed as a result of updating of the data in the one-frame buffer. In a video input operation, the video input/output device 2023 receives frame data from the video controller 2004 in units of frames.

The audio input/output device 2022-1 in charge of the audio track Tr1 exchanges data (signal transmission) with an audio buffer Tr1BUF in the buffer section 2024 at every sampling timing. The audio input/output device 2022-2 in charge of the audio track Tr2 exchanges data (signal transmission) with an audio buffer Tr2BUF in the buffer section 2024 at every sampling timing. In addition, the video input/output device 2023 in charge of the video track exchanges data (one-frame data) with a frame buffer BUF in the buffer section 2024 at every frame change timing.

The audio input/output devices 2022-1 and 2022-2 and the video input/output device 2023 output DMA transfer request signals RQ to the DMAC 2025 at the respective data transfer timings. When data transfer operations are to be actually performed, the DMAC 2025 sends acknowledge signals ACK to the respective devices, thus performing DMA control.

The audio buffers Tr1BUF and Tr2BUF have areas for storing digital audio data corresponding to a plurality of data transfer operations and serve as ring buffers. In the record mode, audio data is transferred from the audio buffers Tr1BUF and Tr2BUF to corresponding areas of the hard disk 2008 in blocks. In the play mode, audio data is transferred from corresponding areas of the hard disk 2008 to the audio buffers Tr1BUF and Tr2BUF in blocks.

The frame buffer BUF in the buffer section 2024 has an area for storing at least one-frame video data. In the record mode, one-frame data is transferred from the frame buffer BUF to the a corresponding area of the hard disk 2008. In the reproduction or play mode, one-frame data is transferred from a corresponding area of the hard disk 2008 to the frame buffer BUF.

The HDC 2026 outputs the DMA transfer request signal RQ to the DMAC 2025, and the DMAC 2025 sends the acknowledge signal ACK to the HDC 2026, thus performing actual DMA transfer between the buffer section 2024 and the hard disk 2008. The DMAC 2025 and the HDC 2026 perform control operations to sequentially execute data transfer between the hard disk 2025 and the three areas in the buffer section 2024 in a time-divisional manner in accordance with the programming of the CPU 2021. The HDC 2026 supplies an interrupt signal INT to the CPU 2021 every time transfer of one-block data is completed. During the execution of DMA transfer (while a signal DMAENB is active), control of the data and address buses of the storing/reproducing section is possessed by the DMAC 2025. Otherwise (while the signal DMAENB is inactive), the CPU 2021 performs setting and programming of the respective internal circuits.

The work RAM 2027 is designed to store a schedule table and disk access pointers for accessing the hard disk 2008. As will be described later, the hard disk 2008 serves to store not only performance data (note data) of a plurality of music pieces but also audio data (vocal part data, background music data, and the like) to be reproduced in accordance with the performance data, and video data (music score data, character data, scenery data, and the like) as integral data, thus requiring a schedule table and the like for managing read operations of these data.

In the play mode, analog audio signals output from the audio input/output devices 2022-1 and 2022-2 are supplied to an audio device 2009 together with musical tone signals from the sound source circuit 2016 in the computer section 2001 described above and are output, as L/R stereophonic outputs, from speakers 2010.

Arrangement of DMAC 2025

Figure 27:
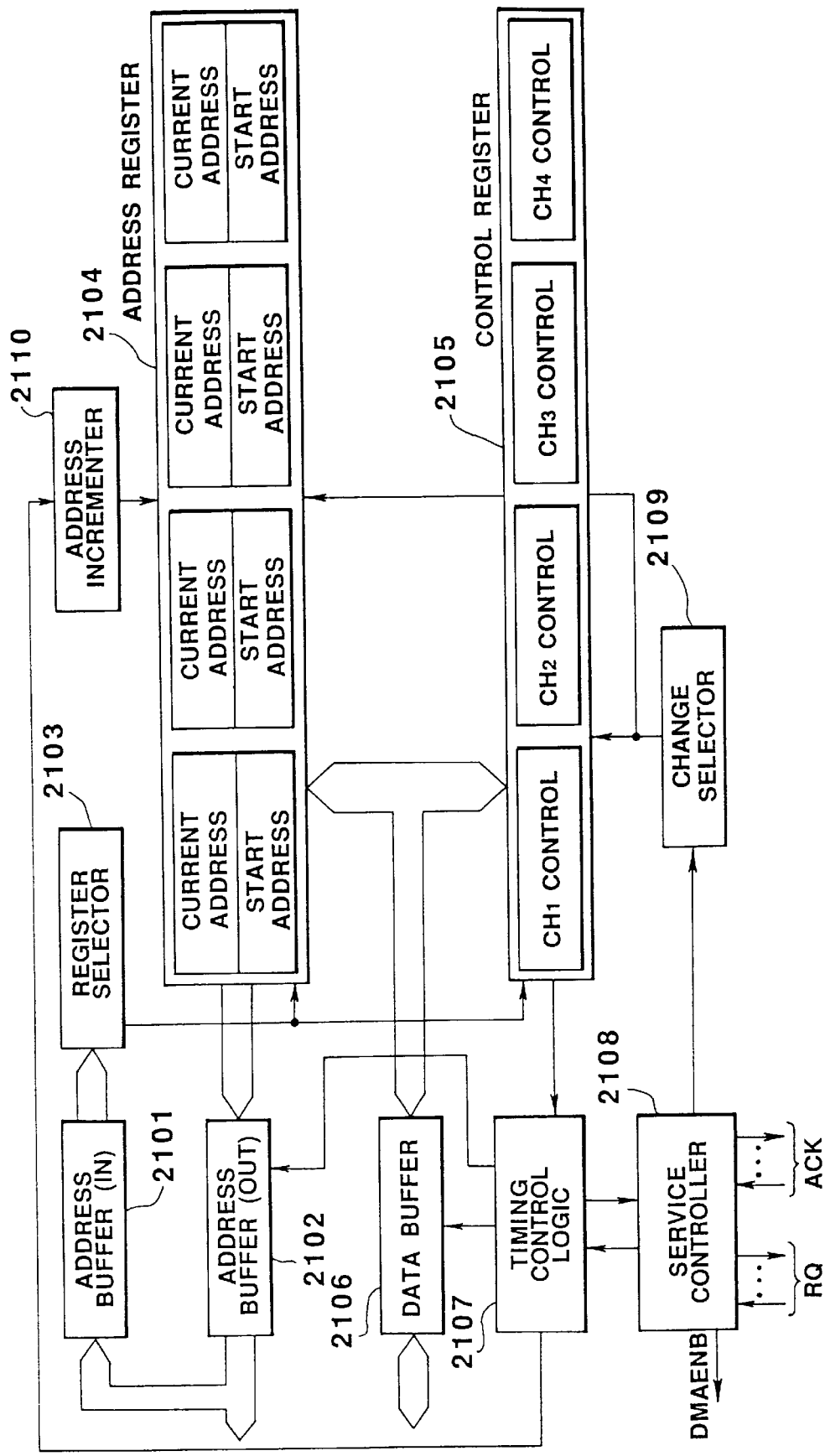
FIG. 27 is a circuit diagram showing the arrangement of a DMAC 2025.

An arrangement of the DMAC 2025 will be described below. As shown in FIG. 27, the DMAC 2025 has four channels. DMA channels CH1 and CH2 correspond to audio tracks 1 and 2, respectively, and serve to perform data transfer between the audio input/output devices 2022-1 and 2022-2 and the buffers Tr1BUF and Tr2BUF in the buffer section 2024. A DMA channel CH3 corresponds to a video track and serves to perform data transfer between the video input/output device 2023 and the frame buffer BUF in the buffer section 2024. A DMA channel CH4 serves to perform data transfer between the hard disk 2008 and a designated one of the buffers in the buffer section 2024.

The DMAC 2025 has input-side (IN) and output-side (OUT) address buffers 2101 and 2102 connected to the address bus. The designation contents of a register selector 2103 are changed by an address signal supplied to the address buffer 2101 to designate desired registers of the registers existing in an address register section 2104 and a control register section 2105.

As described above, the address register section 2104 and the control register section 2105 respectively have registers corresponding to the four channels CH1 to CH4. The address register section 2104 has areas for storing at least current addresses and start addresses of the corresponding areas of the buffer section 2024. The control register section 2105 stores data, e.g., control data for designating the direction of DMA transfer.

The contents of the address register section 2104 and the control register section 2105 can be input/output with respect to the data bus through a data buffer 2106. These components are controlled by a timing control logic 2107, a service controller 2108, and a channel selector 2109.

The service controller 2108 is of a hard logic or microprogram control scheme. The service controller 2108 receives signals from the timing control logic 2107, the DMA transfer request signals RQ from the audio input/output devices 2022-1 and 2022-2, the video input/output device 2023, and the HDC 2026, and various control signals from the CPU 2021, and outputs the acknowledge signals ACK as responses to the respective components. In addition, the service controller 2108 outputs the signal DMAENB representing that DMA transfer is being performed, and outputs various control commands to the timing control logic 2107.

The channel selector 2109 selectively designates the registers, of the address register section 2104 and the control register section 2105, which correspond to the channels CH1 to CH4.

The timing control logic 2107 receives control signals from the service controller 2108 and performs input/output control of the address and data buffers 2102 and 2106. In addition, the timing control logic 2107 operates an address incrementer 2110 to increment a current address register, of the address register section 2104, which corresponds to a designated channel.

Operation of CPU 2011 in computer section 2001

Operations of the computer section 2001, especially an operation of the CPU 2011, will be described next.

Figure 28:
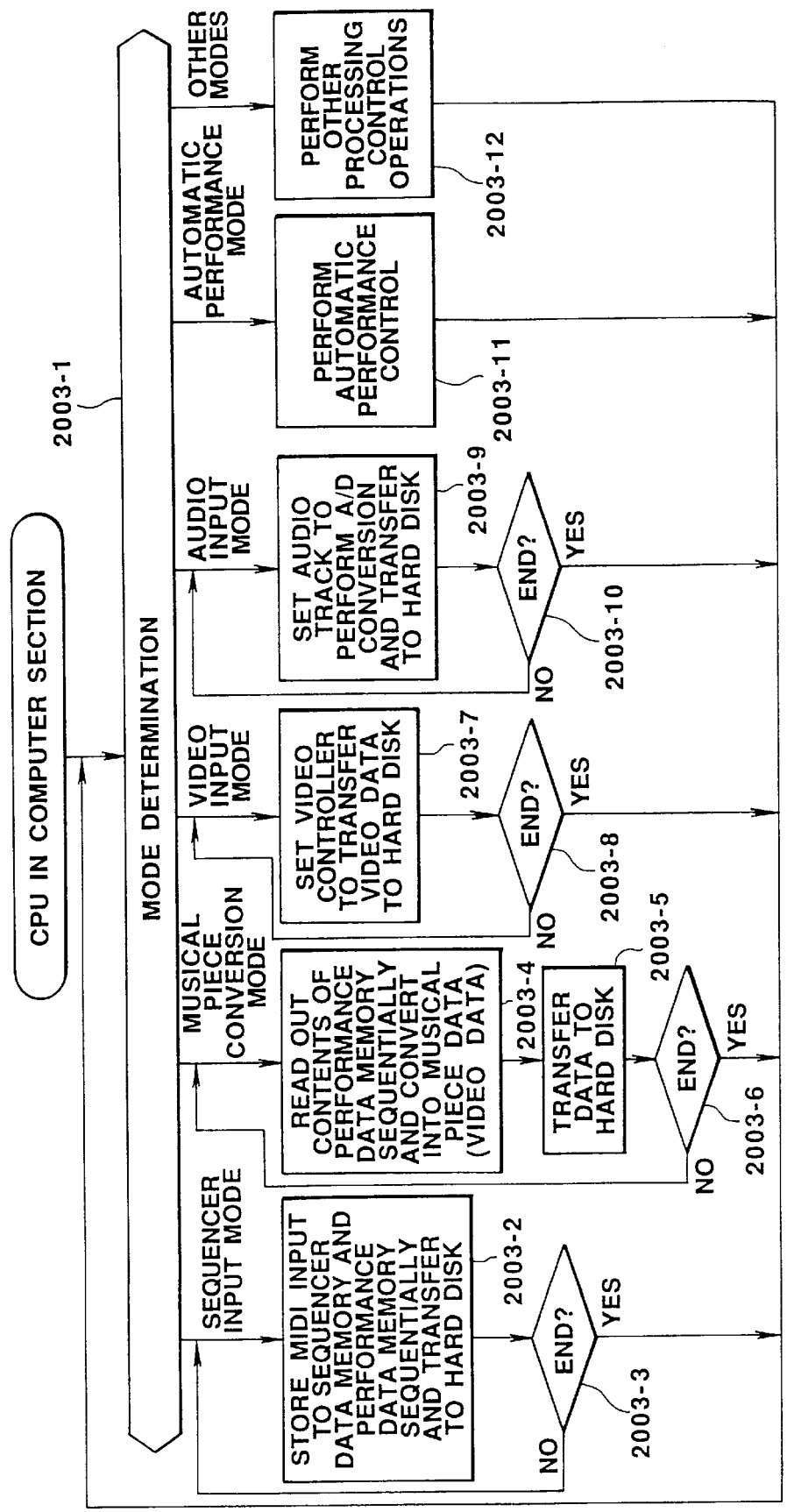
FIG. 28 is a flow chart showing the overall operations of a CPU 2011 of a computer section 2001.

FIG. 28 is a flow chart showing the overall operations of the computer section 2001. In step 2003-1, an operation mode is determined. An operation mode is determined by a user using the keyboard and mouse 2012.

Figure 30:
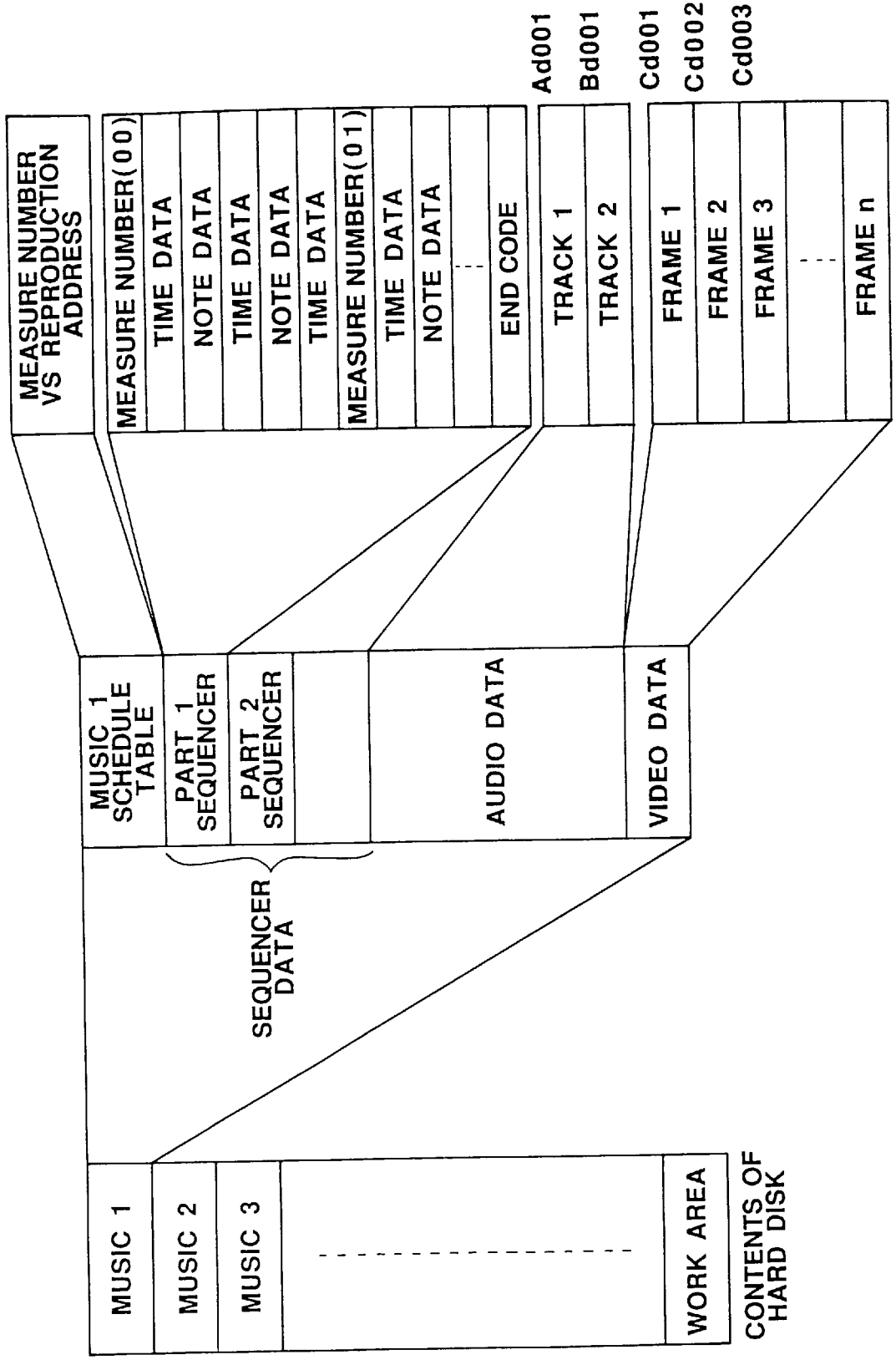
FIG. 30 is a view showing the format and contents of data to be stored in a hard disk 2008 in FIG. 26.

If, for example, the CPU 2011 determines the sequencer input mode, it receives the MIDI input from the external synthesizer 2003 and stores it, as sequencer data (automatic performance data), in the performance data memory 2015 (step 2003-2). Although any type of data format may be employed, one event (e.g., a note-ON/note-OFF operation) is expressed by a combination of time data representing the lapse of time from previous another event as shown in FIG. 30, and data (e.g., note data) representing the contents of the event. If measure number data is recorded as sequencer data in addition to this event data, automatic performance can be easily started from an arbitrary measure, and synchronization with reproduction of other data, i.e., audio data and video data, can be easily established. The position of a measure line can be detected from the time and tempo of the corresponding music by real-time processing or non-real-time processing (off-line processing).

Furthermore, in this sequencer input mode, the internal sound source circuit 2016 may be driven to generate a corresponding musical tone to be output through the audio device 2009. Sequence data may be input in units of a plurality of parts constituting a music. When the end of this series of input operations is detected (step 2003-3), the flow returns to step 2003-1 for mode determination. Note that, in addition to such a real-time input operation, sequencer data can be input step by step through the keyboard and mouse 2012 by, e.g., pasting each note on a music score displayed on the display device 2005, as described above. After desired sequencer data is stored in the performance data memory 2015, the data is transferred/stored to/in a designated area of the hard disk 2008 through the CPUs 2011 and 2021 and the HDC 2026 in accordance with an instruction from a user.

Note that such a sequencer input mode operation can be performed while audio data stored beforehand in the hard disk 2008 is reproduced. In this case, background music data from a CD or the like is stored beforehand in the hard disk 2008, and sequencer data can be stored by a real-time performance operation in synchronism with reproduction of the background music data.

When the musical score conversion mode for automatically generating a corresponding musical score from the sequencer data input in this manner, the flow advances from step 2003-1 to step 2003-4 to generate musical score data from the sequencer data already stored in the performance data memory 2015. More specifically, the positions of the respective measure lines are detected from note string data and the time and tempo of the corresponding music, and the respective notes and rests (e.g., quarter-notes, eighth-notes, quarter-rests, and eighth-rest) are determined on the basis of note length data. These note (rest) string data and measure line data are converted into image data by using a character generator (not shown) and other note data/image conversion means in the video controller 2004. Frames are constituted by this image data in units of a fixed number of measures (e.g., four measures). Alternatively, an optimal number of measures in terms of the size of a frame may be set as one frame unit (variable units of number of measures). Referring to FIG. 32, (a) and (b) indicate examples of musical score display.

Note that in conversion of sequencer data into musical score data, the sequencer data may be supplied to the display device 2005 to be displayed so that the data can be edited by a user through the keyboard and mouse 2012 as needed, thereby reducing errors due to automatic (mechanical) conversion into musical score data.

In response to an instruction from the user, this image data is transferred from the video controller 2004 to the video input/output device 2023 of the storing/reproducing section 2002. The data is then stored in a designated area of the hard disk through the frame buffer BUF in the buffer section 2024 (step 2003-5). When this series of operations is repeated, and transfer of video data corresponding to a plurality of frames, as the musical score data, to the hard disk 2008 is completed (step 2003-6), the flow returns to step 2003-1 for mode determination.

According to the above description, musical score data is obtained by conversion from performance data. However, a direct image input operation can also be performed by using the imager 2006, or other video data can be input. That is, when the video input mode is designated by the user, the flow advances from step 2003-1 to step 2003-7.

The CPU 2011 controls the operations of the internal circuits in accordance with video signals input to the video controller 2004. More specifically, when signals are input from the imager 2006, since an image has already been digitized, the digital image data is transferred to the video input/output device 2023 in units of frames and is stored in a designated area of the hard disk 2008 through the frame buffer BUF in the buffer section 2024. In contrast to this, when analog video signals are input from, e.g., a video camera, a VTR, or a still camera, the analog video signals are digitized in units of frames and are subjected to image compression processing as needed. Thereafter, the data is sequentially input/stored, as digital frame data of, e.g., N×M dots (one dot=n bits), in a predetermined area of the hard disk 2008 through the video input/output device 2023 and the frame buffer BUF in the buffer section 2024. Referring to FIG. 33, (a) and (b) indicate examples of character displays based on image data input in this manner. In this case, if 10 frames or more are input per second, a motion-picture data input can be achieved, allowing reproduction of a motion picture. When the series of operations in the video input mode is completed (step 2003-8), the flow returns to step 2003-1 for mode determination.

When the audio input mode is determined, the flow advances from step 2003-1 to step 2003-9 to control the storing/reproducing section 2002 so as to supply analog audio signals, input from a microphone or an audio IN terminal, to the audio input/output devices 2022-1 and 2022-2. Note that if the audio input mode is set in combination with an automatic performance (to be described later), the user can input audio data in accordance with the automatic performance. In addition, in accordance with a performance of a music, part data as corresponding background music data can be input from a CD or the like.

More specifically, the A/D converters in the audio input/output devices 2022-1 and 2022-2 are operated to convert analog audio signals into digital signals at every sampling period. The digital signals are then transferred/stored to/in the hard disk 2008 through the audio buffers Tr1BUF and Tr2BUF in the buffer section 2024. In this case, different part data or L/R stereophonic signals may be input to the two tracks. In addition, one track may be set in the reproduction mode, while the other track is set in the record mode. When this series of operations is completed (step 2003-10), the flow returns to step 2003-1 for mode determination.

If the automatic performance mode is designated in step 2003-1 for mode determination, the flow advances to step 2003-11. Processing control in this mode is shown in detail in FIG. 29. If other modes are designated, the flow advances from step 2003-1 to step 2003-12 to perform predetermined processing and control.

Operation of CPU 2011 in Computer Section 2001: Automatic Performance Mode

Figure 29:
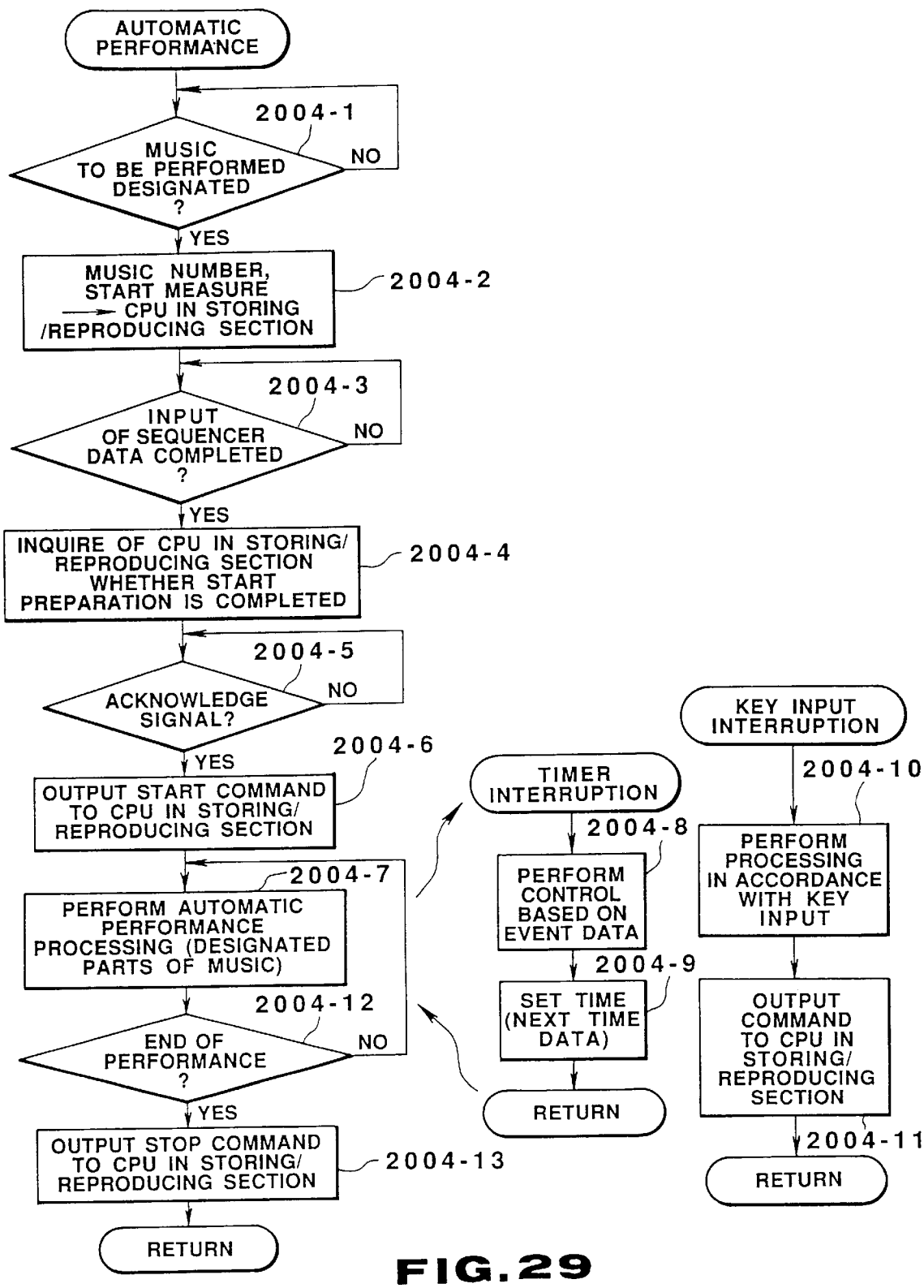
FIG. 29 is a flow chart showing an operation of the CPU 2011 of the computer section 2001 in an automatic performance.

In step 2004-1 in FIG. 29, the CPU 2011 checks whether a music to be automatically performed is designated. For example, performance data (sequencer data, PCM audio data, and frame data) of a plurality of music pieces is stored in the hard disk 2008 by operations to be described later, as shown in FIG. 30. The user is instructed to select one of the music pieces to be automatically performed. For example, in this selection, as shown in FIG. 31, the display device 2005 displays the names of the music pieces in character in units of ten music pieces, and the user selects one from the displayed names. If sequencer data is constituted by a plurality of part data, whether all or specific part data are subjected to automatic performance may be designated through a sub-frame. In addition, the user may be asked through a sub-frame whether to perform audio reproduction and video reproduction in accordance with this automatic performance.

When a music is designated in step 2004-1, the flow advances to step 2004-2, in which the CPU 2011 transfers the number of a music and start measure data to the CPU 2021 in the storing/reproducing section 2002. Although a reproducing operation is normally started from the first measure, an automatic performance can be started from an arbitrary measure of the music.

An operation of the CPU 2021 in the storing/reproducing section 2002 after the above-described operation will be described later. In accordance with the designated music and measure, the CPU 2021 reads out the sequencer data from the corresponding area of the hard disk 2008 and transfers it to the performance data memory 2015 through the CPU 2011. The CPU 2011 checks whether input of the sequencer data is completed. If it is completed, the flow advances to step 2004-4.

In step 2004-4, the CPU 2011 inquires of the CPU 2021 in the storing/reproducing section 2002 whether an automatic performance is ready to start. More specifically, audio data and video data can be reproduced together in accordance with an automatic performance of a music, and the CPU 2011 inquires whether preparations for reproduction of audio data and video data are completed in the storing/reproducing section 2002. If only an automatic performance simply using the sound source circuit 2016 is executed, the storing/reproducing section 2002 is not operated in accordance with the automatic performance. In this case, therefore, this check need not be performed.

If it is determined in step 2004-5 that an acknowledge signal with respect to the inquiry is supplied from the CPU 2021, the flow advances to step 2004-6 to supply a start command to the CPU 2021 so as to synchronously operate the storing/reproducing section 2002. Subsequently, in step 2004-7, an automatic performance is performed in accordance with the performance data recorded on the performance data memory 2015.

More specifically, the event data of a designated part is processed by timer interruption (step 2004-8). This timer interruption is based on time data between events and is performed every time the time designated by the time data elapses. Thereafter, time data based on the time interval between step 2004-8 and the next event is set in the timer (2004-9), and the flow returns to the main routine. In addition, if input operations are performed through the keyboard and mouse 2012 during this automatic performance, key input interruption occurs. As a result, the CPU 2011 performs processing in accordance with the key input operations in step 2004-10. Furthermore, in step 2004-11, the CPU 2011 supplies control signals to the CPU 2021 to control the operation of the storing/reproducing section 2002. For example, a pause, fast-forward, or rewind operation of the automatic performance is designated by this key input interruption.

In step 2004-12, it is checked whether the automatic performance of the music is completed. If it is completed, the CPU 2011 supplies a stop command to the CPU 2021 in step 2004-13 to terminate the operation of the storing/reproducing section 2002. Subsequently, the CPU 2011 causes the flow to return to the main routine (FIG. 28).

Operation of CPU 2021 in Storing/reproducing Section 2002: AV Input/output Mode An operation of the CPU 2021 in the storing/reproducing section 2002 will be described below with reference to FIG. 34.

In step 2009-1, the CPU 2021 inquires whether a new command is given by the CPU 2011 in the computer section 2001. That is, the CPU 2021 is on the slave side with respect to the CPU 2011 and hence is operated in accordance with a command from the CPU 2011 on the master side. In step 2009-2, the CPU 2021 determines the contents of the command.

If the audio/video input/output mode (AV input/output mode) is determined, the flow advances to step 2009-3 to determine the operation mode of the audio input/output devices 2022-1 and 2022-2 (audio tracks Tr1 and Tr2) and the video input/output device 2023 (video track Tr). That is, the CPU 2021 sets the respective devices 2022-1, 2022-2, and 2023 in the record mode or the reproduction mode.

In step 2009-4, the CPU 2021 reads out the first block data from the hard disk 2008 and inputs it in an area, of the buffer section 2024, which corresponds to the track in the reproduction mode. In step 2009-5, the CPU 2021 sets initial values in the corresponding channels of the DMAC 2025.

After such preparations are completed, an actual recording or reproducing operation is started in step 2009-6. That is, audio input/output operations of the audio input/output (A/D or D/A conversion) devices 2022-1 and 2022-2 and a digital video signal input/output operation of the video input/output device 2023 are selectively started. The CPU 2021 then performs soft interruption to start execution of the interrupt routine shown in FIG. 35 which is started in accordance with an interrupt signal supplied from the HDC 2026 upon completion of data transfer of one block.

Assume that all the tracks are set in the operation mode. In this case, since the priority order of CH1, CH2, CH3, and CH4 is given, the DMA channel CH1 corresponding to the audio track Tr1 is determined as a data transfer track in step 2010-1. If, for example, this track Tr1 is set in the reproduction mode, digital audio data is transferred in blocks from the hard disk 2008 to the audio buffer Tr1BUF of the buffer section 2024. In the track Tr1 is set in the recording mode, data is transferred in block from the audio buffer Tr1BUF of the buffer section 2024 to a corresponding area of the hard disk 2008.

That is, in step 2010-2, the start address of the channel CH1 of the DMAC 2025 is copied as the start address of the channel CH4. An operation of the DMAC 2025 at this time will be described later. Subsequently, the number of block transfer operations at this time is calculated from the start address of the channel CH1 and the current address (step 2010-3). In step 2010-4, the current address obtained as a result of completion of block transfer is set as the start address of the corresponding channel (CH1 at this time).

After the CPU 2021 performs each setting/control operation with respect to the DMAC 2025 in step 2010-1 and step 2010-4, the flow advances to step 2010-5 to extract the disk access pointer of the corresponding track of the hard disk 2008 from the work RAM 2027. In step 2010-6, the CPU 2021 performs programming of the HDC 2026 on the basis of the operation mode of the track Tr1 set in accordance with the contents of an area, of the control register section 2105 of the DMAC 2025, which corresponds to the channel CH1, the disk access pointer corresponding to the track Tr1, and the data transfer count determined in step 201-3. An operation of the HDC 2026 at this time will be described later.

Consequently, the HDC 2026 requests the DMAC 2025 to perform DMA transfer with respect to the track Tr1 in the designated direction. The DMAC 2025 executes the designated DMA transfer. This operation will be described later.

Subsequently, in step 2010-7, the CPU 2021 updates the disk access pointer, in the work RAM 2021, which corresponds to the track Tr1, to a value which the disk access pointer will take after the above-described transfer processing.

Figure 34:
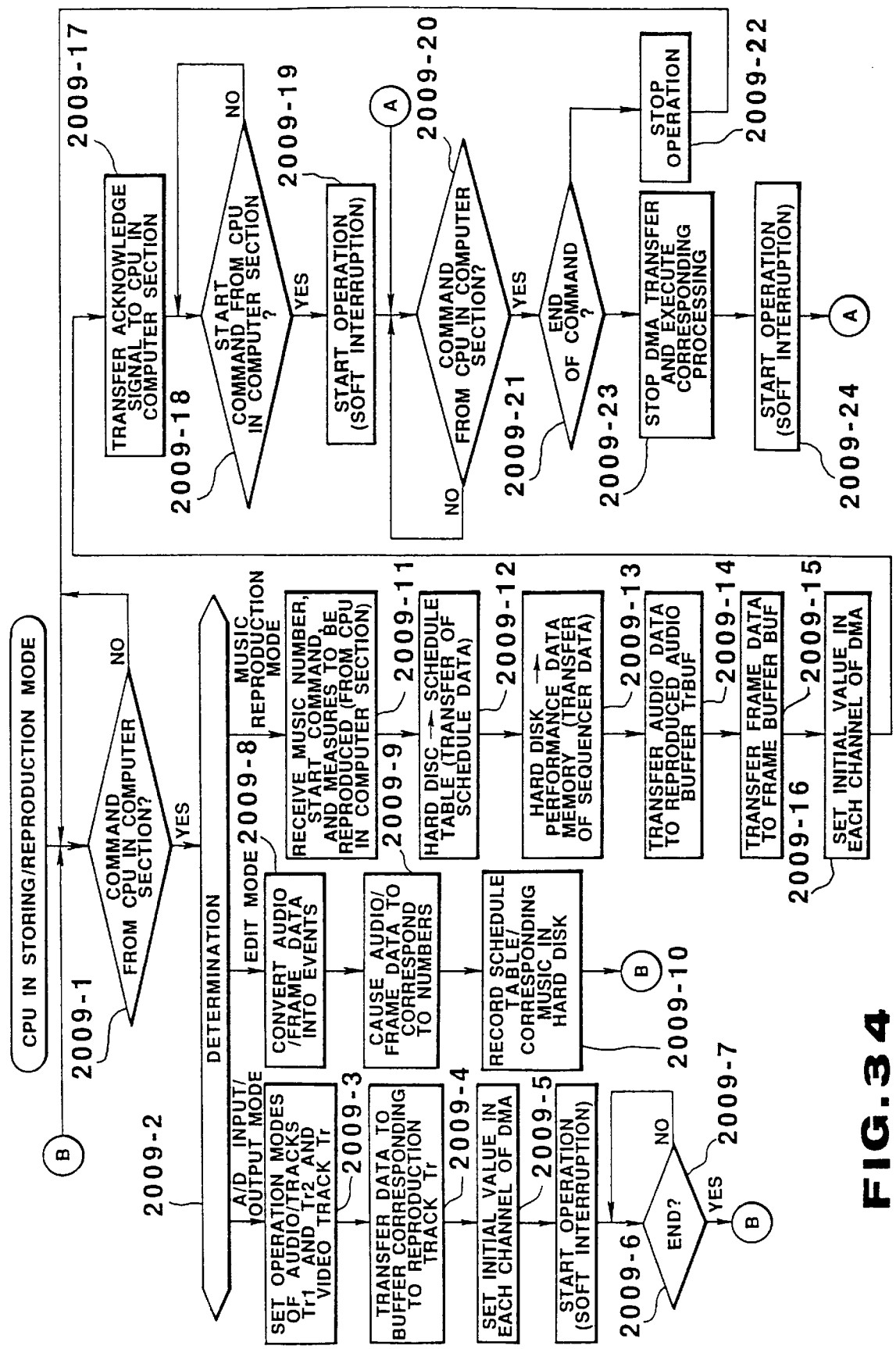
FIG. 34 is a flow chart showing the overall operations of a CPU 2021 of a storing/reproducing section 2002 in FIG. 26.

In this manner, all data transfer between the hard disk 2008 and the buffer section 2024 is executed by the DMAC 2025, and the CPU 2021 sets a value which the access pointer of the hard disk 2008 will take upon completion of this DMA transfer. The flow then returns to the main routine (FIG. 34).

As will be apparent from the later description, once the first interrupt routine (FIG. 35) is started and the HDC 2026 is operated, since the HDC 2026 generates interruption every time transfer of a data block designated by the CPU 2021 is completed, the CPU 2021 checks only whether the recording/reproducing operation is completed (whether a command is supplied from the CPU 2011) (step 2009-7 in FIG. 34). If it is determined in step 2009-7 in FIG. 34 that the AV input/output mode is completed, the flow returns to step 2009-1 as the initial state.

Operations of Audio Input/output Devices 2022-1 and 2022-2

Figure 36:
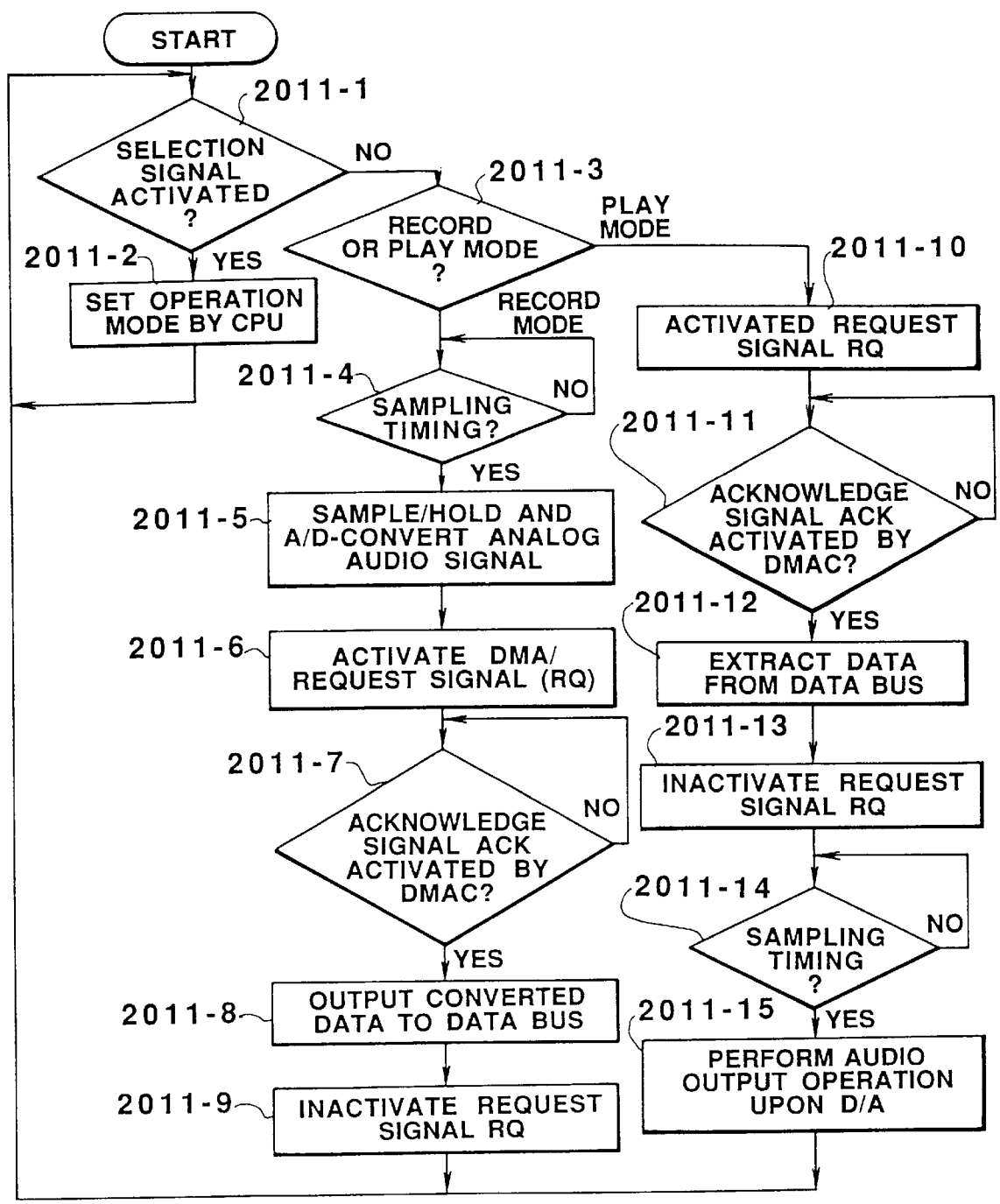
FIG. 36 is a flow chart showing operations of audio input/output devices 2022-1 and 2022-2 of the storing/reproducing section 2002 in FIG. 26.

Operations of the audio input/output devices 2022-1 and 2022-2 will be described below with reference to FIG. 36. The function indicated by the flow chart in FIG. 36 may be realized by microprogram control or hard logic control. That is, a function realizing means can be variously selected. In step 2011-1, it is checked whether a designation signal supplied from the CPU 2021 to the audio input/output devices 2022-1 and 2022-2 is active. If YES in step 2011-1, an operation mode (e.g., the record, play, or stop mode) is set by the CPU 2021. This operation is performed in response to step 2009-3 in FIG. 34.

If NO in step 2011-1, it is checked in step 2011-3 whether the audio input/output devices 2022-1 and 2022-2 are in the record mode or the play mode. If it is determined that audio input/output devices 2022-1 and 2022-2 are set in the play mode, the flow advances from step 2011-3 to step 2011-4 and step 2011-9. If it is determined that they are set in the play mode, the flow advances to step 2011-10 and step 2011-15. Operations of the audio input/output devices 2022-1 and 2022-2 set in the record mode will be described first. In step 2011-4, it is checked whether a sampling timing has come. Step 2011-4 is repeated till the sampling timing. Note that in the determination of the sampling timing, hard timers may be respectively arranged in the audio input/output devices 2022-1 and 2022-2 so as to determine the sampling time on the basis of outputs from the timers, or a common hard timer may be arranged to operate the audio input/output devices 2022-1 and 2022-2 in accordance with an output from the timer. In addition, the audio input/output devices 2022-1 and 2022-2 may have different sampling frequencies.

If YES in step 2011-4, supplied analog signals are subjected to sample/hold (S/H) processing and A/D conversion. In step 2011-6, the DMA transfer request signal RQ is activated and output to the DMAC 2025.

Upon reception of the request signal RQ, the DMAC 2025 outputs the acknowledge signal ACK to perform DMA transfer (this operation will be described in detail later). If YES in step 2011-7, the flow advances to step 2011-8, in which the audio input/output devices 2022-1 and 2022-2 In the record mode output the digital audio data obtained by A/D conversion, and transfer the data to a corresponding buffer (Tr1BUF or Tr2BUF). In step 2011-9, the DMA transfer request signal RQ is inactivated. In this manner, externally supplied analog audio signals are converted into digital audio signals and are respectively transferred to the current addresses of designated buffers at every sampling period.

If the play mode is determined in step 2011-3, the flow advances to step 2011-10 to activate the DMA transfer request signal RQ to the DMAC 2025. When the acknowledge signal ACK is supplied from the DMAC 2025 (step 2011-11), the digital voice data on the data bus are fetched (step 2011-12), and the request signal RQ is inactivated (step 2011-13). An operation of the DMAC 2025 at this time will be described later. The contents of the corresponding current address (of the voice buffer Tr1BUF or Tr2BUF) of the buffer section 2024 are input/set in the voice input/output devices 2022-1 and 2022-2 with the above-described operation.

It is then checked whether a sampling timing has come (step 2011-14). This check is performed in the same manner as described with reference to step 2011-4. If YES in step 2011-14, the flow advances to step 2011-15, in which after D/A conversion and low-pass filtering are executed, and the resulting analog signals are output to an external device.

Figure 38:
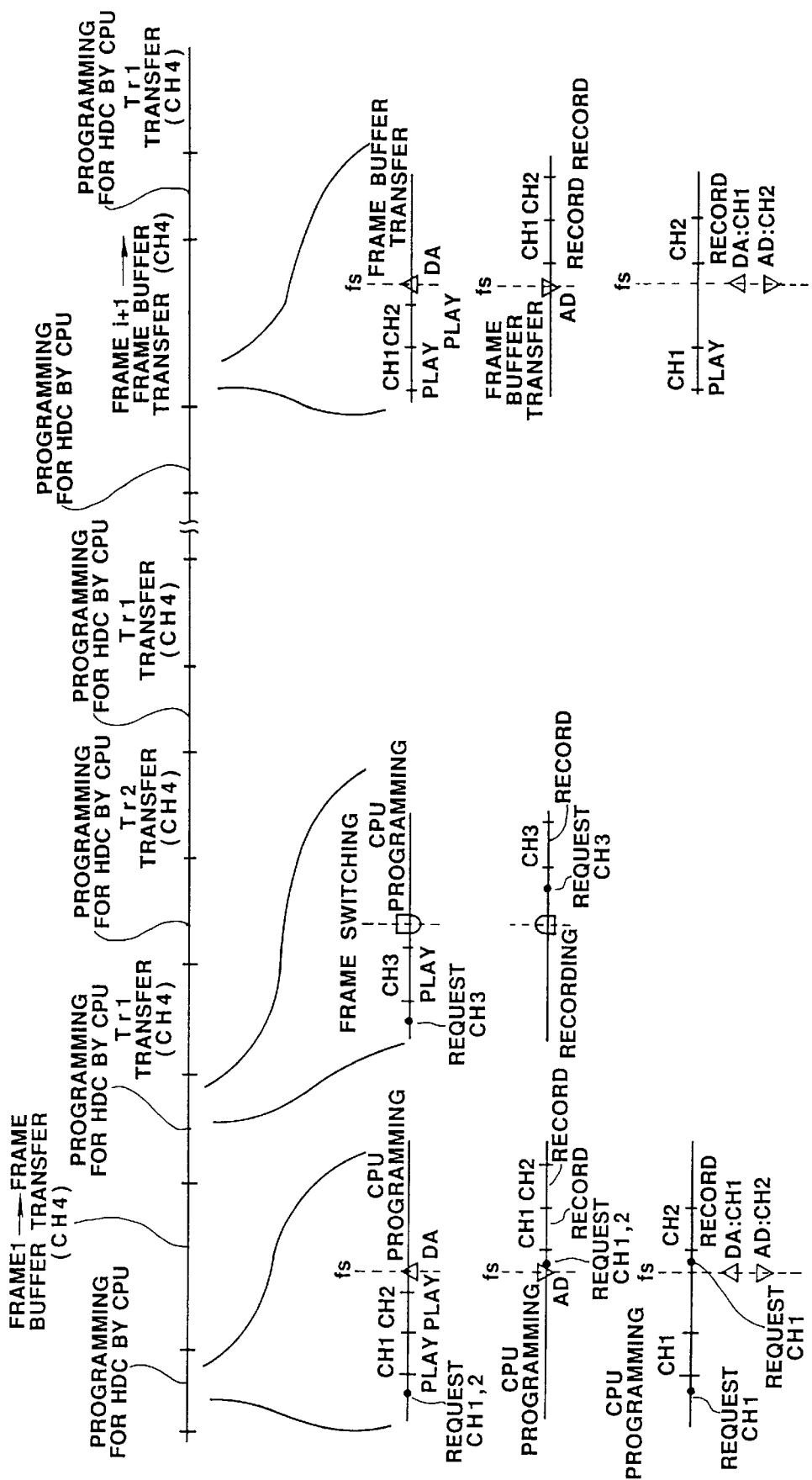
FIG. 38 is a timing chart showing a track recording/reproducing operation of the storing/reproducing section 2002 in FIG. 26.

Operations at one sampling timing in the record mode and the play mode have been described above. After the processing in steps 2011-9 and 2011-15 is completed, the flow returns to step 2011-1. Subsequently, processing at the respective sampling timings is sequentially executed. This operation is shown in FIG. 38, which will be described in detail later. Reference symbol fs in FIG. 38 denotes a sampling period. In the record mode, A/D-converted audio data is fetched in synchronism with this sampling period. Contrary, in the play mode, audio data transferred before the sampling period is D/A-converted in synchronism with the sampling period. FIG. 38 shows cases wherein both the audio tracks Tr1 and Tr2 are set in the play mode and the record mode, and one of the tracks is set in the play mode, while the other track is set in the record mode. In each case, the priority order of CH1 and CH2 in DMA transfer is set.

Operation of Video Input/output Device 2023

Figure 37:
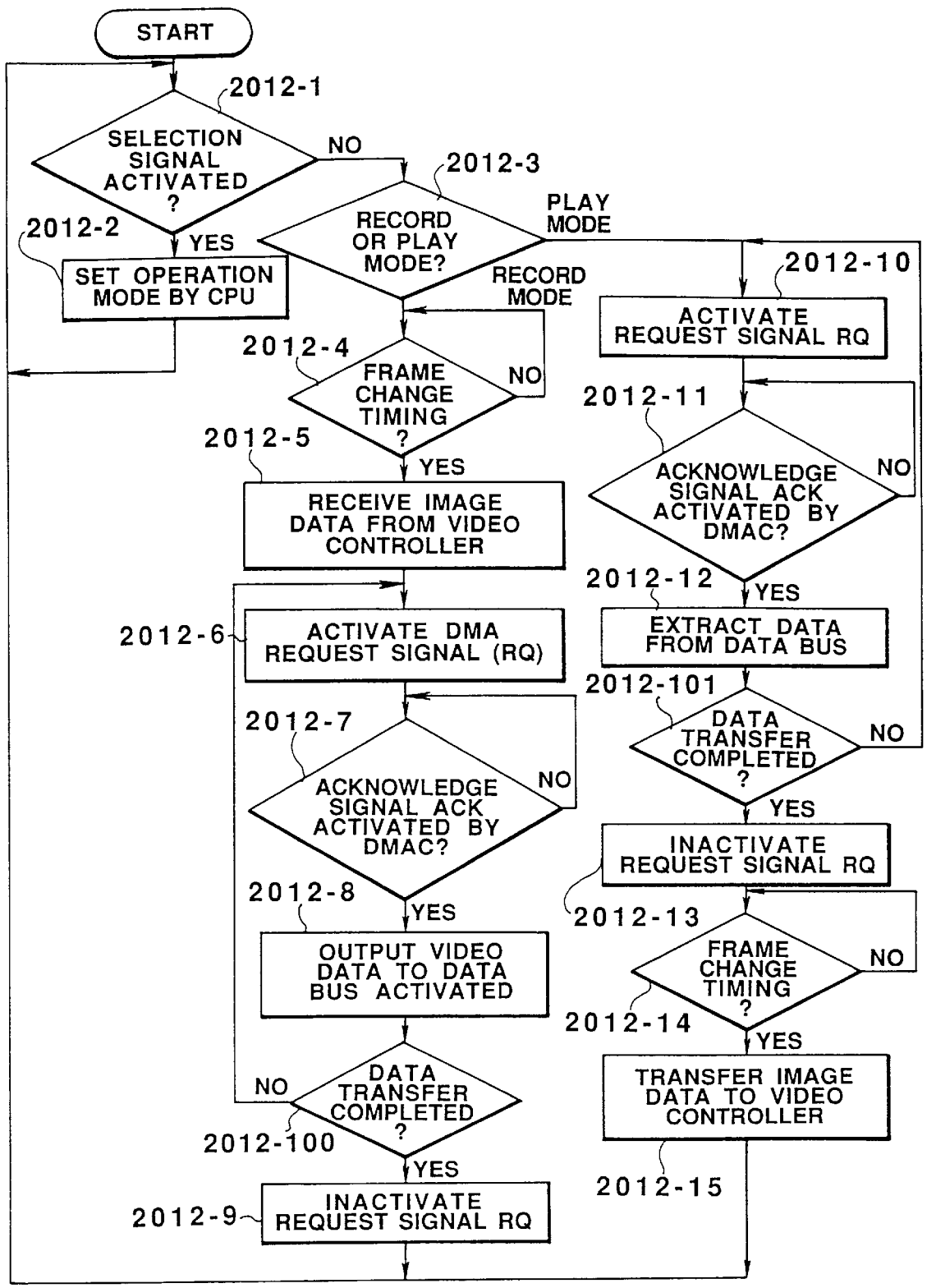
FIG. 37 is a flow chart showing an operation of an audio input/output device 2023 of the storing/reproducing section 2002 in FIG. 26.

FIG. 37 shows an operation of the video input/output device 2023. This operation, similar to the operations of the audio input/output devices 2022-1 and 2022-2, may be realized by microprogram control or hard logic control. Since most of the operations in the steps of this flow chart are the same as those in FIG. 36, only different operations will be described below.

In the record mode, it is checked in step 2012-4 whether a frame change timing has come. The rate at which this change timing comes varies depending on images to be reproduced in the still-picture display scheme or the motion-picture display scheme. In the motion-picture display scheme, the rate varies depending on whether coarse or fine images are displayed. A signal for determining this rate may be generated by the internal timer of the video input/output device 2023 or by another circuit for generating a special clock.

In any case, YES is obtained in step 2012-4 at the timing at which one-frame data is received from the image controller 2004. In step 2012-5, the one-frame digital image data is input to the video input/output device 2023. The data is then supplied from the video input/output device 2023 to the frame buffer BUF in the buffer section 2024 in step 2012-8 through steps 2012-6 and 2012-7. In this case, since the image data is constituted by a set of a large number of bits (bytes), data transfer between the frame buffer BUF and the video input/output device 2023 is achieved by performing a transfer operation a plurality of times (a large number of times). That is, after step 2012-8, it is checked whether data transfer of the frame data is completed (step 2012-100), and step 2012-6 to step 2012-8 are repeated if NO is obtained in step 2012-100.

In the play mode, in step 2012-12, the one-frame video data is transferred from the frame buffer BUF in the buffer section 2024 to the video input/output device 2023 (by repeating the processing from step 2012-10 to step 2012-101), and the frame data is supplied to the video controller 2004 in synchronism with the frame change timing (step 2012-14). Therefore, on the display device 2005, frames are sequentially changed at a predetermined rate to perform still-picture display or motion-picture display.

Note that if the video data is stored upon compression by a predetermined algorithm, demodulation (expansion) processing is performed by the video controller 2004 in the reproduction mode.

FIG. 38 also shows the reproduction and recording operation timings of the video track (video input/output device 2023).

Operation of DMAC 2025

An operation of the DMAC 2025 will be described next with reference to FIG. 39. The flow chart in FIG. 39 may be considered to represent that the service controller 2108 of FIG. 27 is operated by microprogram control or that the function of the DMAC 2025 is realized by a hard logic.

In step 2014-1, it is checked whether a selection signal is supplied from the CPU 2021. If YES in step 2014-1, it is checked in step 2014-2 whether a read RD (read operation) or a write WR (write operation) is designated by the CPU 2021. If the read RD is designated, the contents of registers, of the register sections 2104 and 2105, which are designated by address signals supplied through the address bus are output to be fetched by the CPU 2021 in step 2014-3. In contrast to this, if the write WR is designated, the flow advances to step 2014-4 to input/set desired data in designated registers through the data bus. The processing in step 2014-4 corresponds to the processing in step 2009-5 or the like in the main routine. With this processing in step 2014-4, the desired data is respectively set in the register sections 2104 and 2105.

When such access from the CPU 2021 to the DMAC 2025 and a program are completed, the selection signal is inactivated, and the flow advances from step 2014-1 to step 2014-5.

In step 2014-5, it is checked whether any DMA transfer request signal is supplied from the audio input/output devices 2022-1 and 2022-2, the video input/output device 2023, or the HDC 2026. If it is determined that a request signal is supplied from one of the devices, the flow advances to step 2014-6 to set the signal DMAENB at logic "1" so as to cause the DMAC 2025 to occupy control of the buses (address and data buses), thus inhibiting access from the CPU 2021.

If a plurality of request signals are received, the channels are selected in accordance with the priority order of CH1>CH2>CH3>CH4 (step 2014-7). For example, in the case shown in FIG. 38, even if data transfer requests are simultaneously made with respect to the audio tracks Tr1 and Tr2 and the video track Tr, since the channel CH1 has the highest priority, DMA transfer with respect to the track Tr1 is executed first.

As will be apparent from the later description, since the channel CH4 has the lowest priority, when a data transfer request is made from the audio track Tr (the audio input/output devices 2022-1 and 2022-2) or the video track Tr (the video input/output device 2023) during the execution of data transfer between the hard disk 2008 and any one of the areas of the buffer section 2024, the latter data operation is preferentially performed first (see FIG. 38).

Subsequently, the current address of a selected channel (the contents of the current address register, of the address register section 2104, which correspond to the selected channel) is output to the address bus (step 2014-8). The direction of DMA transfer is then determined by referring to the contents of the control register section 2105 corresponding to the selected channel (step 2014-3). If transfer from a specific area of the buffer section 2024 to another component (I/O) is determined, the flow advances from step 2014-10 to step 2014-11 to supply a read signal RD to the buffer section 2024. In contrast to this, if transfer from another component (I/O) to the buffer section 2024 is determined, the flow advances to step 2014-12 to supply a write signal WR to the corresponding buffer area.

After this operation, the acknowledge signal ACK is activated (step 2014-13). As a result, data transfer between the buffer section 2024 and each track Tr is performed. In step 2014-14, since a data transfer operation is completed, the signals RD, WR, and ACK are inactivated, and the contents of the current address (in the address register section 2104 shown in FIG. 27) of the corresponding channel are incremented by one in step 2014-15. With the operation in step 2014-15, a count-up operation is performed every time new audio data or video data is written in the buffer section 2024 or data is read out therefrom. After the processing in step 2014-15 is completed, the flow returns to step 2014-1.

When such data transfer is completed, the flow advances from step 2014-5 to step 2014-16 to inactivate the DMA enable signal DMAENAB so as to stop the DMAC 2025 from occupying control of the address and data buses in the storing/reproducing section 2002, thus allowing each component in the storing/reproducing section 2002 to receive access from the CPU 2021.

In addition, the DMAC 2025 also performs data transfer between the hard disk 2025 and the buffer section 2024. In this case, the registers, of the address register section 2104 and the control register section 2105, which correspond to the channel CH4 are used. This operation is executed after setting and control operations are performed with respect to the DMAC 2025 and the HDC 2026 upon execution of the interrupt routine (FIG. 35) of the CPU 2021.

Figure 35:
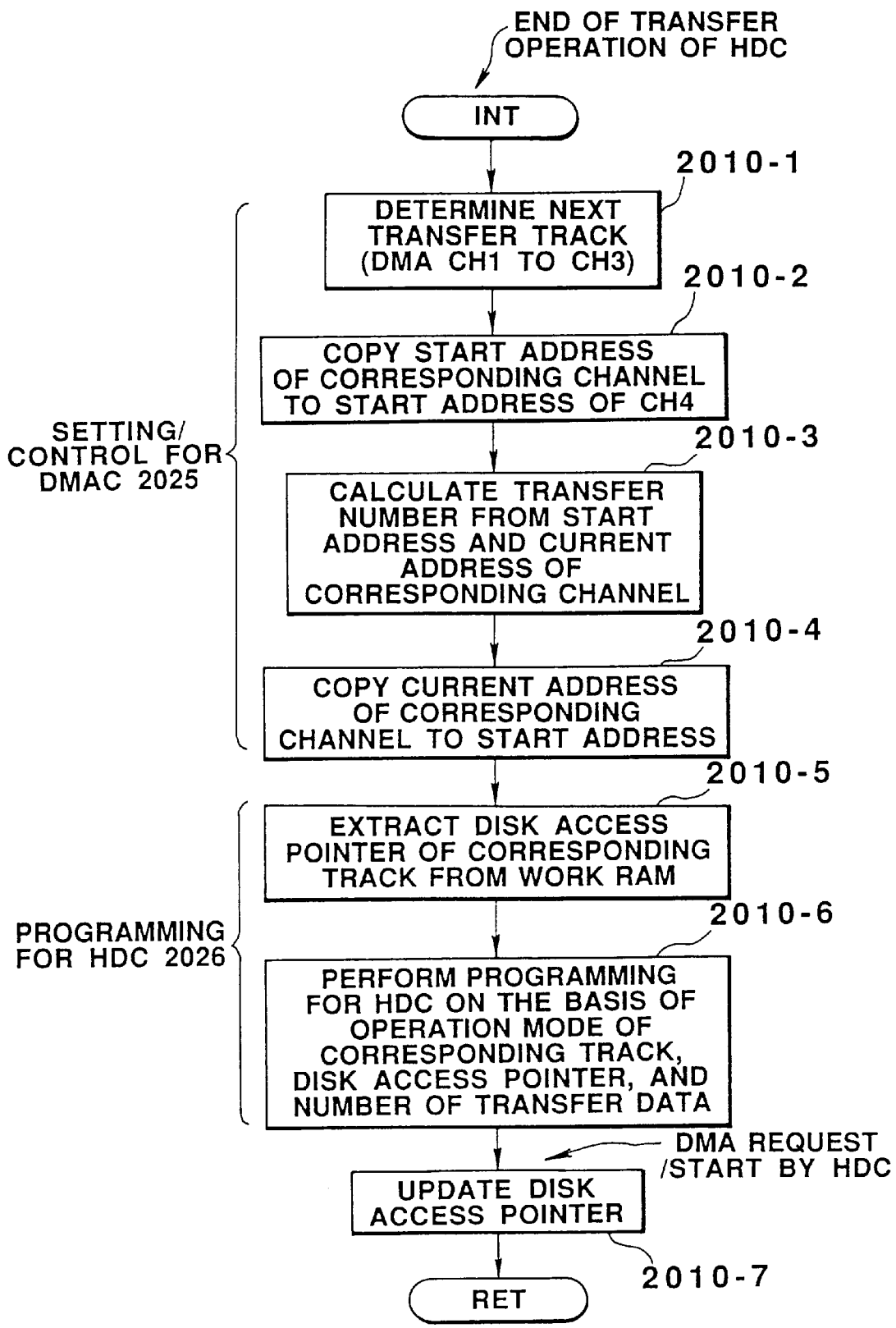
FIG. 35 is a flow chart showing an interrupt routine of the CPU 2021 of the storing/reproducing section 2002.

More specifically, in response to the processing in step 2010-1 to step 2010-4 in FIG. 35, the DMAC 2025 executes the processing in step 2014-3 and step 2014-4. That is, the CPU 2021 determines a track used for data transfer by the channel 4, and the start address of a buffer corresponding to the track is set in the start address register (in the address register section 2104 in FIG. 27) of the channel CH4. The CPU 2121 obtains number of data transfer operations with respect to the track on the basis of the difference between the start address and the current address (the address incremented after the previous data transfer is performed with respect to the hard disk 2008), and the current address of this track is copied as a start address.

The DMAC 2025 sequentially performs data transfer between areas, of the buffer section 2024, which correspond to tracks in operation, and the hard disk 2008 in units of tracks. That is, data transfer following previous data transfer (block transfer) is performed in units of tracks.

Figure 41:
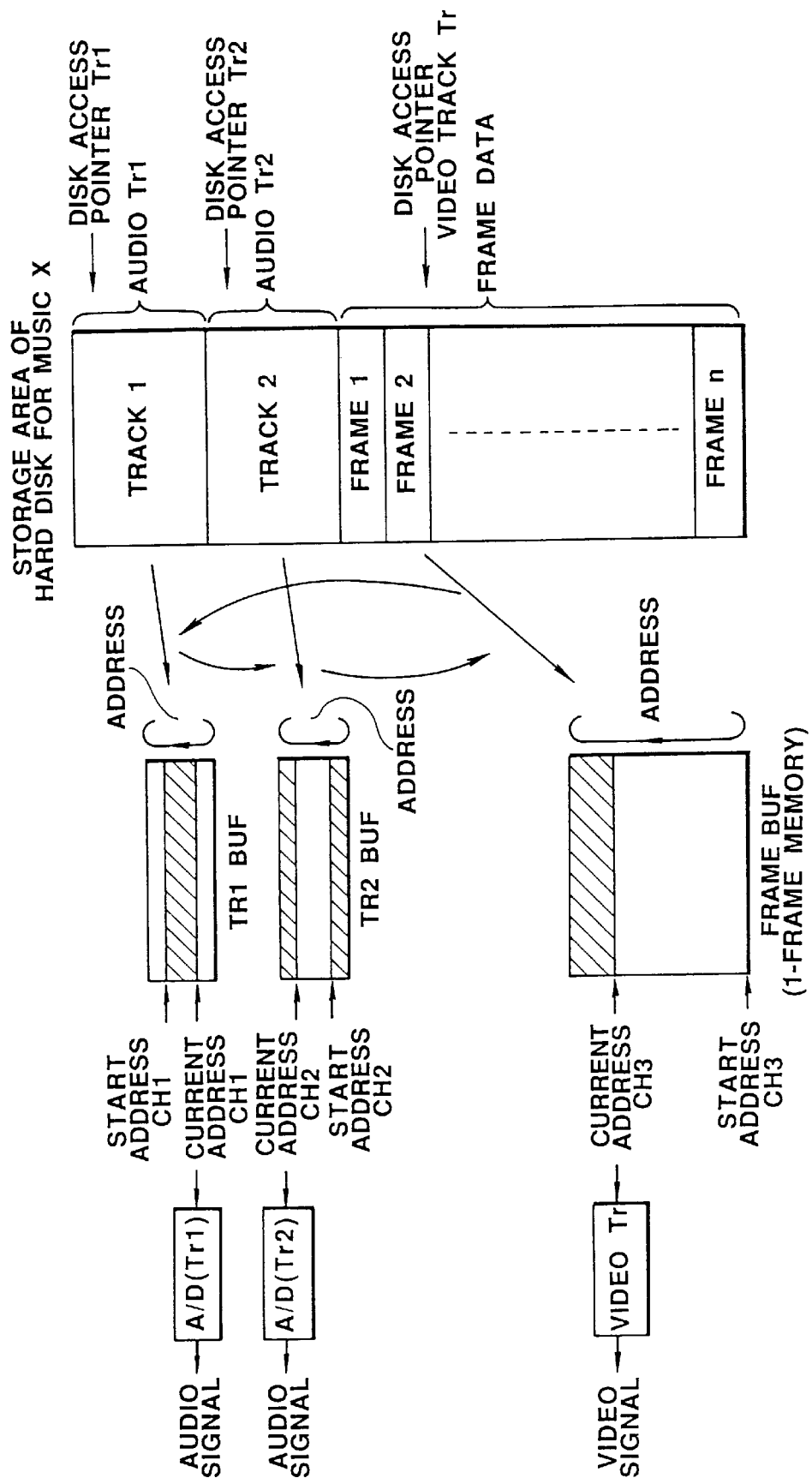
FIG. 41 is a view showing a state in which a track recording/reproducing operation of the storing/reproducing section 2002 in FIG. 26 is performed.

FIG. 41 shows a state wherein audio signals corresponding to two tracks and a video signal corresponding to one track are sequentially read out from specific areas of the hard disk 8. For example, with respect to the track Tr1, data transfer corresponding to a blank portion (which is not hatched) between the start address and current address of the channel CH1 in FIG. 41 is performed. Note that data transfer from the buffer section 2024 to the hard disk 2008 is performed by control operations similar to those described above, even though the direction of data transfer is opposite to the above data transfer. Note that data transfer between the frame buffer BUF and the hard disk 2008 is performed in units of frames.

After programming the HDC 2026 in steps 2010-5 and 2010-6, the CPU 2021 causes the HDC 2026 to generate an actual transfer request signal, thus starting DMA transfer.

Upon detection of the transfer request signal from the HDC 2026 in step 2014-5, the DMAC 2025 executes step 2014-6 to step 2014-9 in the same manner as described above and checks in step 2014-10 whether data transfer from the buffer section 2024 to the hard disk 2008 or data transfer in the opposite direction is requested. If the former is requested, the flow advances to step 2014-11. If the latter is requested, the flow advances to step 2014-12, and the processing In step 2014-13 to 2014-15 is executed. In this case, for example, digital audio data corresponding to one sampling operation or digital audio data corresponding to one unit is transferred by one transfer operation. Therefore, block transfer is performed by executing the operations in step 2014-5 to 2014-15 a plurality of times. Since this data transfer between the hard disk 2008 and the buffer section 2024 is closely associated with the operation of the HDC 2026, this transfer operation will be further described later.

When the DMA transfer is completed, the request signal RQ is disabled, and the flow advances from step 2014-5 to step 2014-16 to set the DMA enable signal DMAENB at "0".

Operation of HDC 2026

Figure 40:
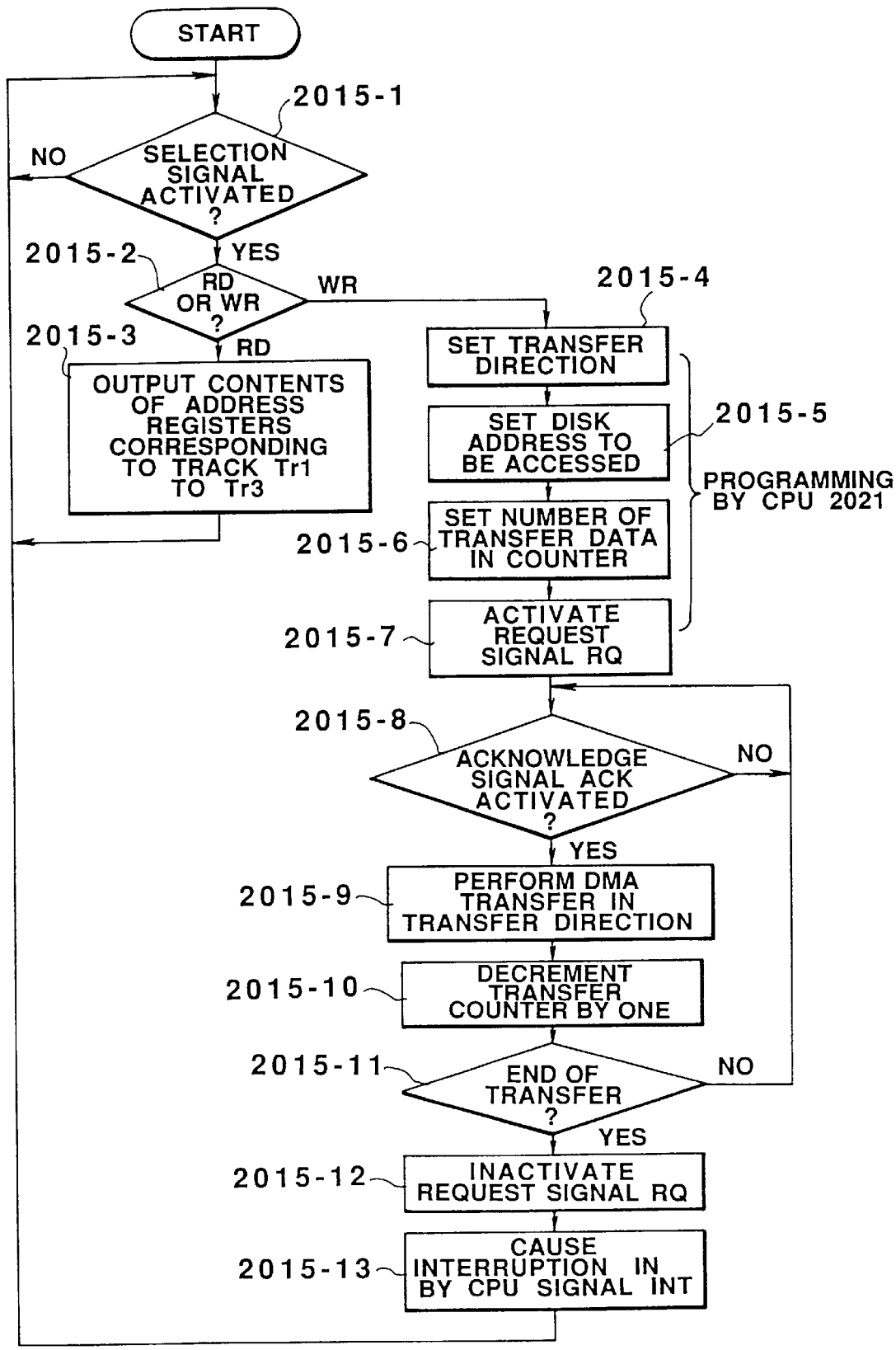
FIG. 40 is a flow chart showing an operation of an HDC 2026 of the storing/reproducing section 2002 in FIG. 26.

An operation of the HDC 2026 will be described below with reference to FIG. 40. The HDC 2026 may be realized by a hard logic or microgram control scheme. In any case, the function indicated by the flow chart in FIG. 40 can be realized.

It is checked whether a selection signal is supplied from the CPU 2021 (step 2015-1). This signal is supplied by the interrupt routine (steps 2010-5 and 2010-6 in FIG. 35) of the CPU 2021. If NO in step 2015-1, step 2015-1 is repeated. If YES in step 2015-1, the flow advances to step 2015-2 to check whether the read signal RD or the write signal WR is supplied from the CPU 2021. If the read signal RD is supplied, designated data (e.g., the contents of the address register) in the HDC 2026 is output to the CPU 2021 through the data bus in step 2015-3.

If the write signal WR is supplied, the flow advances from step 2015-2 to step 2015-4 to set the direction of DMA transfer between the buffer section 2024 and the hard disk 2008, which is performed by the channel CH4 of the DMAC 2025. In step 2015-5, an access point of the hard disk 2008 to be accessed is set. This operation is performed on the basis of the access pointer of the track obtained from the work RAM 2027 by the CPU 2021 (step 2010-5 in FIG. 35).

Subsequently, in step 2015-6, a transfer data count (digital audio/video data count) is set in the internal counter of the HDC 2026. This data transfer count is obtained in step 2010-6 in the interrupt routine of the CPU 2021 (see FIG. 35).

By executing step 2015-4 and step 2015-6 in this manner, the HDC 2026 is programmed under the control of the CPU 2021. Thereafter, the HDC 2026 requests the DMAC 2025 to perform data transfer (step 2015-7). As is apparent from this description, upon reception of the interrupt signal INT from the HDC 2026, the CPU 2021 executes setting and control operations of DMA transfer corresponding to the next track (i.e., in the order of audio track Tr1, audio track Tr2, audio track Tr, audio track Tr1, audio track Tr2, . . . ) with respect to the DMAC 2025, and programs the HDC 2026. Thereafter, the CPU 2021 operates independently of the HDC 2026 and the DMAC 2025, and causes them to execute actual DMA transfer according to interaction therebetween.

Figure 39:
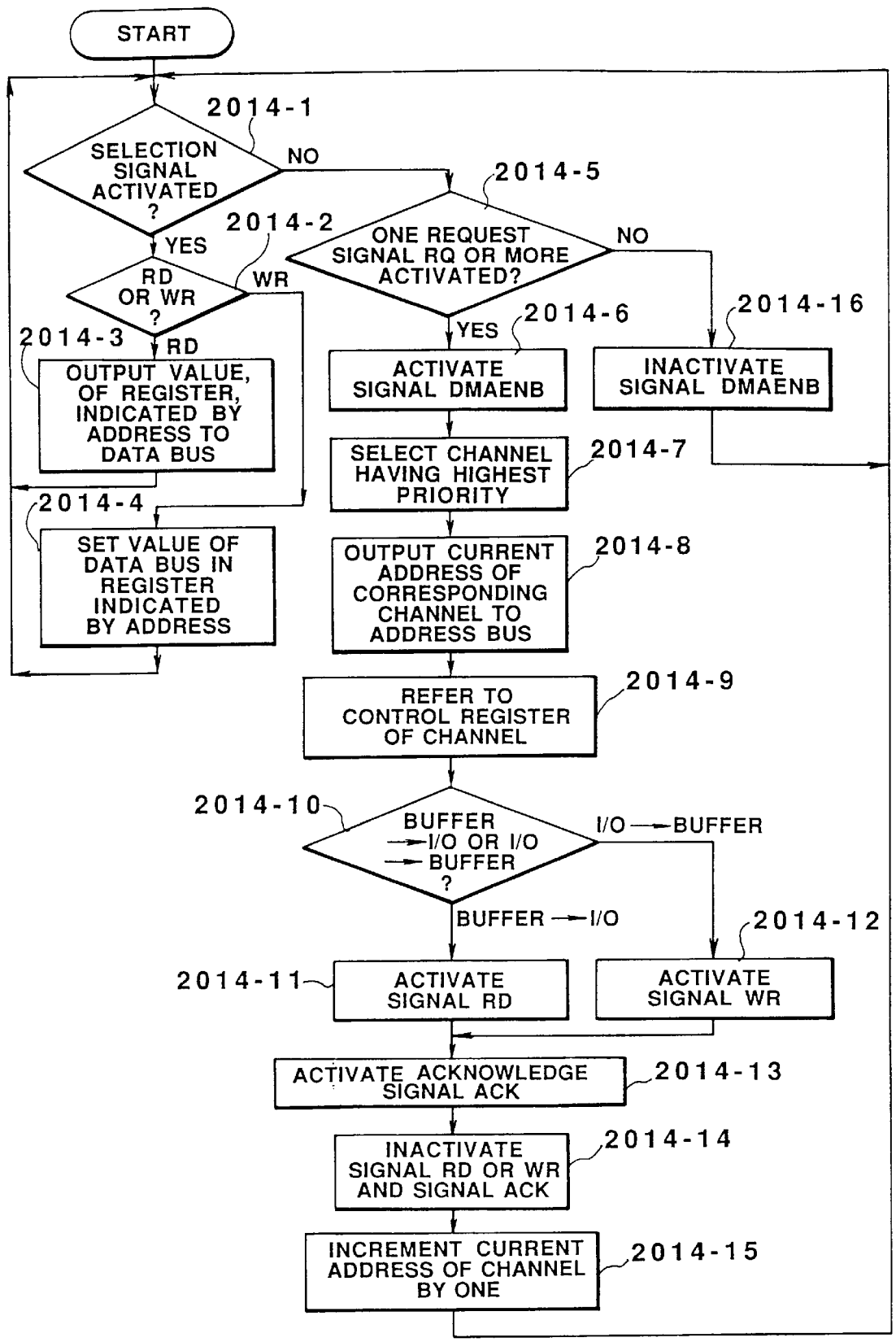
FIG. 39 is a flow chart showing an operation of DMAC 2025 of the storing/reproducing section 2002 in FIG. 26.

The flow then advances from step 2015-7 to step 2015-8, and the HDC 2026 repeats step 2015-8 until it receives the acknowledge signal ACK from the DMAC 2025 (see step 2014-13 in FIG. 39).

If YES in step 2015-8, the flow advances to step 2015-9, in which digital audio data corresponding to one sampling operation or digital video data corresponding to one unlit amount is transferred by the operation of the channel CH4 of the DMAC 2025. Thereafter, a transfer counter set in step 2015-6 is decremented by one (step 2015-10). In step 2015-11, completion of data transfer corresponding to the preset transfer data count is judged on the basis of the contents of the transfer counter. If NO in step 2015-11, the flow returns to step 2015-8. Therefore, the DMAC 2025 keeps receiving the transfer request signal RQ until transfer (block transfer) corresponding to the data count set by the HDC 2026 is completed. Consequently, the DMAC 2025 executes the processing from step 2014-5 to step 2014-15 (FIG. 39) in accordance with the request, and the HDC 2026 executes the processing from step 2015-8 to step 2015-11 accordingly.

If the completion of the data transfer is determined in step 2015-11, the flow advances to step 2015-12 to inactivate the data transfer request signal RQ from the HDC 2026 to the DMAC 2025. Thereafter, the HDC 2026 supplies the interrupt signal INT to the CPU 2021 (step 2015-13) to perform data transfer with respect to the next track between the hard disk 2008 and ant area, of the buffer section 2024, which corresponds to the track with the next higher priority. As described above, in response to the interrupt signal INT, the CPU 2021 executes the interrupt routine (FIG. 35).

Data Transfer Operation Between Hard Disk 2008 and Buffer Section 2024

Data transfer between the hard disk 2008 and the buffer section 2024 should be understood from the above description. The manner in which DMA request signals are supplied to the DMAC 2025 and the DMAC 2025 responds to them in a time-divisional manner will be described below with reference to FIG. 38.

As has been described above, data transfer request signals are output from the audio input/output devices 2022-1 and 2022-2 to the DMAC 2025 at every sampling timing fs. In addition, a data transfer request signal is output from the video input/output device 2023 at the frame change timing. These request signals are also generated, for example, when the CPU 2021 is programming the HDC 2026 (step 2010-5 and step 2010-6 in FIG. 35 and step 2015-4 and step 2015-7 in FIG. 40). In response to data transfer request signals from the audio input/output devices 2022-1 and 2022-2 and the video input/output device 2023, the DMAC 2025 outputs the DMA enable signals EMAENB (step 2014-6 in FIG. 39), as described above, and interrupts programming of the HDC 2026 by the CPU 2021. After DMA transfer through the channels CH1 to CH3 is completed, the DMAC 2025 causes the CPU 2021 to resume programming (FIG. 38).

In addition, while data is sequentially transferred between the hard disk 2008 and the buffer section 2024 by DMA transfer through the channel CH4, data transfer request signals are output from the audio input/output devices 2022-1 and 2022-2 in the same manner as described above.

In this case, the DMAC 2025 performs data transfer through one of the channels (CH1 to CH3) which is determined in step 2014-7 in FIG. 39 to have the highest priority. During this period, although a data transfer request signal is kept output from the HDC 2026 to the DMAC 2025 (see step 2015-7 in FIG. 40), the acknowledge signal ACK is not supplied from the DMAC 2025. Therefore, the flow waits for the next data transfer (step 2015-8 is repeated).

From a macroscopic viewpoint, therefore, the DMAC 2025 repeats DMA transfer between an area of the hard disk 2008 and a corresponding area of the buffer section 2024. However, from a microscopic viewpoint, DMA transfer between the buffer section 2024 and the audio input/output devices 2022-1 and 2022-2 and the video input/output device 2023 is executed by the channels CH1 to CH3 during programming of the HDC 2026, actual DMA transfer (by the channel CH4), or a pause, thereby performing accurate data transfer at the sampling period or the frame change timing.

Operation of CPU 2021 of Storing/reproducing Section 2002: Edit Mode

The CPU 2021 can edit the audio data or video data stored in the hard disk 2008 with the above-described operation in accordance with commands from the computer section 2001. Each data stored in the hard disk 2008 can be registered as one event with an arbitrary unit length in accordance with an operation of the keyboard and mouse 2012 (step 2009-8 in FIG. 34).

Audio data/video data converted into events in this manner are arranged in correspondence with the measure numbers of sequencer data which have been previously stored by a performance input (step 2009-9). With this operation, audio data and video data generated in units of measures of a music can be reproduced in an order and at timings different from the input/storage order and timings. For example, if video data of a plurality of still pictures are recorded in advance, they can be switched/reproduced in units of measures. In addition, if motion-picture data is recorded in advance, they can be extracted/reproduced in accordance with the length of each measure.

In step 2009-10, a schedule table for music obtained by such edit processing is stored in the hard disk 2008. FIG. 42 shows a schedule table for one music, which indicates the addresses, of audio data to be reproduced through the audio tracks Tr1 and Tr2, on the hard disk 2008, and the addresses, of video data to be reproduced through the video track Tr, on the hard disk 2008, in units of measure numbers. In this case, at the first measure, audio data at addresses Ad001 to Ad002-1 of the hard disk 2008 are read out for the audio track Tr1, and audio data at addresses Bd001 to Bd002-1 of the hard disk 2008 are read out for the audio track Tr2. It is apparent that the time required for reproduction of each of these data is caused to correspond to the duration of a corresponding measure. Similarly, voice data is designated in units of measures. In contrast to this, for the video track Tr, one-frame data stored at addresses Cd001 to Cd002-1 of the hard disk 2008 at the first to fourth measures is reproduced. Similarly, video data is read out in units of a plurality of measures.

It is apparent that audio data, video data, and a music can be arranged in association with each other in units of measures or in various time units, and their relationship can be variously changed.

By performing such edit processing with respect to a plurality of music, as shown in FIG. 30, schedule table data of the respective music (music pieces 1, 2, 3, ... ), sequencer data (multitrack arrangement), audio data (Tr1, Tr2), and video data (multi-frame arrangement) are stored in the hard disk 2008.

Operation of CPU 2021 of Storing/reproducing Section 2002: Music Reproduction Mode Of the operations of the CPU 2021 of the storing/reproducing section 2002, the music reproduction mode will be described below. This mode is performed in synchronism with step 2003-11 for the automatic performance control by the computer section 2001 described with reference to FIGS. 28 and 29. When this mode is designated by the computer section 2001, the CPU 2021 causes the flow to advance from step 2009-2 to step 2009-11 in FIG. 29. In step 2009-11, a music number and measures to be reproduced are received from the CPU 2011 of the computer section 2001 (see step 2004-2 in FIG. 34). In step 2009-12, the schedule table for the designated music is read out and set in the work RAM 2027. Therefore, a reproducing operation (reproduction order and timing) of the storing/reproducing section 2002 with respect to each track is performed on the basis of the contents of this schedule table.

In step 2009-13, the sequencer data for the music is read out from the hard disk 2008 and is stored in the performance data memory 2015 through the CPU 2011. This operation is associated with the operation in step 2004-3 in FIG. 29, executed by the CPU 2011.

In step 2009-14, the first block data of the music is transferred to the reproduced audio buffers of the buffer section 2024. In step 2009-15, the first frame data is transferred to the frame buffer of the buffer section 2024. In step 2009-16, initial values are respectively set in the channels of the DMAC 2025.

Since the operations from step 2009-14 to step 2009-16 are the same as those from step 2009-4 and 2009-5 described above, a further description thereof will be omitted. After such initial setting is performed, in response to an inquiry from the CPU 2011 of the computer section 2001 (step 2004-4 in FIG. 29), the CPU 2021 outputs an acknowledge signal representing that the preparation for an automatic performance is completed (step 2009-17).

In response to a start command from the CPU 2011 of the computer section 2001 (see step 2004-6 in FIG. 29), the CPU 2021 starts the performance. This operation is the same as that in step 2009--6 in the AV input/output mode. Thereafter, similar to the processing in the AV input/output mode, the CPU 2021 executes the interrupt processing in FIG. 35 to start a reproducing operation of the audio and video data. In synchronism with this operation, the computer section 2001 starts the automatic performance of the music.

During this reproduction operation of the audio and audio data, the CPU 2021 checks whether a command is supplied from the CPU 2011 (step 2009-20). If a command is supplied, the flow advances to step 2009-21 to check whether the command is an end command for the performance (audio/video data reproducing operation). If YES in step 2009-21, the CPU 2021 supplies a reproduction end command to each component of the storing/reproducing section 2002 to end the reproducing operation (step 2009-22), thus completing the performance.

If NO in step 2009-21, the CPU 2021 interrupts the DMA processing by the DMAC 2025 and performs corresponding processing/control (step 2009-23). Thereafter, the CPU 2021 resumes the operation (executes the interrupt routine in FIG. 35) to continue the performance.

In this manner, the performance data of a plurality of music pieces stored/set beforehand in the hard disk 2008 are selectively read out in accordance with an operation of the keyboard and mouse 2012 and are stored in the performance data memory 2015 of the computer section 2001. The data is then used for an automatic performance. In accordance with this operation, audio data and video data associated with the selected music are read out from the hard disk 2008 and are temporarily stored in the corresponding areas of the buffer section 2024 so as to be output, as two-track audio signals, from the audio input/output devices 2022-1 and 2022-2. In addition, the stored data is supplied, as video signals, to the video controller through the video input/output device 2023 so as to be displayed, as still pictures or motion pictures, on the display device 2005.

As described above, in the automatic performance apparatus having the above-described arrangement, audio and video data can be easily reproduced in accordance with a musical performance based on performance data.

In addition, performance data, audio data, and video data can be integrated to be stored/set in a memory means so that the respective data can be easily extracted in accordance with the selection of a music. Furthermore, a user can easily edit these data as integral data.

Although the several embodiments of the present invention have been described, these embodiments are simply illustrative and not restrictive. The present invention may therefore be modified in various other manners. All the modifications and applications of the present invention are within the scope and spirit of the invention, so that the scope thereof should be determined only by what is recited in the appended claims and there equivalents.

What is claimed is:

1. An automatic performance apparatus comprising:

memory means for storing performance data of a musical composition together with audio and video data to be reproduced in accordance with a performance based on the performance data of the musical composition;

performance means for giving a performance by generating musical tones in accordance with the performance data;

audio reproducing means for reproducing the audio data in accordance with the performance given by said performance means; and video reproducing means for reproducing the video data in accordance with the performance given by said performance means.

2. An apparatus according to claim 1, wherein said audio reproducing means includes means for reproducing the audio data stored in said memory means in synchronism with a sampling timing.

3. An apparatus according to claim 1, wherein said video reproducing means includes means for reproducing the video data stored in said memory means as still pictures in synchronism with a video change timing of the video data.

4. An apparatus according to claim 3, wherein the video data reproduced by said video reproducing means is data representing a musical piece to be performed, the video data changing in units of a predetermined number of measures of the musical piece.

5. An apparatus according to claim 3, wherein said video reproducing means includes means for reproducing the video data stored in said memory means as motion pictures in synchronism with a video change timing of the video data.

6. An automatic performance apparatus comprising:

memory means for performing read/write operations and adapted to store performance data of a musical composition together with audio and video data to be reproduced in accordance with a performance based on the performance data of the musical composition;

performance inputting/reproducing means for causing said memory means to store the performance data of the musical composition and giving a performance by generating musical tones in accordance with the performance data of the musical composition;

audio storing/reproducing means for causing said memory means to store the audio data and reproducing the audio data in accordance with the performance given by said performance inputting/reproducing means; and video storing/reproducing means for causing said memory means to store the video data and reproducing the video data in accordance with the performance given by said performance inputting/reproducing means.

* * * * *

UNITED STATES PATENT AND TRADEMARK OFFICE
CERTIFICATE OF CORRECTION

PATENT NO.   : 5,974,015
DATED        : October 26, 1999
INVENTOR(S)  : Iizuka et al Page 1 of 1

It is certified that error appears in the above-identified patent and that said Letters Patent is hereby corrected as shown below:

Item [30] "Foreign Application Priority Data",
delete "May 14, 1990 [JP] Japan.....2-123788
       Sep. 6, 1990  [JP] Japan.....2-236719".

Signed and Sealed this

Third Day of July, 2001

Attest:

*Nicholas P. Godici*

*Attesting Officer*

NICHOLAS P. GODICI
*Acting Director of the United States Patent and Trademark Office*